US010186373B2

United States Patent
Kurs

(10) Patent No.: US 10,186,373 B2
(45) Date of Patent: Jan. 22, 2019

(54) WIRELESS POWER TRANSFER SYSTEMS WITH SHIELD OPENINGS

(71) Applicant: WiTricity Corporation, Watertown, MA (US)

(72) Inventor: Andre B. Kurs, Chestnut Hill, MA (US)

(73) Assignee: WiTricity Corporation, Watertown, MA (US)

(*) Notice: Subject to any disclaimer, the term of this patent is extended or adjusted under 35 U.S.C. 154(b) by 0 days.

(21) Appl. No.: 15/885,884

(22) Filed: Feb. 1, 2018

(65) Prior Publication Data

US 2018/0158601 A1 Jun. 7, 2018

Related U.S. Application Data

(63) Continuation of application No. 14/688,025, filed on Apr. 16, 2015, now Pat. No. 9,892,849.
(Continued)

(51) Int. Cl.
*H01F 27/42* (2006.01)
*H01F 38/14* (2006.01)
*H02J 50/50* (2016.01)
*H02J 50/12* (2016.01)
*H02J 50/80* (2016.01)
(Continued)

(52) U.S. Cl.
CPC ......... *H01F 38/14* (2013.01); *H01F 27/2871* (2013.01); *H01F 27/365* (2013.01); *H02J 5/005* (2013.01); *H02J 7/025* (2013.01); *H02J 50/12* (2016.02); *H02J 50/50* (2016.02);
(Continued)

(58) Field of Classification Search
CPC ..... H01F 38/14; H01F 27/2871; H01F 27/365
USPC ........... 307/104; 336/182, 220, 130–136, 83, 336/84 C, 84 R, 115, 120, 121
See application file for complete search history.

(56) References Cited

U.S. PATENT DOCUMENTS

| 645,576 A | 3/1900 | Tesla |
| 649,621 A | 5/1900 | Tesla |

(Continued)

FOREIGN PATENT DOCUMENTS

| CA | 142352 | 8/1912 |
| CN | 102239633 | 11/2011 |

(Continued)

OTHER PUBLICATIONS

"Intel CTO Says Gap between Humans, Machines Will Close by 2050", *Intel News Release*, (See intel.com/.../20080821comp.htm?iid=S . . . ) (Printed Nov. 6, 2009).
(Continued)

*Primary Examiner* — Thomas Skibinski
(74) *Attorney, Agent, or Firm* — Fish & Richardson P.C.

(57) ABSTRACT

In a first aspect, the disclosure features apparatuses for wireless power transfer, the apparatuses including a plurality of magnetic elements joined together to form a magnetic component extending in a plane, where discontinuities in the magnetic component between adjacent magnetic elements define gaps in the magnetic component, a coil including one or more loops of conductive material positioned, at least in part, on a first side of the plane. The apparatuses include a conductive shield positioned on a second side of the plane and which includes one or more openings positioned relative to the gaps.

20 Claims, 40 Drawing Sheets

Related U.S. Application Data

(60) Provisional application No. 61/980,712, filed on Apr. 17, 2014.

(51) Int. Cl.
*H02J 50/70* (2016.01)
*H02J 5/00* (2016.01)
*H04B 5/00* (2006.01)
*H01F 27/28* (2006.01)
*H02J 7/02* (2016.01)
*H01F 27/36* (2006.01)

(52) U.S. Cl.
CPC .............. *H02J 50/70* (2016.02); *H02J 50/80* (2016.02); *H04B 5/0037* (2013.01); *H04B 5/0075* (2013.01)

(56) References Cited

U.S. PATENT DOCUMENTS

| | | | |
|---|---|---|---|
| 787,412 A | 4/1905 | Tesla |
| 1,119,732 A | 12/1914 | Tesla |
| 2,133,494 A | 10/1938 | Waters |
| 3,517,350 A | 6/1970 | Beaver |
| 3,535,543 A | 10/1970 | Dailey |
| 3,780,425 A | 12/1973 | Penn et al. |
| 3,871,176 A | 3/1975 | Schukei |
| 4,088,999 A | 5/1978 | Fletcher et al. |
| 4,095,998 A | 6/1978 | Hanson |
| 4,180,795 A | 12/1979 | Matsuda et al. |
| 4,280,129 A | 7/1981 | Wells |
| 4,450,431 A | 5/1984 | Hochstein |
| 4,588,978 A | 5/1986 | Allen |
| 5,027,709 A | 7/1991 | Slagle |
| 5,033,295 A | 7/1991 | Schmid et al. |
| 5,034,658 A | 7/1991 | Hiering et al. |
| 5,053,774 A | 10/1991 | Schuermann et al. |
| 5,070,293 A | 12/1991 | Ishii et al. |
| 5,118,997 A | 6/1992 | El-Hamamsy |
| 5,216,402 A | 6/1993 | Carosa |
| 5,229,652 A | 7/1993 | Hough |
| 5,287,112 A | 2/1994 | Schuermann |
| 5,341,083 A | 8/1994 | Klontz et al. |
| 5,367,242 A | 11/1994 | Hulman |
| 5,374,930 A | 12/1994 | Schuermann |
| 5,408,209 A | 4/1995 | Tanzer et al. |
| 5,437,057 A | 7/1995 | Richley et al. |
| 5,455,467 A | 10/1995 | Young et al. |
| 5,493,691 A | 2/1996 | Barrett |
| 5,522,856 A | 6/1996 | Reineman |
| 5,528,113 A | 6/1996 | Boys et al. |
| 5,541,604 A | 7/1996 | Meier |
| 5,550,452 A | 8/1996 | Shirai et al. |
| 5,565,763 A | 10/1996 | Arrendale et al. |
| 5,630,835 A | 5/1997 | Brownlee |
| 5,697,956 A | 12/1997 | Bornzin |
| 5,703,461 A | 12/1997 | Minoshima et al. |
| 5,703,573 A | 12/1997 | Fujimoto et al. |
| 5,710,413 A | 1/1998 | King et al. |
| 5,742,471 A | 4/1998 | Barbee, Jr. et al. |
| 5,821,728 A | 10/1998 | Sshwind |
| 5,821,731 A | 10/1998 | Kuki et al. |
| 5,864,323 A | 1/1999 | Berthon |
| 5,898,579 A | 4/1999 | Boys et al. |
| 5,903,134 A | 5/1999 | Takeuchi |
| 5,923,544 A | 7/1999 | Urano |
| 5,940,509 A | 8/1999 | Jovanovich et al. |
| 5,957,956 A | 9/1999 | Kroll et al. |
| 5,959,245 A | 9/1999 | Moe et al. |
| 5,986,895 A | 11/1999 | Stewart et al. |
| 5,993,996 A | 11/1999 | Firsich |
| 5,999,308 A | 12/1999 | Nelson et al. |
| 6,012,659 A | 1/2000 | Nakazawa et al. |
| 6,047,214 A | 4/2000 | Mueller et al. |
| 6,066,163 A | 5/2000 | John |
| 6,067,473 A | 5/2000 | Greeninger et al. |
| 6,108,579 A | 8/2000 | Snell et al. |
| 6,127,799 A | 10/2000 | Krishnan |
| 6,176,433 B1 | 1/2001 | Uesaka et al. |
| 6,184,651 B1 | 2/2001 | Fernandez et al. |
| 6,207,887 B1 | 3/2001 | Bass et al. |
| 6,232,841 B1 | 5/2001 | Bartlett et al. |
| 6,238,387 B1 | 5/2001 | Miller, III |
| 6,252,762 B1 | 6/2001 | Amatucci |
| 6,436,299 B1 | 8/2002 | Baarman et al. |
| 6,450,946 B1 | 9/2002 | Forsell |
| 6,452,465 B1 | 9/2002 | Brown et al. |
| 6,459,218 B2 | 10/2002 | Boys et al. |
| 6,473,028 B1 | 10/2002 | Luc |
| 6,483,202 B1 | 11/2002 | Boys |
| 6,515,878 B1 | 2/2003 | Meins et al. |
| 6,535,133 B2 | 3/2003 | Gohara |
| 6,561,975 B1 | 5/2003 | Pool et al. |
| 6,563,425 B2 | 5/2003 | Nicholson et al. |
| 6,597,076 B2 | 7/2003 | Scheible et al. |
| 6,609,023 B1 | 8/2003 | Fischell et al. |
| 6,631,072 B1 | 10/2003 | Paul et al. |
| 6,650,227 B1 | 11/2003 | Bradin |
| 6,664,770 B1 | 12/2003 | Bartels |
| 6,673,250 B2 | 1/2004 | Kuennen et al. |
| 6,683,256 B2 | 1/2004 | Kao |
| 6,696,647 B2 | 2/2004 | Ono et al. |
| 6,703,921 B1 | 3/2004 | Wuidart et al. |
| 6,731,071 B2 | 5/2004 | Baarman |
| 6,749,119 B2 | 6/2004 | Scheible et al. |
| 6,772,011 B2 | 8/2004 | Dolgin |
| 6,798,716 B1 | 9/2004 | Charych |
| 6,803,744 B1 | 10/2004 | Sabo |
| 6,806,649 B2 | 10/2004 | Mollema et al. |
| 6,812,645 B2 | 11/2004 | Baarman |
| 6,825,620 B2 | 11/2004 | Kuennen et al. |
| 6,831,417 B2 | 12/2004 | Baarman |
| 6,839,035 B1 | 1/2005 | Addonisio et al. |
| 6,844,702 B2 | 1/2005 | Giannopoulos et al. |
| 6,856,291 B2 | 2/2005 | Mickle et al. |
| 6,858,970 B2 | 2/2005 | Malkin et al. |
| 6,906,495 B2 | 6/2005 | Cheng et al. |
| 6,917,163 B2 | 7/2005 | Baarman |
| 6,917,431 B2 | 7/2005 | Soljacic et al. |
| 6,937,130 B2 | 8/2005 | Scheible et al. |
| 6,960,968 B2 | 11/2005 | Odendaal et al. |
| 6,961,619 B2 | 11/2005 | Casey |
| 6,967,462 B1 | 11/2005 | Landis |
| 6,975,198 B2 | 12/2005 | Baarman |
| 6,988,026 B2 | 1/2006 | Breed et al. |
| 7,027,311 B2 | 4/2006 | Vanderelli et al. |
| 7,035,076 B1 | 4/2006 | Stevenson |
| 7,042,196 B2 | 5/2006 | Ka-Lai et al. |
| 7,069,064 B2 | 6/2006 | Govorgian et al. |
| 7,084,605 B2 | 8/2006 | Mickle et al. |
| 7,116,200 B2 | 10/2006 | Baarman et al. |
| 7,118,240 B2 | 10/2006 | Baarman et al. |
| 7,126,450 B2 | 10/2006 | Baarman et al. |
| 7,127,293 B2 | 10/2006 | MacDonald |
| 7,132,918 B2 | 11/2006 | Baarman et al. |
| 7,147,604 B1 | 12/2006 | Allen et al. |
| 7,180,248 B2 | 2/2007 | Kuennen et al. |
| 7,191,007 B2 | 3/2007 | Desai et al. |
| 7,193,418 B2 | 3/2007 | Freytag |
| D541,322 S | 4/2007 | Garrett et al. |
| 7,212,414 B2 | 5/2007 | Baarman |
| 7,233,137 B2 | 6/2007 | Nakamura et al. |
| D545,855 S | 7/2007 | Garrett et al. |
| 7,239,110 B2 | 7/2007 | Cheng et al. |
| 7,248,017 B2 | 7/2007 | Cheng et al. |
| 7,251,527 B2 | 7/2007 | Lyden |
| 7,288,918 B2 | 10/2007 | DiStefano |
| 7,340,304 B2 | 3/2008 | MacDonald |
| 7,375,492 B2 | 5/2008 | Calhoon et al. |
| 7,375,493 B2 | 5/2008 | Calhoon et al. |
| 7,378,817 B2 | 5/2008 | Calhoon et al. |
| 7,382,636 B2 | 6/2008 | Baarman et al. |
| 7,385,357 B2 | 6/2008 | Kuennen et al. |
| 7,443,135 B2 | 10/2008 | Cho |

(56) References Cited

U.S. PATENT DOCUMENTS

| | | |
|---|---|---|
| 7,462,951 B1 | 12/2008 | Baarman |
| 7,466,213 B2 | 12/2008 | Lobl et al. |
| 7,471,062 B2 | 12/2008 | Bruning |
| 7,474,058 B2 | 1/2009 | Baarman |
| 7,492,247 B2 | 2/2009 | Schmidt et al. |
| 7,514,818 B2 | 4/2009 | Abe et al. |
| 7,518,267 B2 | 4/2009 | Baarman |
| 7,521,890 B2 | 4/2009 | Lee et al. |
| 7,525,283 B2 | 4/2009 | Cheng et al. |
| 7,545,337 B2 | 6/2009 | Guenther |
| 7,554,316 B2 | 6/2009 | Stevens et al. |
| 7,599,743 B2 | 10/2009 | Hassler, Jr. et al. |
| 7,615,936 B2 | 11/2009 | Baarman et al. |
| 7,639,514 B2 | 12/2009 | Baarman |
| 7,741,734 B2 | 6/2010 | Joannopoulos et al. |
| 7,795,708 B2 | 9/2010 | Katti |
| 7,825,543 B2 | 11/2010 | Karalis et al. |
| 7,825,544 B2 | 11/2010 | Jansen et al. |
| 7,835,417 B2 | 11/2010 | Heideman et al. |
| 7,843,288 B2 | 11/2010 | Lee et al. |
| 7,844,306 B2 | 11/2010 | Shearer et al. |
| 7,863,859 B2 | 1/2011 | Soar |
| 7,880,337 B2 | 2/2011 | Farkas |
| 7,884,697 B2 | 2/2011 | Wei et al. |
| 7,885,050 B2 | 2/2011 | Lee |
| 7,919,886 B2 | 4/2011 | Tanaka |
| 7,923,870 B2 | 4/2011 | Jin |
| 7,932,798 B2 | 4/2011 | Tolle et al. |
| 7,948,209 B2 | 5/2011 | Jung |
| 7,952,322 B2 | 5/2011 | Partovi et al. |
| 7,963,941 B2 | 6/2011 | Wilk |
| 7,969,045 B2 | 6/2011 | Schmidt et al. |
| 7,994,880 B2 | 8/2011 | Chen et al. |
| 7,999,506 B1 | 8/2011 | Hollar et al. |
| 8,022,576 B2 | 9/2011 | Joannopoulos et al. |
| 8,035,255 B2 | 10/2011 | Kurs et al. |
| 8,076,800 B2 | 12/2011 | Joannopoulos et al. |
| 8,076,801 B2 | 12/2011 | Karalis et al. |
| 8,084,889 B2 | 12/2011 | Joannopoulos et al. |
| 8,097,983 B2 | 1/2012 | Karalis et al. |
| 8,106,539 B2 | 1/2012 | Schatz et al. |
| 8,115,448 B2 | 2/2012 | John |
| 8,131,378 B2 | 3/2012 | Greenberg et al. |
| 8,178,995 B2 | 5/2012 | Amano et al. |
| 8,193,769 B2 | 6/2012 | Azancot et al. |
| 8,212,414 B2 | 7/2012 | Howard et al. |
| 8,260,200 B2 | 9/2012 | Shimizu et al. |
| 8,304,935 B2 | 11/2012 | Karalis et al. |
| 8,324,759 B2 | 12/2012 | Karalis et al. |
| 8,334,620 B2 | 12/2012 | Park et al. |
| 8,362,651 B2 | 1/2013 | Hamam et al. |
| 8,395,282 B2 | 3/2013 | Joannopoulos et al. |
| 8,395,283 B2 | 3/2013 | Joannopoulos et al. |
| 8,400,017 B2 | 3/2013 | Kurs et al. |
| 8,400,018 B2 | 3/2013 | Joannopoulos et al. |
| 8,400,019 B2 | 3/2013 | Joannopoulos et al. |
| 8,400,020 B2 | 3/2013 | Joannopoulos et al. |
| 8,400,021 B2 | 3/2013 | Joannopoulos et al. |
| 8,400,022 B2 | 3/2013 | Joannopoulos et al. |
| 8,400,023 B2 | 3/2013 | Joannopoulos et al. |
| 8,400,024 B2 | 3/2013 | Joannopoulos et al. |
| 8,410,636 B2 | 4/2013 | Kurs et al. |
| 8,441,154 B2 | 5/2013 | Karalis et al. |
| 8,457,547 B2 | 6/2013 | Meskens |
| 8,461,719 B2 | 6/2013 | Kesler et al. |
| 8,461,720 B2 | 6/2013 | Kurs et al. |
| 8,461,721 B2 | 6/2013 | Karalis et al. |
| 8,461,722 B2 | 6/2013 | Kurs et al. |
| 8,461,817 B2 | 6/2013 | Martin et al. |
| 8,466,583 B2 | 6/2013 | Karalis et al. |
| 8,471,410 B2 | 6/2013 | Karalis et al. |
| 8,476,788 B2 | 7/2013 | Karalis et al. |
| 8,482,157 B2 | 7/2013 | Cook et al. |
| 8,482,158 B2 | 7/2013 | Kurs et al. |
| 8,487,480 B1 | 7/2013 | Kesler et al. |
| 8,497,601 B2 | 7/2013 | Hall et al. |
| 8,552,592 B2 | 10/2013 | Schatz et al. |
| 8,569,914 B2 | 10/2013 | Karalis et al. |
| 8,587,153 B2 | 11/2013 | Schatz et al. |
| 8,587,155 B2 | 11/2013 | Giler et al. |
| 8,598,743 B2 | 12/2013 | Hall et al. |
| 8,618,696 B2 | 12/2013 | Karalis et al. |
| 8,629,578 B2 | 1/2014 | Kurs et al. |
| 8,643,326 B2 | 2/2014 | Campanella et al. |
| 2002/0032471 A1 | 3/2002 | Loftin et al. |
| 2002/0105343 A1 | 8/2002 | Scheible et al. |
| 2002/0118004 A1 | 8/2002 | Scheible et al. |
| 2002/0130642 A1 | 9/2002 | Ettes et al. |
| 2002/0167294 A1 | 11/2002 | Odaohhara |
| 2003/0038641 A1 | 2/2003 | Scheible |
| 2003/0062794 A1 | 4/2003 | Scheible et al. |
| 2003/0062980 A1 | 4/2003 | Scheible et al. |
| 2003/0071034 A1 | 4/2003 | Thompson et al. |
| 2003/0124050 A1 | 7/2003 | Yadav et al. |
| 2003/0126948 A1 | 7/2003 | Yadav et al. |
| 2003/0160590 A1 | 8/2003 | Schaefer et al. |
| 2003/0199778 A1 | 10/2003 | Mickle et al. |
| 2003/0214255 A1 | 11/2003 | Baarman et al. |
| 2004/0000974 A1 | 1/2004 | Odenaal et al. |
| 2004/0026998 A1 | 2/2004 | Henriott et al. |
| 2004/0100338 A1 | 5/2004 | Clark |
| 2004/0113847 A1 | 6/2004 | Qi et al. |
| 2004/0130425 A1 | 7/2004 | Dayan et al. |
| 2004/0130915 A1 | 7/2004 | Baarman |
| 2004/0130916 A1 | 7/2004 | Baarman |
| 2004/0142733 A1 | 7/2004 | Parise |
| 2004/0150934 A1 | 8/2004 | Baarman |
| 2004/0189246 A1 | 9/2004 | Bulai et al. |
| 2004/0201361 A1 | 10/2004 | Koh et al. |
| 2004/0222751 A1 | 11/2004 | Mollema et al. |
| 2004/0227057 A1 | 11/2004 | Tuominen et al. |
| 2004/0232845 A1 | 11/2004 | Baarman |
| 2004/0233043 A1 | 11/2004 | Yazawa et al. |
| 2004/0267501 A1 | 12/2004 | Freed et al. |
| 2005/0007067 A1 | 1/2005 | Baarman et al. |
| 2005/0021134 A1 | 1/2005 | Opie |
| 2005/0027192 A1 | 2/2005 | Govari et al. |
| 2005/0033382 A1 | 2/2005 | Single |
| 2005/0085873 A1 | 4/2005 | Gord et al. |
| 2005/0093475 A1 | 5/2005 | Kuennen et al. |
| 2005/0104064 A1 | 5/2005 | Hegarty et al. |
| 2005/0104453 A1 | 5/2005 | Vanderelli et al. |
| 2005/0116650 A1 | 6/2005 | Baarman |
| 2005/0116683 A1 | 6/2005 | Cheng et al. |
| 2005/0122058 A1 | 6/2005 | Baarman et al. |
| 2005/0122059 A1 | 6/2005 | Baarman et al. |
| 2005/0125093 A1 | 6/2005 | Kikuchi et al. |
| 2005/0127849 A1 | 6/2005 | Baarman et al. |
| 2005/0127850 A1 | 6/2005 | Baarman et al. |
| 2005/0127866 A1 | 6/2005 | Hamilton et al. |
| 2005/0135122 A1 | 6/2005 | Cheng et al. |
| 2005/0140482 A1 | 6/2005 | Cheng et al. |
| 2005/0151511 A1 | 7/2005 | Chary |
| 2005/0156560 A1 | 7/2005 | Shimaoka et al. |
| 2005/0189945 A1 | 9/2005 | Reiderman |
| 2005/0194926 A1 | 9/2005 | DiStefano |
| 2005/0253152 A1 | 11/2005 | Klimov et al. |
| 2005/0288739 A1 | 12/2005 | Hassler, Jr. et al. |
| 2005/0288740 A1 | 12/2005 | Hassler, Jr. et al. |
| 2005/0288741 A1 | 12/2005 | Hassler, Jr. et al. |
| 2005/0288742 A1 | 12/2005 | Giordano et al. |
| 2006/0001509 A1 | 1/2006 | Gibbs |
| 2006/0010902 A1 | 1/2006 | Trinh et al. |
| 2006/0022636 A1 | 2/2006 | Xian et al. |
| 2006/0053296 A1 | 3/2006 | Busboom et al. |
| 2006/0061323 A1 | 3/2006 | Cheng et al. |
| 2006/0066443 A1 | 3/2006 | Hall |
| 2006/0090956 A1 | 5/2006 | Peshkovskiy et al. |
| 2006/0132045 A1 | 6/2006 | Baarman |
| 2006/0164866 A1 | 7/2006 | Vanderelli et al. |
| 2006/0181242 A1 | 8/2006 | Freed et al. |
| 2006/0184209 A1 | 8/2006 | John et al. |
| 2006/0184210 A1 | 8/2006 | Singhal et al. |
| 2006/0185809 A1 | 8/2006 | Elfrink et al. |

(56) References Cited

U.S. PATENT DOCUMENTS

| | | |
|---|---|---|
| 2006/0199620 A1 | 9/2006 | Greene et al. |
| 2006/0202665 A1 | 9/2006 | Hsu |
| 2006/0205381 A1 | 9/2006 | Beart et al. |
| 2006/0214626 A1 | 9/2006 | Nilson et al. |
| 2006/0219448 A1 | 10/2006 | Grieve et al. |
| 2006/0238365 A1 | 10/2006 | Vecchione et al. |
| 2006/0270440 A1 | 11/2006 | Shearer et al. |
| 2006/0281435 A1 | 12/2006 | Shearer et al. |
| 2007/0010295 A1 | 1/2007 | Greene et al. |
| 2007/0013483 A1 | 1/2007 | Stewart |
| 2007/0016089 A1 | 1/2007 | Fischell et al. |
| 2007/0021140 A1 | 1/2007 | Keyes, IV et al. |
| 2007/0024246 A1 | 2/2007 | Flaugher |
| 2007/0064406 A1 | 3/2007 | Beart |
| 2007/0069687 A1 | 3/2007 | Suzuki |
| 2007/0096875 A1 | 5/2007 | Waterhouse et al. |
| 2007/0105429 A1 | 5/2007 | Kohl et al. |
| 2007/0117596 A1 | 5/2007 | Greene et al. |
| 2007/0126650 A1 | 6/2007 | Guenther |
| 2007/0145830 A1 | 6/2007 | Lee et al. |
| 2007/0164839 A1 | 7/2007 | Naito |
| 2007/0171681 A1 | 7/2007 | Baarman |
| 2007/0176840 A1 | 8/2007 | Pristas et al. |
| 2007/0178945 A1 | 8/2007 | Cook et al. |
| 2007/0182367 A1 | 8/2007 | Partovi |
| 2007/0188284 A1* | 8/2007 | Dobbs ............... A61B 6/56 336/120 |
| 2007/0208263 A1 | 9/2007 | John et al. |
| 2007/0222542 A1 | 9/2007 | Joannopoulos et al. |
| 2007/0257636 A1 | 11/2007 | Phillips et al. |
| 2007/0267918 A1 | 11/2007 | Gyland |
| 2007/0276538 A1 | 11/2007 | Kjellsson et al. |
| 2008/0012569 A1 | 1/2008 | Hall et al. |
| 2008/0014897 A1 | 1/2008 | Cook et al. |
| 2008/0030415 A1 | 2/2008 | Homan et al. |
| 2008/0036588 A1 | 2/2008 | Iverson et al. |
| 2008/0047727 A1 | 2/2008 | Sexton et al. |
| 2008/0051854 A1 | 2/2008 | Bulkes et al. |
| 2008/0067874 A1 | 3/2008 | Tseng |
| 2008/0132909 A1 | 6/2008 | Jascob et al. |
| 2008/0154331 A1 | 6/2008 | John et al. |
| 2008/0176521 A1 | 7/2008 | Singh et al. |
| 2008/0191638 A1 | 8/2008 | Kuennen et al. |
| 2008/0197710 A1 | 8/2008 | Kreitz et al. |
| 2008/0197802 A1 | 8/2008 | Onishi et al. |
| 2008/0211320 A1 | 9/2008 | Cook et al. |
| 2008/0238364 A1 | 10/2008 | Weber et al. |
| 2008/0255901 A1 | 10/2008 | Carroll et al. |
| 2008/0265684 A1 | 10/2008 | Farkas |
| 2008/0266748 A1 | 10/2008 | Lee |
| 2008/0272860 A1 | 11/2008 | Pance |
| 2008/0273242 A1 | 11/2008 | Woodgate et al. |
| 2008/0278264 A1 | 11/2008 | Karalis et al. |
| 2008/0291277 A1 | 11/2008 | Jacobsen et al. |
| 2008/0300657 A1 | 12/2008 | Stultz |
| 2008/0300660 A1 | 12/2008 | John |
| 2009/0010028 A1 | 1/2009 | Baarmen et al. |
| 2009/0015075 A1 | 1/2009 | Cook et al. |
| 2009/0033280 A1 | 2/2009 | Choi et al. |
| 2009/0033564 A1 | 2/2009 | Cook et al. |
| 2009/0038623 A1 | 2/2009 | Farbarik et al. |
| 2009/0045772 A1 | 2/2009 | Cook et al. |
| 2009/0051224 A1 | 2/2009 | Cook et al. |
| 2009/0058189 A1 | 3/2009 | Cook et al. |
| 2009/0058361 A1 | 3/2009 | John |
| 2009/0067198 A1 | 3/2009 | Graham et al. |
| 2009/0072627 A1 | 3/2009 | Cook et al. |
| 2009/0072628 A1 | 3/2009 | Cook et al. |
| 2009/0072629 A1 | 3/2009 | Cook et al. |
| 2009/0072782 A1 | 3/2009 | Randall |
| 2009/0079268 A1 | 3/2009 | Cook et al. |
| 2009/0079387 A1 | 3/2009 | Jin et al. |
| 2009/0085408 A1 | 4/2009 | Bruhn |
| 2009/0085706 A1 | 4/2009 | Baarman et al. |
| 2009/0096413 A1 | 4/2009 | Patovi et al. |
| 2009/0102292 A1 | 4/2009 | Cook et al. |
| 2009/0108679 A1 | 4/2009 | Porwal |
| 2009/0108997 A1 | 4/2009 | Patterson et al. |
| 2009/0115628 A1 | 5/2009 | Dicks et al. |
| 2009/0127937 A1 | 5/2009 | Widmer et al. |
| 2009/0134712 A1 | 5/2009 | Cook et al. |
| 2009/0146892 A1 | 6/2009 | Shimizu et al. |
| 2009/0153273 A1 | 6/2009 | Chen |
| 2009/0160261 A1 | 6/2009 | Elo |
| 2009/0161078 A1 | 6/2009 | Wu et al. |
| 2009/0167449 A1 | 7/2009 | Cook et al. |
| 2009/0174263 A1 | 7/2009 | Baarman et al. |
| 2009/0179502 A1 | 7/2009 | Cook et al. |
| 2009/0188396 A1 | 7/2009 | Hofmann et al. |
| 2009/0189458 A1 | 7/2009 | Kawasaki |
| 2009/0195332 A1 | 8/2009 | Joannopoulos et al. |
| 2009/0195333 A1 | 8/2009 | Joannopoulos et al. |
| 2009/0212636 A1 | 8/2009 | Cook et al. |
| 2009/0213028 A1 | 8/2009 | Cook et al. |
| 2009/0218884 A1 | 9/2009 | Soar |
| 2009/0224608 A1 | 9/2009 | Cook et al. |
| 2009/0224609 A1 | 9/2009 | Cook et al. |
| 2009/0224723 A1 | 9/2009 | Tanabe |
| 2009/0224856 A1 | 9/2009 | Karalis et al. |
| 2009/0230777 A1 | 9/2009 | Baarman et al. |
| 2009/0237194 A1 | 9/2009 | Waffenschmidt et al. |
| 2009/0243394 A1 | 10/2009 | Levine |
| 2009/0243397 A1 | 10/2009 | Cook et al. |
| 2009/0251008 A1 | 10/2009 | Sugaya |
| 2009/0261778 A1 | 10/2009 | Kook |
| 2009/0267558 A1 | 10/2009 | Jung |
| 2009/0267709 A1 | 10/2009 | Joannopoulos et al. |
| 2009/0267710 A1 | 10/2009 | Joannopoulos et al. |
| 2009/0271047 A1 | 10/2009 | Wakamatsu |
| 2009/0271048 A1 | 10/2009 | Wakamatsu |
| 2009/0273242 A1 | 11/2009 | Cook |
| 2009/0273318 A1 | 11/2009 | Rondoni et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284218 A1 | 11/2009 | Mohammadian et al. |
| 2009/0284220 A1 | 11/2009 | Toncich et al. |
| 2009/0284227 A1 | 11/2009 | Mohammadian et al. |
| 2009/0284245 A1 | 11/2009 | Kirby et al. |
| 2009/0284369 A1 | 11/2009 | Toncich et al. |
| 2009/0286470 A1 | 11/2009 | Mohammadian et al. |
| 2009/0286475 A1 | 11/2009 | Toncich et al. |
| 2009/0286476 A1 | 11/2009 | Toncich et al. |
| 2009/0289595 A1 | 11/2009 | Chen et al. |
| 2009/0299918 A1 | 12/2009 | Cook et al. |
| 2009/0308933 A1 | 12/2009 | Osada |
| 2009/0322158 A1 | 12/2009 | Stevens et al. |
| 2009/0322280 A1 | 12/2009 | Kamijo et al. |
| 2010/0015918 A1 | 1/2010 | Liu et al. |
| 2010/0017249 A1 | 1/2010 | Fincham et al. |
| 2010/0033021 A1 | 2/2010 | Bennett |
| 2010/0034238 A1 | 2/2010 | Bennett |
| 2010/0036773 A1 | 2/2010 | Bennett |
| 2010/0038970 A1 | 2/2010 | Cook et al. |
| 2010/0045114 A1 | 2/2010 | Sample et al. |
| 2010/0052431 A1 | 3/2010 | Mita |
| 2010/0052811 A1 | 3/2010 | Smith et al. |
| 2010/0060077 A1 | 3/2010 | Paulus et al. |
| 2010/0065352 A1 | 3/2010 | Ichikawa |
| 2010/0066349 A1 | 3/2010 | Lin et al. |
| 2010/0076524 A1 | 3/2010 | Forsberg et al. |
| 2010/0081379 A1 | 4/2010 | Cooper et al. |
| 2010/0094381 A1 | 4/2010 | Kim et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0104031 A1 | 4/2010 | Lacour |
| 2010/0109443 A1 | 5/2010 | Cook et al. |
| 2010/0109445 A1 | 5/2010 | Kurs et al. |
| 2010/0109604 A1 | 5/2010 | Boys et al. |
| 2010/0115474 A1 | 5/2010 | Takada et al. |
| 2010/0117454 A1 | 5/2010 | Cook et al. |
| 2010/0117455 A1 | 5/2010 | Joannopoulos et al. |

(56) References Cited

U.S. PATENT DOCUMENTS

| | | |
|---|---|---|
| 2010/0117456 A1 | 5/2010 | Karalis et al. |
| 2010/0117596 A1 | 5/2010 | Cook et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0123452 A1 | 5/2010 | Amano et al. |
| 2010/0123530 A1 | 5/2010 | Park et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0127660 A1 | 5/2010 | Cook et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0141042 A1 | 6/2010 | Kesler et al. |
| 2010/0148589 A1 | 6/2010 | Hamam et al. |
| 2010/0148723 A1 | 6/2010 | Cook et al. |
| 2010/0151808 A1 | 6/2010 | Toncich et al. |
| 2010/0156346 A1 | 6/2010 | Takada et al. |
| 2010/0156355 A1 | 6/2010 | Bauerle et al. |
| 2010/0156570 A1 | 6/2010 | Hong et al. |
| 2010/0164295 A1 | 7/2010 | Ichikawa et al. |
| 2010/0164296 A1 | 7/2010 | Kurs |
| 2010/0164297 A1 | 7/2010 | Kurs et al. |
| 2010/0164298 A1 | 7/2010 | Karalis et al. |
| 2010/0171368 A1 | 7/2010 | Schatz et al. |
| 2010/0171370 A1 | 7/2010 | Karalis et al. |
| 2010/0179384 A1 | 7/2010 | Hoeg et al. |
| 2010/0181843 A1 | 7/2010 | Schatz et al. |
| 2010/0181844 A1 | 7/2010 | Karalis et al. |
| 2010/0181845 A1 | 7/2010 | Fiorello et al. |
| 2010/0181961 A1 | 7/2010 | Novak et al. |
| 2010/0181964 A1 | 7/2010 | Huggins et al. |
| 2010/0184371 A1 | 7/2010 | Cook et al. |
| 2010/0187911 A1 | 7/2010 | Joannopoulos et al. |
| 2010/0187913 A1 | 7/2010 | Sample |
| 2010/0188183 A1 | 7/2010 | Shpiro |
| 2010/0190435 A1 | 7/2010 | Cook et al. |
| 2010/0190436 A1 | 7/2010 | Cook et al. |
| 2010/0194206 A1 | 8/2010 | Burdo et al. |
| 2010/0194207 A1 | 8/2010 | Graham |
| 2010/0194334 A1 | 8/2010 | Kirby et al. |
| 2010/0194335 A1 | 8/2010 | Kirby et al. |
| 2010/0201189 A1 | 8/2010 | Kirby et al. |
| 2010/0201201 A1 | 8/2010 | Mobarhan et al. |
| 2010/0201202 A1 | 8/2010 | Kirby et al. |
| 2010/0201203 A1 | 8/2010 | Schatz et al. |
| 2010/0201204 A1 | 8/2010 | Sakoda et al. |
| 2010/0201205 A1 | 8/2010 | Karalis et al. |
| 2010/0201310 A1 | 8/2010 | Vorenkamp et al. |
| 2010/0201312 A1 | 8/2010 | Kirby et al. |
| 2010/0201313 A1 | 8/2010 | Vorenkamp et al. |
| 2010/0201316 A1 | 8/2010 | Takada et al. |
| 2010/0201513 A1 | 8/2010 | Vorenkamp et al. |
| 2010/0207458 A1 | 8/2010 | Joannopoulos et al. |
| 2010/0210233 A1 | 8/2010 | Cook et al. |
| 2010/0213770 A1 | 8/2010 | Kikuchi |
| 2010/0213895 A1 | 8/2010 | Keating et al. |
| 2010/0217553 A1 | 8/2010 | Von Novak et al. |
| 2010/0219694 A1 | 9/2010 | Kurs et al. |
| 2010/0219695 A1 | 9/2010 | Komiyama et al. |
| 2010/0219696 A1 | 9/2010 | Kojima |
| 2010/0222010 A1 | 9/2010 | Ozaki et al. |
| 2010/0225175 A1 | 9/2010 | Karalis et al. |
| 2010/0225270 A1 | 9/2010 | Jacobs et al. |
| 2010/0225271 A1 | 9/2010 | Oyobe et al. |
| 2010/0225272 A1 | 9/2010 | Kirby et al. |
| 2010/0231053 A1 | 9/2010 | Karalis et al. |
| 2010/0231163 A1 | 9/2010 | Mashinsky |
| 2010/0231340 A1 | 9/2010 | Fiorello et al. |
| 2010/0234922 A1 | 9/2010 | Forsell |
| 2010/0235006 A1 | 9/2010 | Brown |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0237709 A1 | 9/2010 | Hall et al. |
| 2010/0244576 A1 | 9/2010 | Hillan et al. |
| 2010/0244577 A1 | 9/2010 | Shimokawa |
| 2010/0244578 A1 | 9/2010 | Yoshikawa |
| 2010/0244579 A1 | 9/2010 | Sogabe et al. |
| 2010/0244580 A1 | 9/2010 | Uchida et al. |
| 2010/0244581 A1 | 9/2010 | Uchida |
| 2010/0244582 A1 | 9/2010 | Yoshikawa |
| 2010/0244583 A1 | 9/2010 | Shimokawa |
| 2010/0244767 A1 | 9/2010 | Turner et al. |
| 2010/0244839 A1 | 9/2010 | Yoshikawa |
| 2010/0248622 A1 | 9/2010 | Kirby et al. |
| 2010/0253152 A1 | 10/2010 | Karalis et al. |
| 2010/0253281 A1 | 10/2010 | Li |
| 2010/0256481 A1 | 10/2010 | Mareci et al. |
| 2010/0256831 A1 | 10/2010 | Abramo et al. |
| 2010/0259108 A1 | 10/2010 | Giler et al. |
| 2010/0259109 A1 | 10/2010 | Sato |
| 2010/0259110 A1 | 10/2010 | Kurs et al. |
| 2010/0264745 A1 | 10/2010 | Karalis et al. |
| 2010/0264746 A1 | 10/2010 | Kazama et al. |
| 2010/0264747 A1 | 10/2010 | Hall et al. |
| 2010/0276995 A1 | 11/2010 | Marzetta et al. |
| 2010/0277003 A1 | 11/2010 | Von Novak et al. |
| 2010/0277004 A1 | 11/2010 | Suzuki et al. |
| 2010/0277005 A1 | 11/2010 | Karalis et al. |
| 2010/0277120 A1 | 11/2010 | Cook et al. |
| 2010/0277121 A1 | 11/2010 | Hall et al. |
| 2010/0289341 A1 | 11/2010 | Ozaki et al. |
| 2010/0289449 A1 | 11/2010 | Elo |
| 2010/0295505 A1 | 11/2010 | Jung et al. |
| 2010/0295506 A1 | 11/2010 | Ichikawa |
| 2010/0308939 A1 | 12/2010 | Kurs |
| 2010/0314946 A1 | 12/2010 | Budde et al. |
| 2010/0327660 A1 | 12/2010 | Karalis et al. |
| 2010/0327661 A1 | 12/2010 | Karalis et al. |
| 2010/0328044 A1 | 12/2010 | Waffenschmidt et al. |
| 2011/0004269 A1 | 1/2011 | Strother et al. |
| 2011/0012431 A1 | 1/2011 | Karalis et al. |
| 2011/0018361 A1 | 1/2011 | Karalis et al. |
| 2011/0025131 A1 | 2/2011 | Karalis et al. |
| 2011/0031928 A1 | 2/2011 | Soar |
| 2011/0043046 A1 | 2/2011 | Joannopoulos et al. |
| 2011/0043047 A1 | 2/2011 | Karalis et al. |
| 2011/0043048 A1 | 2/2011 | Karalis et al. |
| 2011/0043049 A1 | 2/2011 | Karalis et al. |
| 2011/0049995 A1 | 3/2011 | Hashiguchi |
| 2011/0049996 A1 | 3/2011 | Karalis et al. |
| 2011/0049998 A1 | 3/2011 | Karalis et al. |
| 2011/0074218 A1 | 3/2011 | Karalis et al. |
| 2011/0074346 A1 | 3/2011 | Hall et al. |
| 2011/0074347 A1 | 3/2011 | Karalis et al. |
| 2011/0089895 A1 | 4/2011 | Karalis et al. |
| 2011/0095618 A1 | 4/2011 | Schatz et al. |
| 2011/0115303 A1 | 5/2011 | Baarman et al. |
| 2011/0115431 A1 | 5/2011 | Dunworth et al. |
| 2011/0121920 A1 | 5/2011 | Kurs et al. |
| 2011/0128015 A1 | 6/2011 | Dorairaj et al. |
| 2011/0140544 A1 | 6/2011 | Karalis et al. |
| 2011/0148219 A1 | 6/2011 | Karalis et al. |
| 2011/0162895 A1 | 7/2011 | Karalis et al. |
| 2011/0169339 A1 | 7/2011 | Karalis et al. |
| 2011/0181122 A1 | 7/2011 | Karalis et al. |
| 2011/0193416 A1 | 8/2011 | Campanella et al. |
| 2011/0193419 A1 | 8/2011 | Karalis et al. |
| 2011/0198939 A1 | 8/2011 | Karalis et al. |
| 2011/0215086 A1 | 9/2011 | Yeh |
| 2011/0221278 A1 | 9/2011 | Karalis et al. |
| 2011/0227528 A1 | 9/2011 | Karalis et al. |
| 2011/0227530 A1 | 9/2011 | Karalis et al. |
| 2011/0241618 A1 | 10/2011 | Karalis et al. |
| 2011/0248573 A1 | 10/2011 | Kanno et al. |
| 2011/0254377 A1 | 10/2011 | Wildmer et al. |
| 2011/0254503 A1 | 10/2011 | Widmer et al. |
| 2011/0266878 A9 | 11/2011 | Cook et al. |
| 2011/0278943 A1 | 11/2011 | Eckhoff et al. |
| 2012/0001492 A9 | 1/2012 | Cook et al. |
| 2012/0001593 A1 | 1/2012 | DiGuardo |
| 2012/0007435 A1 | 1/2012 | Sada et al. |

(56) References Cited

U.S. PATENT DOCUMENTS

| | | |
|---|---|---|
| 2012/0007441 A1 | 1/2012 | John et al. |
| 2012/0025602 A1 | 2/2012 | Boys et al. |
| 2012/0032522 A1 | 2/2012 | Schatz et al. |
| 2012/0038525 A1 | 2/2012 | Monsalve Carcelen et al. |
| 2012/0062345 A1 | 3/2012 | Kurs et al. |
| 2012/0068549 A1 | 3/2012 | Karalis et al. |
| 2012/0086284 A1 | 4/2012 | Campanella et al. |
| 2012/0086867 A1 | 4/2012 | Kesler et al. |
| 2012/0091794 A1 | 4/2012 | Campanella et al. |
| 2012/0091795 A1 | 4/2012 | Fiorello et al. |
| 2012/0091796 A1 | 4/2012 | Kesler et al. |
| 2012/0091797 A1 | 4/2012 | Kesler et al. |
| 2012/0091819 A1 | 4/2012 | Kulikowski et al. |
| 2012/0091820 A1 | 4/2012 | Campanella et al. |
| 2012/0091949 A1 | 4/2012 | Campanella et al. |
| 2012/0091950 A1 | 4/2012 | Campanella et al. |
| 2012/0098350 A1 | 4/2012 | Campanella et al. |
| 2012/0112531 A1 | 5/2012 | Kesler et al. |
| 2012/0112532 A1 | 5/2012 | Kesler et al. |
| 2012/0112534 A1 | 5/2012 | Kesler et al. |
| 2012/0112535 A1 | 5/2012 | Karalis et al. |
| 2012/0112536 A1 | 5/2012 | Karalis et al. |
| 2012/0112538 A1 | 5/2012 | Kesler et al. |
| 2012/0112691 A1 | 5/2012 | Kurs et al. |
| 2012/0119569 A1 | 5/2012 | Karalis et al. |
| 2012/0119575 A1 | 5/2012 | Kurs et al. |
| 2012/0119576 A1 | 5/2012 | Kesler et al. |
| 2012/0119698 A1 | 5/2012 | Karalis et al. |
| 2012/0139355 A1 | 6/2012 | Ganem et al. |
| 2012/0146575 A1 | 6/2012 | Armstrong et al. |
| 2012/0153732 A1 | 6/2012 | Kurs et al. |
| 2012/0153733 A1 | 6/2012 | Schatz et al. |
| 2012/0153734 A1 | 6/2012 | Kurs et al. |
| 2012/0153735 A1 | 6/2012 | Karalis et al. |
| 2012/0153736 A1 | 6/2012 | Karalis et al. |
| 2012/0153737 A1 | 6/2012 | Karalis et al. |
| 2012/0153738 A1 | 6/2012 | Karalis et al. |
| 2012/0153893 A1 | 6/2012 | Schatz et al. |
| 2012/0184338 A1 | 7/2012 | Kesler et al. |
| 2012/0206096 A1 | 8/2012 | John |
| 2012/0223573 A1 | 9/2012 | Schatz et al. |
| 2012/0228952 A1 | 9/2012 | Hall et al. |
| 2012/0228953 A1 | 9/2012 | Kesler et al. |
| 2012/0228954 A1 | 9/2012 | Kesler et al. |
| 2012/0235500 A1 | 9/2012 | Ganem et al. |
| 2012/0235501 A1 | 9/2012 | Kesler et al. |
| 2012/0235502 A1 | 9/2012 | Kesler et al. |
| 2012/0235503 A1 | 9/2012 | Kesler et al. |
| 2012/0235504 A1 | 9/2012 | Kesler et al. |
| 2012/0235505 A1 | 9/2012 | Schatz et al. |
| 2012/0235566 A1 | 9/2012 | Karalis et al. |
| 2012/0235567 A1 | 9/2012 | Karalis et al. |
| 2012/0235633 A1 | 9/2012 | Kesler et al. |
| 2012/0235634 A1 | 9/2012 | Hall et al. |
| 2012/0239117 A1 | 9/2012 | Kesler et al. |
| 2012/0242159 A1 | 9/2012 | Lou et al. |
| 2012/0242225 A1 | 9/2012 | Karalis et al. |
| 2012/0248884 A1 | 10/2012 | Karalis et al. |
| 2012/0248886 A1 | 10/2012 | Kesler et al. |
| 2012/0248887 A1 | 10/2012 | Kesler et al. |
| 2012/0248888 A1 | 10/2012 | Kesler et al. |
| 2012/0248981 A1 | 10/2012 | Karalis et al. |
| 2012/0256494 A1 | 10/2012 | Kesler et al. |
| 2012/0267960 A1 | 10/2012 | Low et al. |
| 2012/0280765 A1 | 11/2012 | Kurs et al. |
| 2012/0313449 A1 | 12/2012 | Kurs et al. |
| 2012/0313742 A1 | 12/2012 | Kurs et al. |
| 2013/0002041 A1 | 1/2013 | Hatanaka et al. |
| 2013/0007949 A1 | 1/2013 | Kurs et al. |
| 2013/0020878 A1 | 1/2013 | Karalis et al. |
| 2013/0033118 A1 | 2/2013 | Karalis et al. |
| 2013/0038402 A1 | 2/2013 | Karalis et al. |
| 2013/0057364 A1 | 3/2013 | Kesler et al. |
| 2013/0062966 A1 | 3/2013 | Verghese et al. |
| 2013/0069441 A1 | 3/2013 | Verghese et al. |
| 2013/0069753 A1 | 3/2013 | Kurs et al. |
| 2013/0099587 A1 | 4/2013 | Lou et al. |
| 2013/0154383 A1 | 6/2013 | Kasturi et al. |
| 2013/0154389 A1 | 6/2013 | Kurs et al. |
| 2013/0159956 A1 | 6/2013 | Verghese et al. |
| 2013/0175874 A1 | 7/2013 | Lou et al. |
| 2013/0175875 A1 | 7/2013 | Kurs et al. |
| 2013/0200716 A1 | 8/2013 | Kesler et al. |
| 2013/0200721 A1 | 8/2013 | Kurs et al. |
| 2013/0221744 A1 | 8/2013 | Hall et al. |
| 2013/0278073 A1 | 10/2013 | Kurs et al. |
| 2013/0278074 A1 | 10/2013 | Kurs et al. |
| 2013/0278075 A1 | 10/2013 | Kurs et al. |
| 2013/0300353 A1 | 11/2013 | Kurs et al. |
| 2013/0307349 A1 | 11/2013 | Hall et al. |
| 2013/0320773 A1 | 12/2013 | Schatz et al. |
| 2013/0334892 A1 | 12/2013 | Hall et al. |
| 2014/0002012 A1 | 1/2014 | McCauley et al. |
| 2014/0070764 A1 | 3/2014 | Keeling |
| 2015/0302984 A1 | 10/2015 | Kurs |

FOREIGN PATENT DOCUMENTS

| | | |
|---|---|---|
| CN | 102439669 | 5/2012 |
| CN | 103329397 | 9/2013 |
| DE | 38 24 972 | 1/1989 |
| DE | 100 29147 | 12/2001 |
| DE | 200 16 655 | 3/2002 |
| DE | 102 21 484 | 11/2003 |
| DE | 103 04 584 | 8/2004 |
| DE | 10 2005 036290 | 2/2007 |
| DE | 10 2006 044057 | 4/2008 |
| EP | 1 335 477 | 8/2003 |
| EP | 1 521 206 | 4/2005 |
| EP | 1 524 010 | 4/2005 |
| EP | 2 246 864 | 11/2010 |
| EP | 2 357 716 | 8/2011 |
| EP | 2 669 913 | 12/2013 |
| JP | 02-097005 | 4/1990 |
| JP | 4-265875 | 9/1992 |
| JP | 6-341410 | 12/1994 |
| JP | 9-182323 | 7/1997 |
| JP | 9-298847 | 11/1997 |
| JP | 10-164837 | 6/1998 |
| JP | 11-75329 | 3/1999 |
| JP | 11-188113 | 7/1999 |
| JP | 2001-309580 | 11/2001 |
| JP | 2002-010535 | 1/2002 |
| JP | 2003-179526 | 6/2003 |
| JP | 2004-166459 | 6/2004 |
| JP | 2004-201458 | 7/2004 |
| JP | 2004-229144 | 8/2004 |
| JP | 2005-57444 | 3/2005 |
| JP | 2005-149238 | 6/2005 |
| JP | 2006-074848 | 3/2006 |
| JP | 2007-505480 | 3/2007 |
| JP | 2007-266892 | 10/2007 |
| JP | 2007-537637 | 12/2007 |
| JP | 2008-508842 | 3/2008 |
| JP | 2008-206231 | 9/2008 |
| JP | 2008-206327 | 9/2008 |
| JP | 2011-072074 | 4/2011 |
| JP | 2012-504387 | 2/2012 |
| JP | 2013-543718 | 12/2013 |
| KR | 10-2007-0017804 | 2/2007 |
| KR | 10-2008-0007635 | 1/2008 |
| KR | 10-2009-0122072 | 11/2009 |
| KR | 10-2011-0050920 | 5/2011 |
| SG | 112842 | 7/2005 |
| WO | WO 92/17929 | 10/1992 |
| WO | WO 93/23908 | 11/1993 |
| WO | WO 94/28560 | 12/1994 |
| WO | WO 95/11545 | 4/1995 |
| WO | WO 96/02970 | 2/1996 |
| WO | WO 98/50993 | 11/1998 |
| WO | WO 00/77910 | 12/2000 |
| WO | WO 03/092329 | 11/2003 |
| WO | WO 03/096361 | 11/2003 |
| WO | WO 03/096512 | 11/2003 |

(56) References Cited

FOREIGN PATENT DOCUMENTS

| | | |
|---|---|---|
| WO | WO 2004/015885 | 2/2004 |
| WO | WO 2004/038888 | 5/2004 |
| WO | WO 2004/055654 | 7/2004 |
| WO | WO 2004/073150 | 8/2004 |
| WO | WO 2004/073166 | 8/2004 |
| WO | WO 2004/073176 | 8/2004 |
| WO | WO 2004/073177 | 8/2004 |
| WO | WO 2004/112216 | 12/2004 |
| WO | WO 2005/024865 | 3/2005 |
| WO | WO 2005/060068 | 6/2005 |
| WO | WO 2005/109597 | 11/2005 |
| WO | WO 2005/109598 | 11/2005 |
| WO | WO 2006/011769 | 2/2006 |
| WO | WO 2007/008646 | 1/2007 |
| WO | WO 2007/020583 | 2/2007 |
| WO | WO 2007/042952 | 4/2007 |
| WO | WO 2007/084716 | 7/2007 |
| WO | WO 2007/084717 | 7/2007 |
| WO | WO 2008/094919 | 8/2008 |
| WO | WO 2008/109489 | 9/2008 |
| WO | WO 2008/118178 | 10/2008 |
| WO | WO 2009/009559 | 1/2009 |
| WO | WO 2009/018568 | 2/2009 |
| WO | WO 2009/023155 | 2/2009 |
| WO | WO 2009/023646 | 2/2009 |
| WO | WO 2009/033043 | 3/2009 |
| WO | WO 2009/062438 | 5/2009 |
| WO | WO 2009/070730 | 6/2009 |
| WO | WO 2009/126963 | 10/2009 |
| WO | WO 2009/140506 | 11/2009 |
| WO | WO 2009/149464 | 12/2009 |
| WO | WO 2009/155000 | 12/2009 |
| WO | WO 2010/030977 | 3/2010 |
| WO | WO 2010/036980 | 4/2010 |
| WO | WO 2010/039967 | 4/2010 |
| WO | WO 2010/090538 | 8/2010 |
| WO | WO 2010/090539 | 8/2010 |
| WO | WO 2010/093997 | 8/2010 |
| WO | WO 2010/104569 | 9/2010 |
| WO | WO 2011/061388 | 5/2011 |
| WO | WO 2011/061821 | 5/2011 |
| WO | WO 2011/062827 | 5/2011 |
| WO | WO 2011/112795 | 9/2011 |
| WO | WO 2012/037279 | 3/2012 |
| WO | WO 2012/170278 | 12/2012 |
| WO | WO 2013/013235 | 1/2013 |
| WO | WO 2013/020138 | 2/2013 |
| WO | WO 2013/036947 | 3/2013 |
| WO | WO 2013/059441 | 4/2013 |
| WO | WO 2013/067484 | 5/2013 |
| WO | WO 2013/113017 | 8/2013 |
| WO | WO 2013/142840 | 9/2013 |
| WO | WO 2014/004843 | 1/2014 |

OTHER PUBLICATIONS

"Physics Update, Unwired Energy", *Physics Today*, pp. 26, (Jan. 2007) (See http://arxiv.org/abs/physics/0611063.).
"In pictures: A year in technology", *BBC News*, (Dec. 28, 2007).
"Next Little Thing 2010 Electricity without wires", CNN Money (See money.cnn.com/galleries/2009/smallbusiness/0911/gallery.next_little_thing_2010.smb/) (dated Nov. 30, 2009).
Abe et al. "A Noncontact Charger Using a Resonant Converter with Parallel Capacitor of the Secondary Coil". IEEE, 36(2):444-451, Mar./Apr. 2000.
Ahmadian, M. et al., "Miniature Transmitter for Implantable Micro Systems", *Proceedings of the 25th Annual International Conference of the IEEE EMBS Cancun, Mexico*, pp. 3028-3031 (Sep. 17-21, 2003).
Aoki, T. et al., "Observation of strong coupling between one atom and a monolithic microresonator", Nature, vol. 443:671-674 (2006).
Apneseth et al. "Introducing wireless proximity switches" ABB Review Apr. 2002.

Aristeidis Karalis et al., "Efficient Wireless non-radiative mid-range energy transfer", *Annals of Physics*, vol. 323, pp. 34-48 (2008).
Baker et al., "Feedback Analysis and Design of RF Power Links for Low-Power Bionic Systems," *IEEE Transactions on Biomedical Circuits and Systems*, vol. 1(1):28-38 (Mar. 2007).
Balanis, C.A., "Antenna Theory: Analysis and Design," 3rd Edition, Sections 4.2, 4.3, 5.2, 5.3 (Wiley, New Jersey, 2005).
Berardelli, P., "Outlets Are Out", ScienceNOW Daily News, Science Now, http://sciencenow.sciencemag.org/ cgi/content/full/2006/1114/2, (Nov. 14, 2006) 2 pages.
Biever, C., "Evanescent coupling could power gadgets wirelessly", NewScientistsTech.com, http://www. newscientisttech.com/article.ns?id=dn1 0575&print=true, (Nov. 15, 2006) 2 pages.
Borenstein, S., "Man tries wirelessly boosting batteries", (The Associated Press), USA Today, (Nov. 16, 2006) 1 page.
Borenstein, S., "Man tries wirelessly boosting batteries", AP Science Writer, Boston.com, (See http://www.boston.com/business/technology/articles/2006/11/15/man_tries_wirelessly_b . . . ) (Nov. 15, 2006).
Boyle, A., "Electro-nirvana? Not so fast", MSNBC, http:/lcosmiclog.msnbc.msn.com/_news/2007/06/08/4350760- electro-nirvana-not-so-fast, (Jun. 8, 2007) 1 page.
Budhia, M. et al., "A New IPT Magnetic Coupler for Electric Vehicle Charging Systems", IECON 2010—36th Annual Conference on IEEE Industrial Electronics Society, Glendale, AZ, pp. 2487-2492 (Nov. 7-10, 2010).
Budhia, M. et al., "Development and evaluation of single sided flux couplers for contactless electric vehicle charging", 2011 IEEE Energy Conversion Congress and Exposition (ECCE), Phoenix, AZ, pp. 614-621 (Sep. 17-22, 2011).
Budhia, M. et al.,"Development of a Single-Sided Flux Magnetic Coupler for Electric Vehicle IPT", *IEEE Transactions on Industrial Electronics*, vol. 60:318-328 (Jan. 2013).
Bulkeley, W. M., "MIT Scientists Pave the Way for Wireless Battery Charging", The Wall Street Journal (See http://online.wsj.com/article/SB118123955549228045.html?mod=googlenews_wsj), (Jun. 8, 2007) 2 pages.
Burri et al., "Invention Description", (Feb. 5, 2008).
Cass, S., "Air Power—Wireless data connections are common—now scientists are working on wireless power", Sponsored by IEEE Spectrum, http://spectrum.ieee.org/computing/hardware/air-power, (Nov. 2006) 2 pages.
Castelvecchi, Davide, "The Power of Induction—Cutting the last cord could resonate with our increasingly gadget dependent lives", *Science News Online*, vol. 172, No. 3, Jul. 21, 2007, 6 pages.
Chang, A., "Recharging the Wireless Way—Even physicists forget to recharge their cell phones sometimes.", PC Magazine, ABC News Internet Ventures, (Dec. 12, 2006) 1 page.
Chinaview"Scientists light bulb with 'wireless electricity'",www.Chinaview.cn, http://news.xinhuanet.com/english/2007-06/08/content_6215681.htm,Jun. 2007,1 page.
Cooks, G., "The vision of an MIT physicist: Getting rid of pesky rechargers", Boston.com, (Dec. 11, 2006) 1 page.
Derbyshire, D., "The end of the plug? Scientists invent wireless device that beams electricity through your home", Daily Mail, http://www.dailymail.co.uk/pages/live/articles/technology/technology.html?in_article_id=4 . . . ), (Jun. 7, 2007) 3 pages.
Eisenberg, Anne, "Automatic Recharging, From a Distance", The New York Times, (see www.nytimes.com/2012/03/11/business/built-in-wireless-chargeing-for-electronic-devices.html?_r=0) (published on Mar. 10, 2012).
Esser et al., "A New Approach to Power Supplies for Robots", IEEE, vol. 27(5):872-875, (Sep./Oct. 1991).
Fan, Shanhui et al., "Rate-Equation Analysis of Output Efficiency and Modulation Rate of Photomic-Crystal Light-Emitting Diodes", IEEE Journal of Quantum Electronics, vol. 36(10):1123-1130 (Oct. 2000).
Fenske et al., "Dielectric Materials at Microwave Frequencies", Applied Microwave & Wireless, pp. 92-100 (2000).
Fernandez, C. et al., "A simple dc-dc converter for the power supply of a cochlear implant", *IEEE*, pp. 1965-1970 (2003).

(56) References Cited

OTHER PUBLICATIONS

Ferris, David, "How Wireless Charging Will Make Life Simpler (and Greener)", Forbes (See forbes.com/sites/davidferris/2012/07/24/how-wireless-charging-will-make-life-simpler-and-greener/print/) (dated Jul. 24, 2012).
Fildes, J., "Physics Promises Wireless Power", (Science and Technology Reporter), BBC News, (Nov. 15, 2006) 3 pages.
Fildes, J., "The technology with impact 2007", BBC News, (Dec. 27, 2007) 3 pages.
Fildes, J., "Wireless energy promise powers up", BBC News, http://news.bbc.co.uk/2/hi/technology/6725955.stm, (Jun. 7, 2007) 3 pages.
Finkenzeller, Klaus, "RFID Handbook—Fundamentals and Applications in Contactless Smart Cards", Nikkan Kohgyo-sya, Kanno Taihei, first version, pp. 32-37, 253 (Aug. 21, 2001).
Finkenzeller, Klaus, "RFID Handbook (2nd Edition)", The Nikkan Kogyo Shimbun, Ltd., pp. 19, 20, 38, 39, 43, 44, 62, 63, 67, 68, 87, 88, 291, 292 (Published on May 31, 2004).
Freedman, D.H., "Power on a Chip", MIT Technology Review, (Nov. 2004).
Gary Peterson, "MIT WiTricity Not So Original After All", *Feed Line No. 9*, (See http://www.tfcbooks.com/articles/witricity.htm) printed Nov. 12, 2009.
Geyi, Wen, "A Method for the Evaluation of Small Antenna Q", IEEE Transactions on Antennas and Propagation, vol. 51(8):2124-2129 (Aug. 2003).
Hadley, F., "Goodbye Wires—MIT Team Experimentally Demonstrates Wireless Power Transfer, Potentially Useful for Power Laptops, Cell-Phones Without Cords", Massachusetts Institute of Technology, Institute for Soldier D Nanotechnologies, http://web.mit.edu/newsoffice/2007/wireless-0607.html, (Jun. 7, 2007) 3 pages.
Haus, H.A., "Waves and Fields in Optoelectronics," Chapter 7 "Coupling of Modes—Reasonators and Couplers" (Prentice-Hall, New Jersey, 1984).
Heikkinen et al., "Performance and Efficiency of Planar Rectennas for Short-Range Wireless Power Transfer at 2.45 GHz", Microwave and Optical Technology Letters, vol. 31(2):86-91, (Oct. 20, 2001).
Highfield, R., "Wireless revolution could spell end of plugs",(Science Editor), Telegraph.co.uk, http://www.telegraph.co.uk/news/main.jhtml?xml=/news/2007/06/07/nwireless1 07.xml, (Jun. 7, 2007) 3 pages.
Hirai et al., "Integral Motor with Driver and Wireless Transmission of Power and Information for Autonomous Subspindle Drive", IEEE, vol. 15(1):13-20, (Jan. 2000).
Hirai et al., "Practical Study on Wireless Transmission of Power and Information for Autonomous Decentralized Manufacturing System", IEEE, vol. 46(2):349-359, Apr. 1999.
Hirai et al., "Study on Intelligent Battery Charging Using Inductive Transmission of Power and Information", IEEE, vol. 15(2):335-345, (Mar. 2000).
Hirai et al., "Wireless Transmission of Power and Information and Information for Cableless Linear Motor Drive", IEEE, vol. 15(1):21-27, (Jan. 2000).
Hirayama, M., "Splashpower—World Leaders in Wireless Power", PowerPoint presentation, Splashpower Japan, (Sep. 3, 2007) 30 pages.
Ho, S. L. et al., "A Comparative Study Between Novel Witricity and Traditional Inductive Magnetic Coupling in Wireless Charging", IEEE Transactions on Magnetics, vol. 47(5):1522-1525 (May 2011).
Infotech Online, "Recharging gadgets without cables", infotech.indiatimes.com, (Nov. 17, 2006) 1 page.
Jackson, J. D., "Classical Electrodynamics", 3rd Edition, Wiley, New York, 1999, pp. 201-203.
Jackson, J.D., "Classical Electrodynamics," 3rd Edition, Sections 1.11, 5.5, 5.17, 6.9, 8.1, 8.8, 9.2, 9.3 (Wiley, New York, 1999).
Jacob, M. V. et al., "Lithium Tantalate—A High Permittivity Dielectric Material for Microwave Communication Systems", *Proceedings of IEEE TENCON—Poster Papers*, pp. 1362-1366, 2003.
Karalis, Aristeidis, "Electricity Unplugged", Feature: Wireless Energy Physics World, physicsworld.com, pp. 23-25 (Feb. 2009).

Kawamura et al., "Wireless Transmission of Power and Information Through One High-Frequency Resonant AC Link Inverter for Robot Manipulator Applications", IEEE, vol. 32(3):503-508, (May/Jun. 1996).
Kurs, A. et al., "Wireless Power Transfer via Strongly Coupled Magnetic Resonances", *Science* vol. 317, pp. 83-86 (Jul. 6, 2007).
Kurs, A. et al., "Simultaneous mid-range power transfer to multiple devices", *Applied Physics Letters*, vol. 96, No. 044102 (2010).
Kurs, A. et al., "Optimized design of a low-resistance electrical conductor for the multimegahertz range", *Applied Physics Letters*, vol. 98:172504-172504-3 (Apr. 2011).
Lamb, Gregory M. ,"Look Ma—no wires!—Electricity broadcast through the air may someday run your home",The Christian Science Monitor,http://www.csmonitor.com/2006/1116/p14s01-stct.html,Nov. 15, 2006,2 pages.
Lee, "Antenna Circuit Design for RFID Applications," Microchip Technology Inc., AN710, 50 pages (2003).
Lee, "RFID Coil Design," Microchip Technology Inc., AN678, 21 pages (1998).
Liang et al., "Silicon waveguide two-photon absorption detector at 1.5 μm wavelength for autocorrelation measurements," Applied Physics Letters, 81(7):1323-1325 (Aug. 12, 2002).
Markoff, J. ,"Intel Moves to Free Gadgets of Their Recharging Cords", The New York Times—nytimes.com, Aug. 21, 2008, 2 pages.
Median, A. et al. "Design of class E amplifier with nonlinear and linear shunt capacitances for any duty cycle", IEEE Trans. Microwave Theor. Tech., vol. 55, No. 3, pp. 484-492, (2007).
Microchip Technology Inc., "microID 13.56 MHz Design Guide—MCRF355/360 Reader Reference Design," 24 pages (2001).
Minkel, J R. ,"Wireless Energy Lights Bulb from Seven Feet Away—Physicists vow to cut the cord between your laptop battery and the wall socket—with just a simple loop of wire",Scientific American,http://www.scientificamerican.com/article.cfm?id=wireless-energy-lights-bulb-from-seven-feet-away,Jun. 7, 2007,1 page.
Minkel, J R. ,"Wireless Energy Transfer May Power Devices at a Distance",Scientific American,Nov. 14, 2006,1 page.
Morgan, J., "Lab report: Pull the plug for a positive charge", The Herald, Web Issue 2680, (Nov. 16, 2006) 3 pages.
Moskvitch, Katia, "Wireless charging—the future for electric cars?", BBC News Technology (See www.bbc.co.uk/news/technology-14183409) (dated Jul. 21, 2011).
O'Brien et al., "Analysis of Wireless Power Supplies for Industrial Automation Systems", IEEE, pp. 367-372 (Nov. 2-6, 2003).
O'Brien et al., "Design of Large Air-Gap Transformers for Wireless Power Supplies", IEEE, pp. 1557-1562 (Jun. 15-19, 2003).
Pendry, J. B., "A Chiral Route to Negative Refraction", Science, vol. 306:1353-1355 (2004).
Physics Today, "Unwired energy questions asked answered", Sep. 2007, pp. 16-17.
Powercast LLC. "White Paper" Powercast simply wire free, 2003.
PR News Wire, "The Big Story for CES 2007: The public debut of eCoupled Intelligent Wireless Power", Press Release, Fulton Innovation LLC, Las Vegas, NV, (Dec. 27, 2006) 3 pages.
Press Release, "The world's first sheet-type wireless power transmission system: Will a socket be replaced by e-wall?",Public Relations Office, School of Engineering, University of Tokyo, Japan,Dec. 12, 2006,4 pages.
PressTV, "Wireless power transfer possible", http://edition.presstv.ir/detail/12754.html, Jun. 11, 2007, 1 page.
Reidy, C. (Globe Staff), "MIT discovery could unplug your iPod forever", Boston.com, http://www.boston.com/ business/ticker/2007/06/mit_discovery_c.html, (Jun. 7, 2007) 3 pages.
Risen, C., "Wireless Energy", The New York Times, (Dec. 9, 2007) 1 page.
Sakamoto et al., "A Novel Circuit for Non-Contact Charging Through Electro-Magnetic Coupling", IEEE, pp. 168-174 (1992).
Scheible, G. et al., "Novel Wireless Power Supply System for Wireless Communication Devices in Industrial Automation Systems", IEEE, pp. 1358-1363, (Nov. 5-8, 2002).
Schneider, D. "A Critical Look at Wireless Power", *IEEE Spectrum*, pp. 35-39 (May 2010).

(56) References Cited

OTHER PUBLICATIONS

Schneider, David, "Electrons Unplugged. Wireless power at a distance is still far away", *IEEE Spectrum*, pp. 35-39 (May 2010).
Schuder, J. C. et al., "An Inductively Coupled RF System for the Transmission of 1 kW of Power Through the Skin", *IEEE Transactions on Bio-Medical Engineering*, vol. BME-18, No. 4, pp. 265-273 (Jul. 1971).
Schuder, J. C., "Powering an Artificial Heart: Birth of the Inductively Coupled-Radio Frequency System in 1960", *Artificial Organs*, vol. 26:909-915 (2002).
Schuder, J.C. et al., "Energy Transport Into the Closed Chest From a Set of Very-Large Mutually Orthogonal Coils", Communication Electronics, vol. 64:527-534 (Jan. 1963).
Schutz, J. et al., "Load Adaptive Medium Frequency Resonant Power Supply", IEEE, pp. 282-287 (Nov. 2002).
Sekitani et al. "A large-area wireless power-transmission sheet using printed organic transistors and plastic MEMS switches" www.nature.com/naturematerials. Published online Apr. 29, 2007.
Sekitani et al., "A large-area flexible wireless power transmission sheet using printed plastic MEMS switches and organic field-effect transistors", IEDM '06, International Electron Devices Meeting, (Dec. 11-13, 2006) 4 pages.
Sekiya, H. et al., "FM/PWM control scheme in class DE inverter", IEEE Trans. Circuits Syst. I, vol. 51(7) (Jul. 2004).
Senge, M., "MIT's wireless electricity for mobile phones", Vanguard, http://www.vanguardngr.com/articles/2002/features/gsm/gsm211062007.htm, (Jun. 11, 2007) 1 page.
Sensiper, S., "Electromagnetic wave propogation on helical conductors", Technical Report No. 194 (based on PhD Thesis), Massachusetts Institute of Technology, (May 16, 1951) 126 pages.
Soljacic, M., "Wireless Non-Radiative Energy Transfer—PowerPoint presentation". Massachusetts Institute of Technology, (Oct. 6, 2005).
Soljacic, M. et al., "Wireless Energy Transfer Can Potentially Recharge Laptops Cell Phones Without Cords", (Nov. 14, 2006) 3 pages.
Soljacic, M. et al., "Photonic-crystal slow-light enhancement of nonlinear phase sensitivity", *J. Opt. Soc. Am B*, vol. 19, No. 9, pp. 2052-2059 (Sep. 2002).
Soljacic, M., "Wireless nonradiative energy transfer", *Visions of Discovery New Light on Physics, Cosmology, and Consciousness*, Cambridge University Press, New York, NY pp. 530-542 (2011).
Someya, Takao. "The world's first sheet-type wireless power transmission system". University of Tokyo, (Dec. 12, 2006).
Staelin, David H. et al., Electromagnetic Waves, Chapters 2, 3, 4, and 8, pp. 46-176 and 336-405 (Prentice Hall Upper Saddle River, New Jersey 1998).
Stark III, Joseph C., "Wireless Power Transmission Utilizing a Phased Array of Tesla Coils", Master Thesis, Massachusetts Institute of Technology (2004).
Stewart, W., "The Power to Set you Free", Science, vol. 317:55-56 (Jul. 6, 2007).
Tang, S.C. et al., "Evaluation of the Shielding Effects on Printed-Circuit-Board Transformers Using Ferrite Plates and Copper Sheets", *IEEE Transactions on Power Electronics*, vol. 17:1080-1088 (Nov. 2002).
Tesla, Nikola, "High Frequency Oscillators for Electro-Therapeutic and Other Purposes", *Proceedings of the IEEE*, vol. 87:1282-1292 (Jul. 1999).
Tesla, Nikola, "High Frequency Oscillators for Electro-Therapeutic and Other Purposes", *The Electrical Engineer*, vol. XXVI, No. 50 (Nov. 17, 1898).
Texas Instruments, "HF Antenna Design Notes—Technical Application Report," Literature No. 11-08-26-003, 47 pages (Sep. 2003).
Thomsen et al., "Ultrahigh speed all-optical demultiplexing based on two-photon absorption in a laser diode," Electronics Letters, 34(19):1871-1872 (Sep. 17, 1998).
UPM Rafsec, "Tutorial overview of inductively coupled RFID Systems," 7 pages (May 2003).
Valtchev et al. "Efficient Resonant Inductive Coupling Energy Transfer Using New Magnetic and Design Criteria". IEEE, pp. 1293-1298, 2005.
Vandevoorde et al., "Wireless energy transfer for stand-alone systems: a comparison between low and high power applicability", Sensors and Actuators, vol. 92:305-311 (2001).
Vilkomerson, David et al., "Implantable Doppler System for Self-Monitoring Vascular Grafts", *IEEE Ultrasonics Symposium*, pp. 461-465 (2004).
Villeneuve, Pierre R. et al., "Microcavities in photonic crystals: Mode symmetry, tunability, and coupling efficiency", *Physical Review B*, vol. 54:7837-7842 (Sep. 15, 1996).
Yariv, Amnon et al., "Coupled-resonator optical waveguide: a proposal and analysis", *Optics Letters*, vol. 24(11):711-713 (Jun. 1, 1999).
Yates, David C. et al., "Optimal Transmission Frequency for Ultralow-Power Short-Range Radio Links", IEEE Transactions on Circuits and Systems—1, Regular Papers, vol. 51:1405-1413 (Jul. 2004).
Yoshihiro Konishi, *Microwave Electronic Circuit Technology*, Chapter 4, pp. 145-197 (Marcel Dekker, Inc., New York, NY 1998).
Ziaie, Babak et al., "A Low-Power Miniature Transmitter Using a Low-Loss Silicon Platform for Biotelemetry", *Proceedings—19th International Conference IEEE/EMBS*, pp. 2221-2224, (Oct. 30-Nov. 2, 1997) 4 pages.
Zierhofer, Clemens M. et al., "High-Efficiency Coupling-Insensitive Transcutaneous Power and Data Transmission Via an Inductive Link", *IEEE Transactions on Biomedical Engineering*, vol. 37, No. 7, pp. 716-722 (Jul. 1990).
International Search Report and the Written Opinion of the International Searching Authority for International Application No. PCT/US2015/026105 dated Jul. 17, 2015 (11 pages).
International Preliminary Report on Patentability and Written Opinion for the International Searching Authority for International Application No. PCT/US2015/026105 dated Oct. 27, 2016 (8 pages).

\* cited by examiner

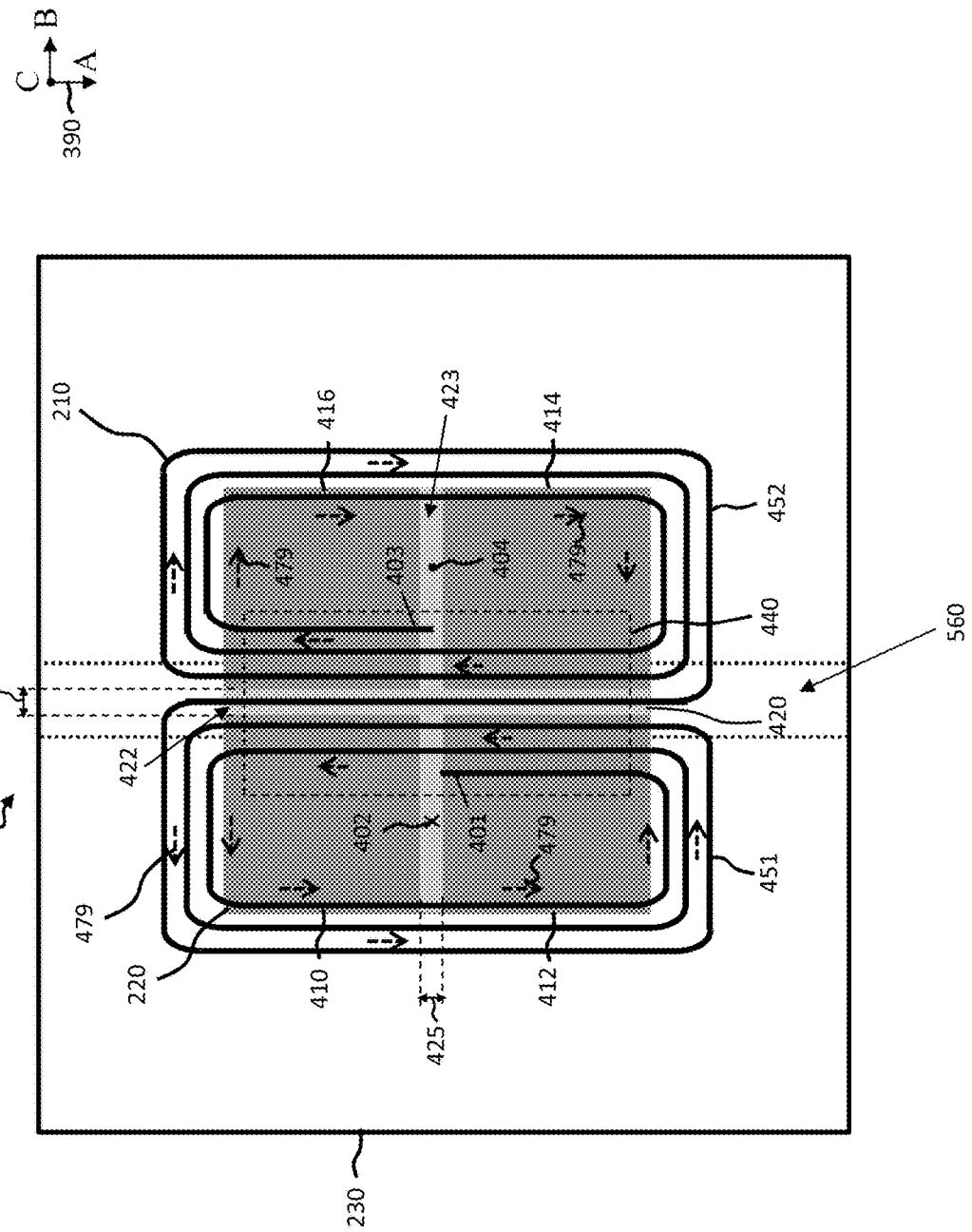

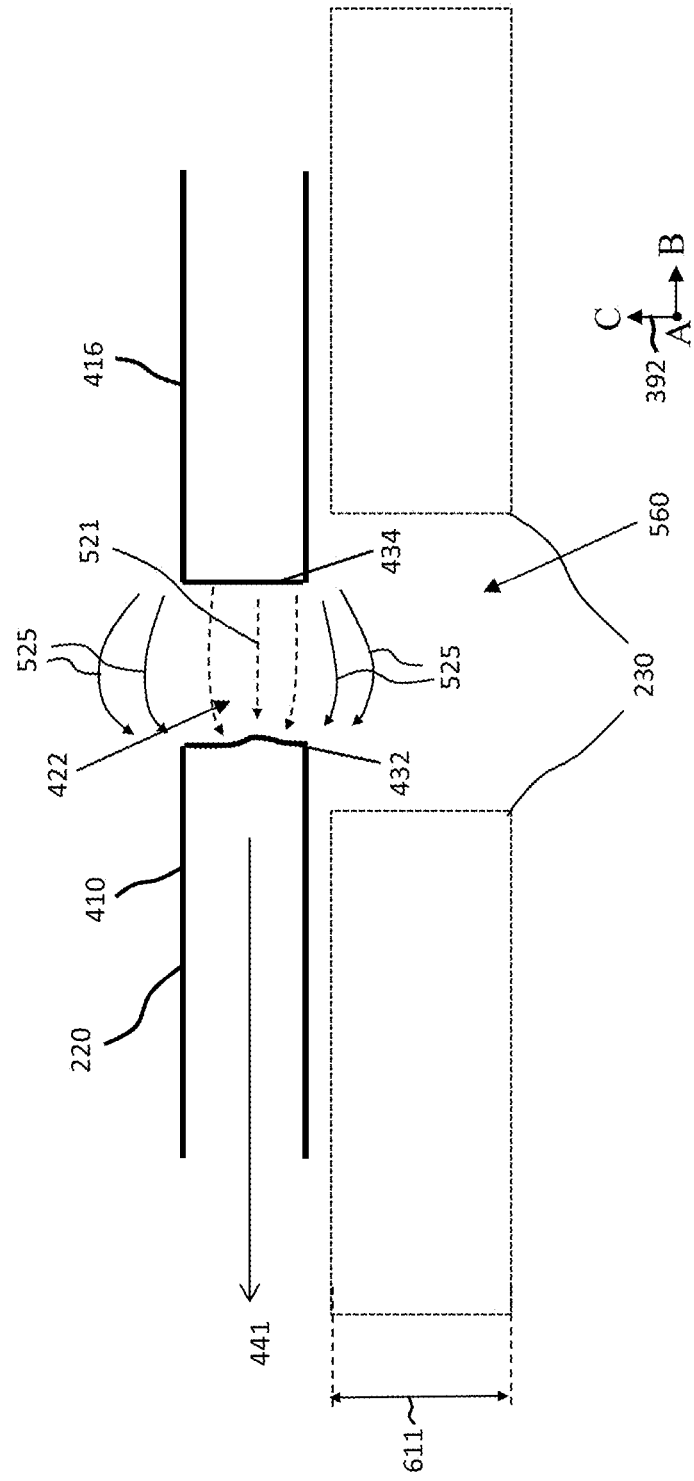

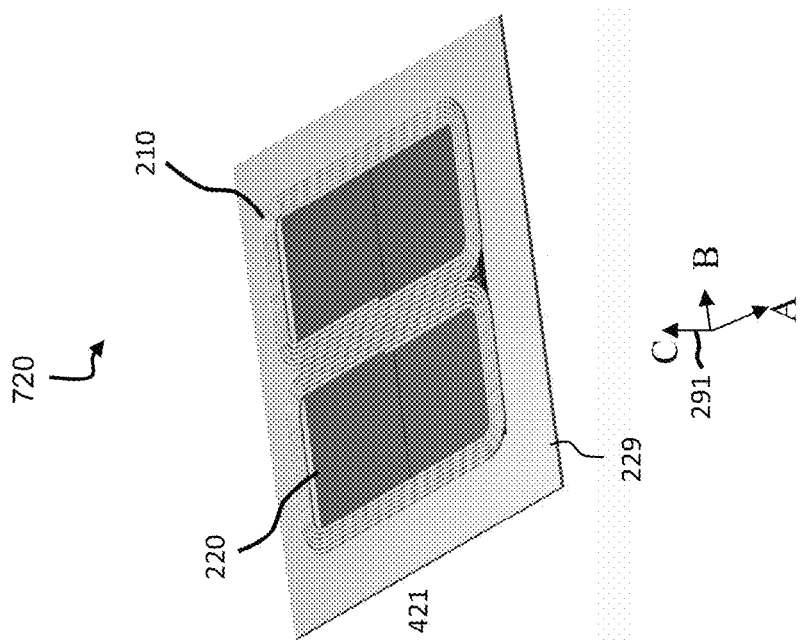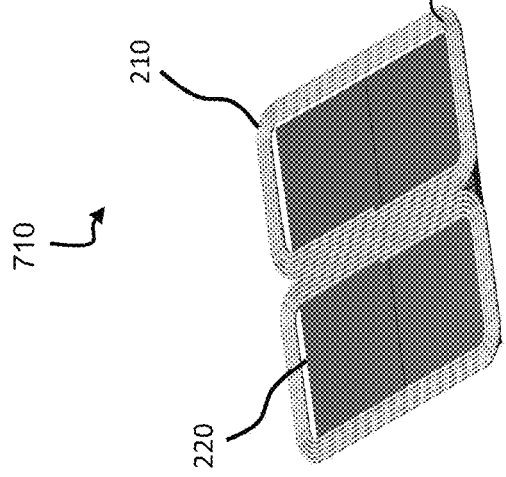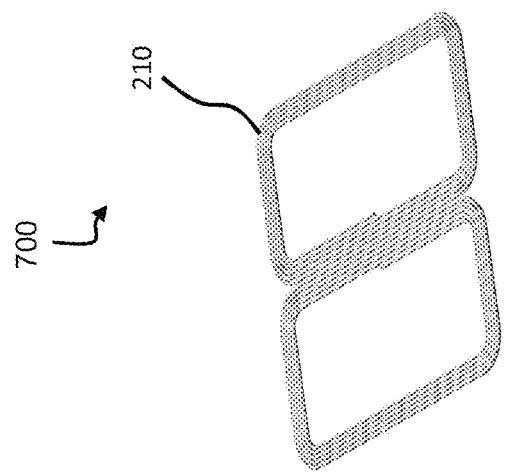

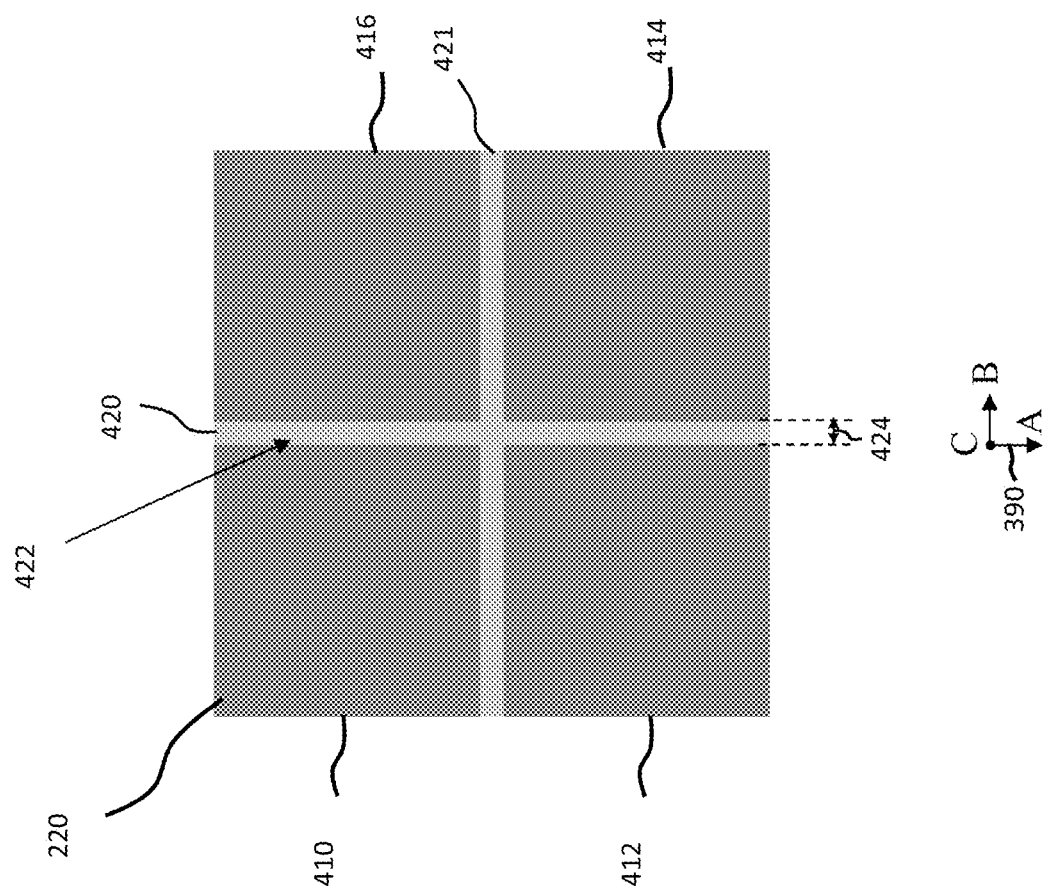

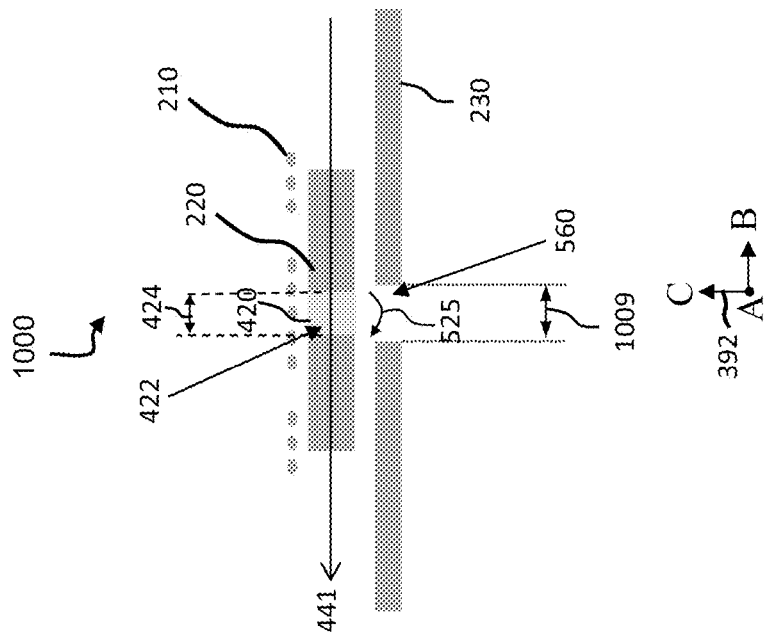
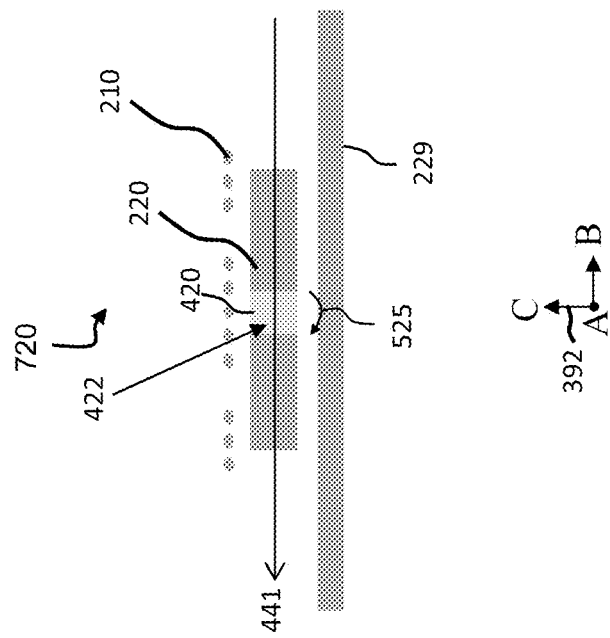

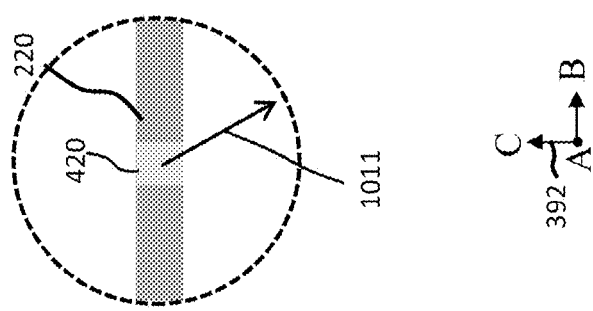

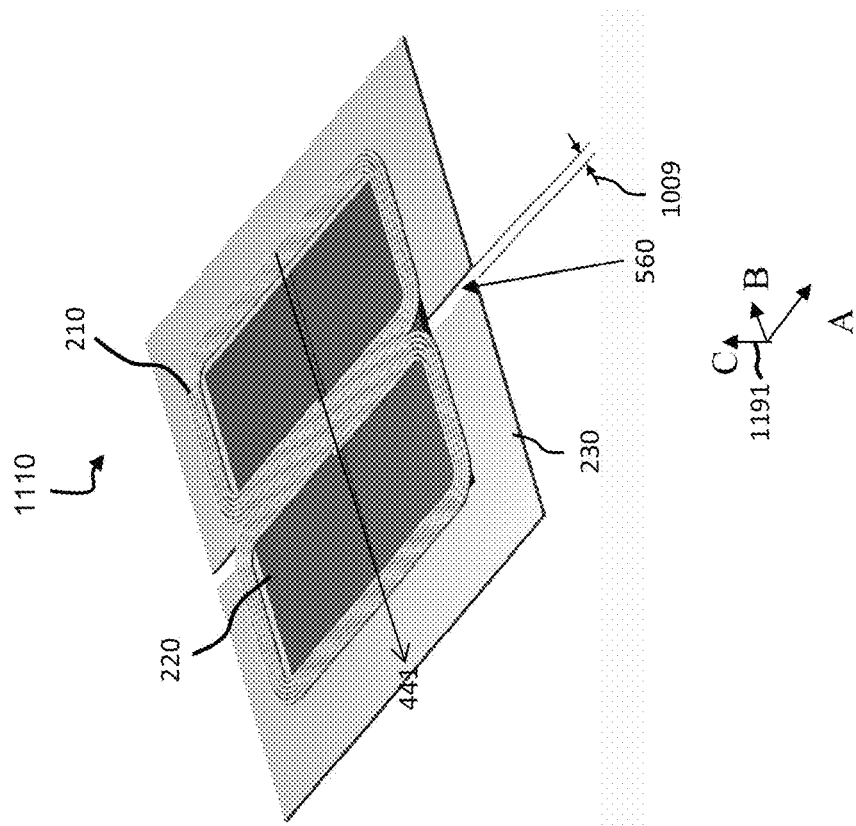
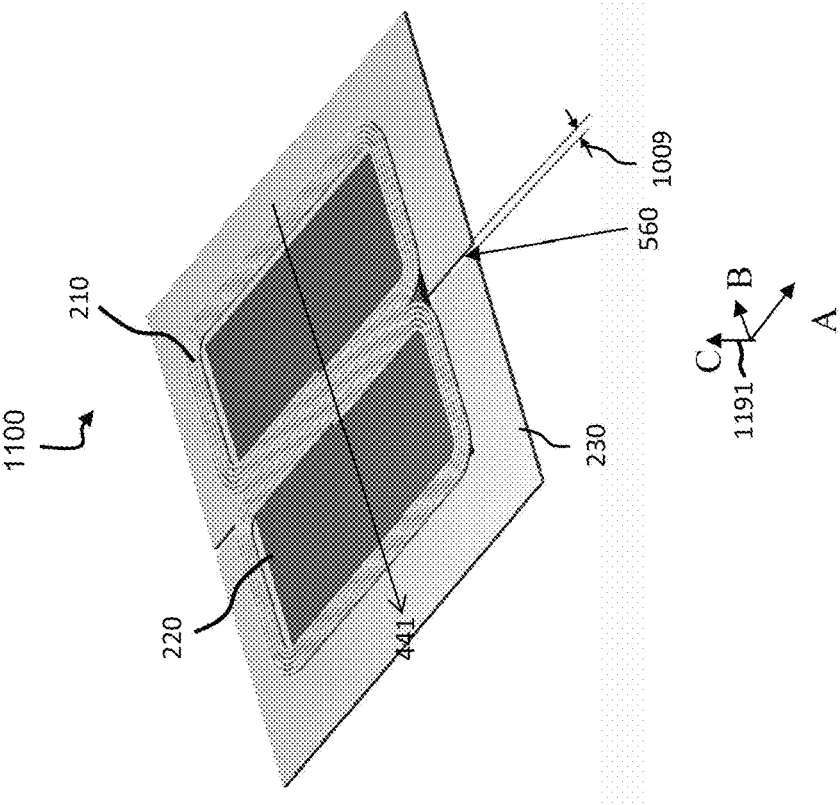

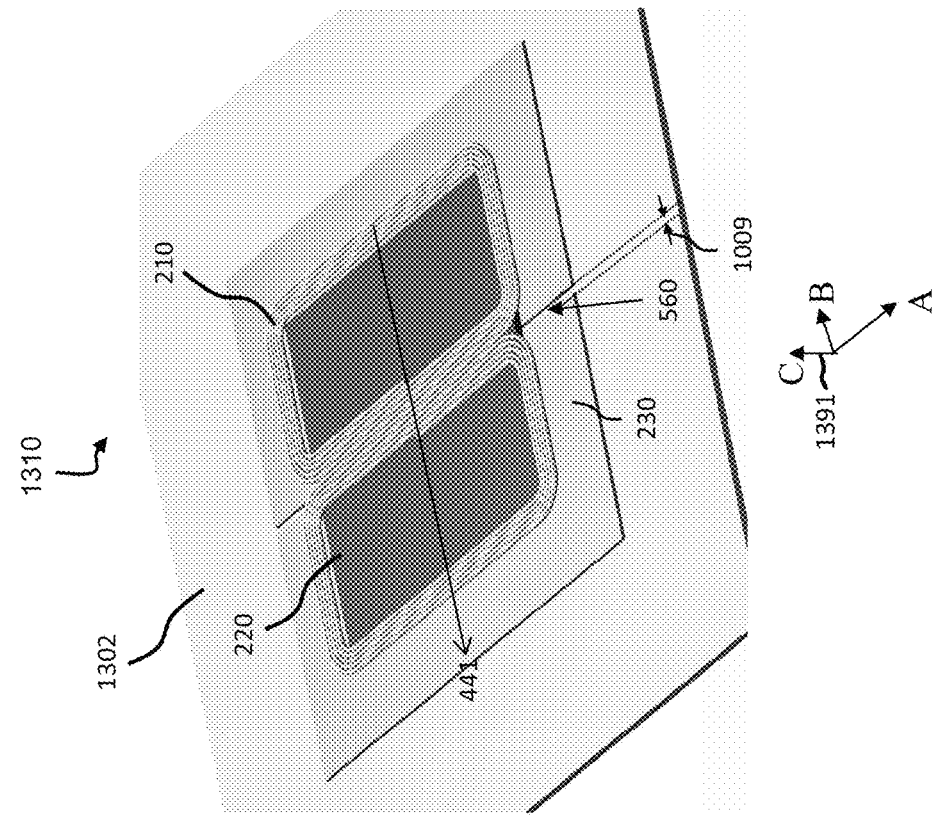
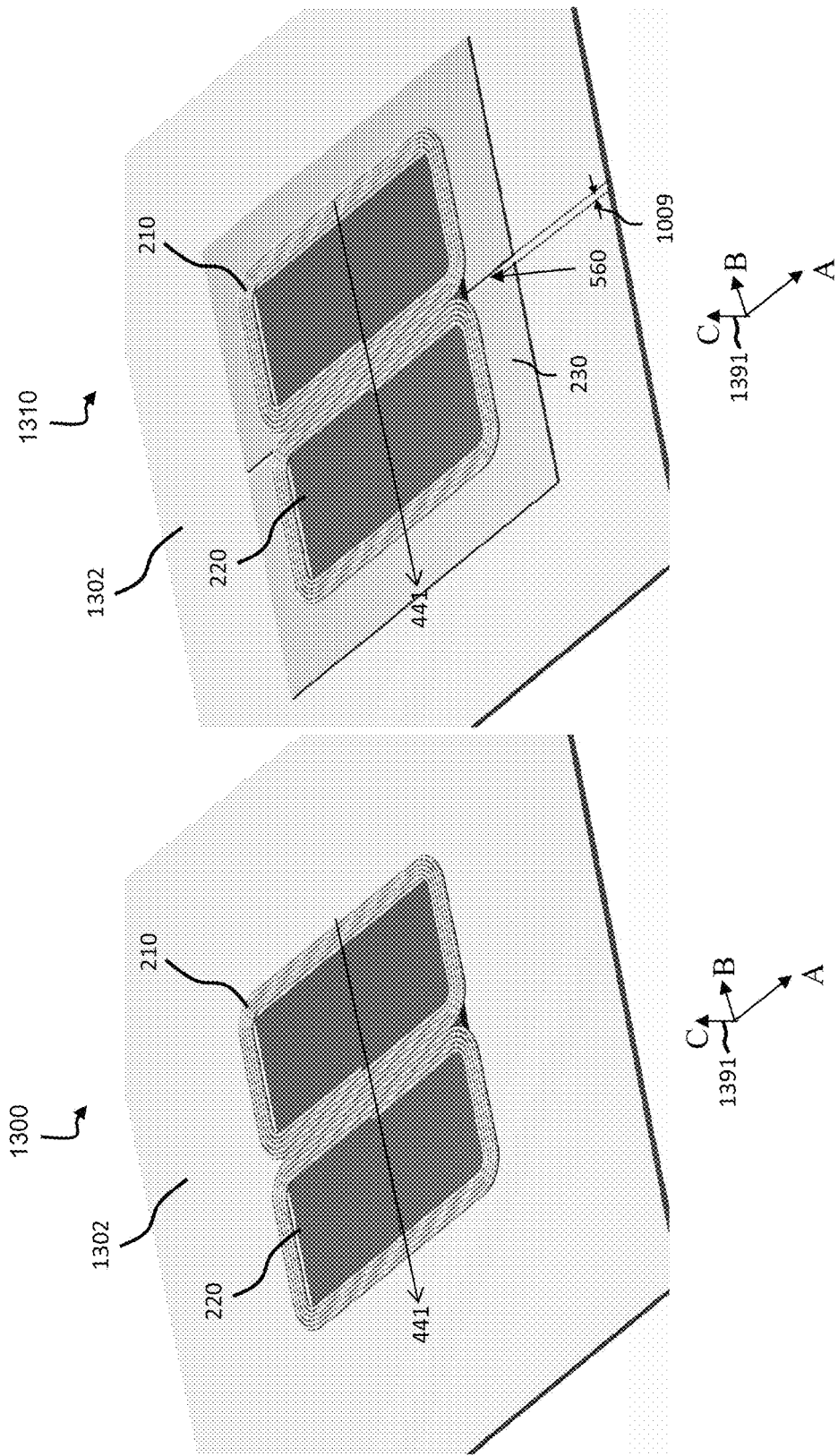

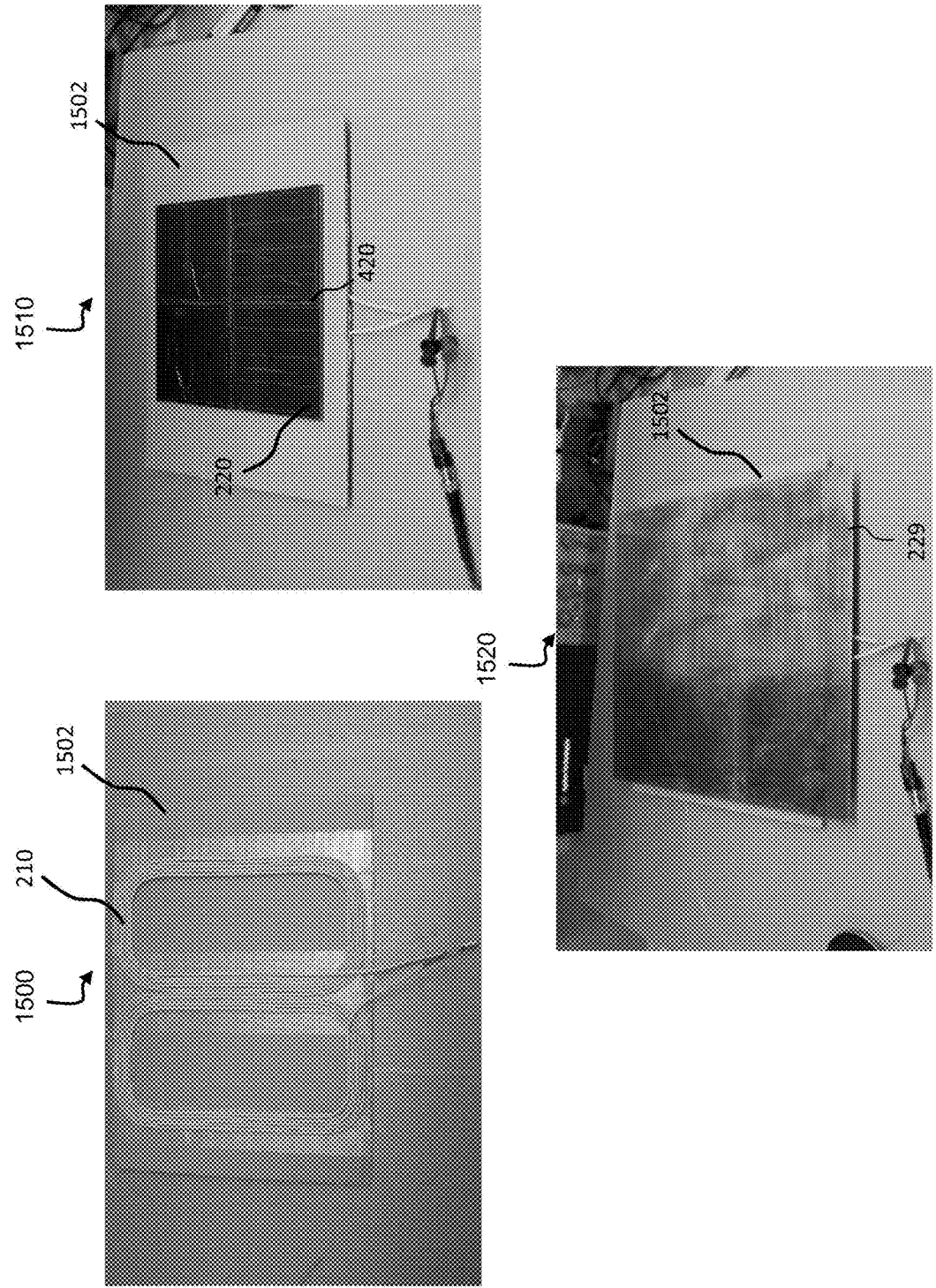

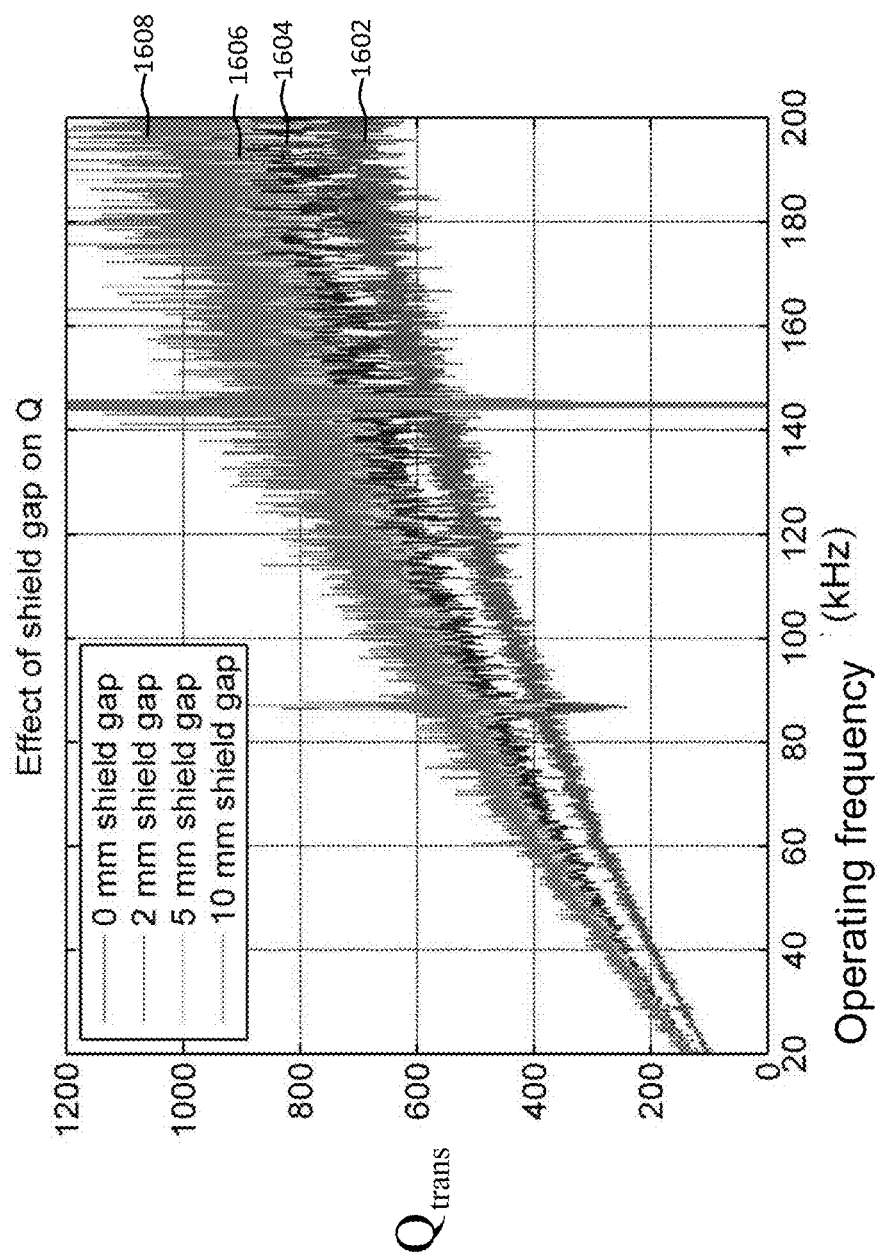

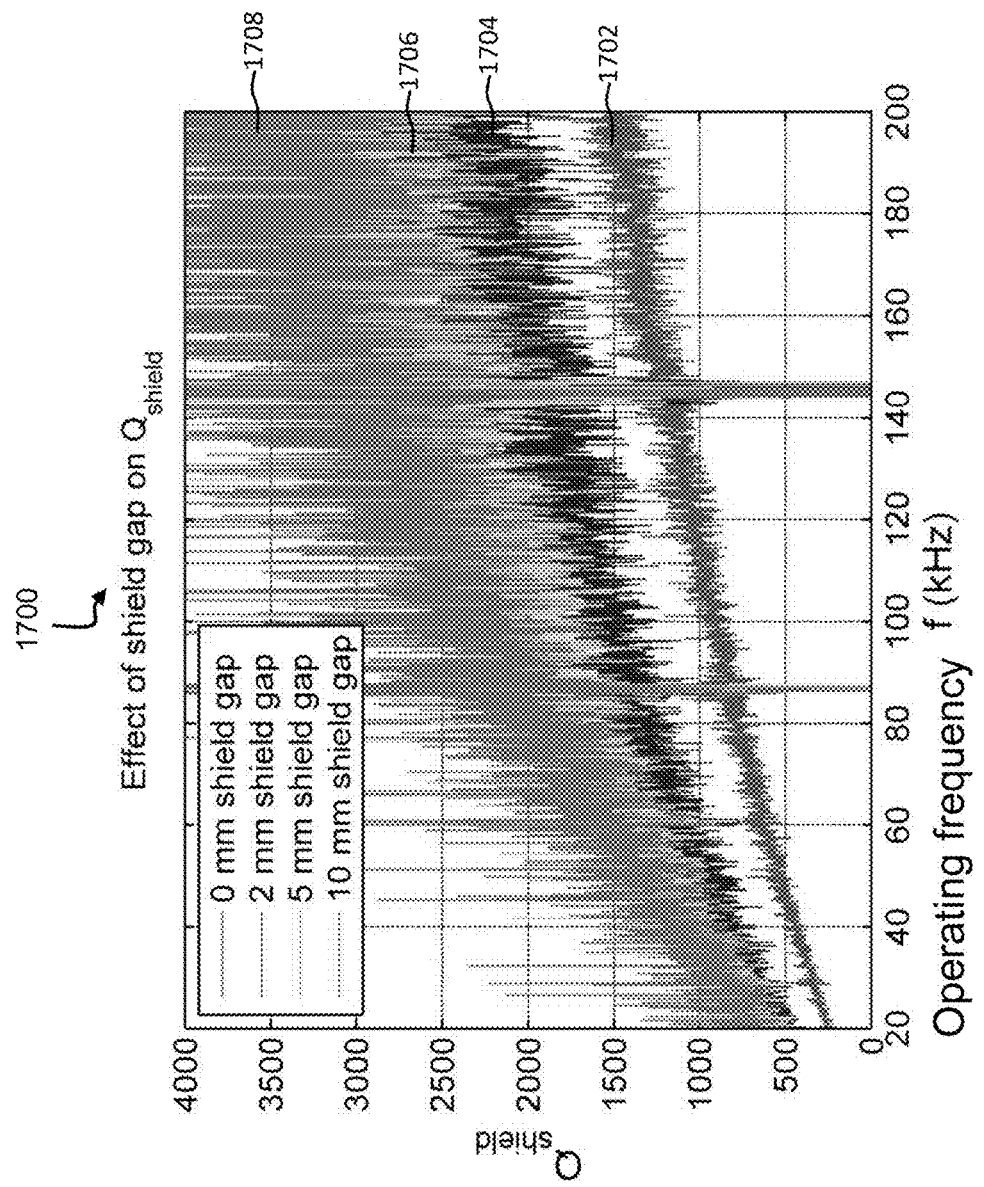

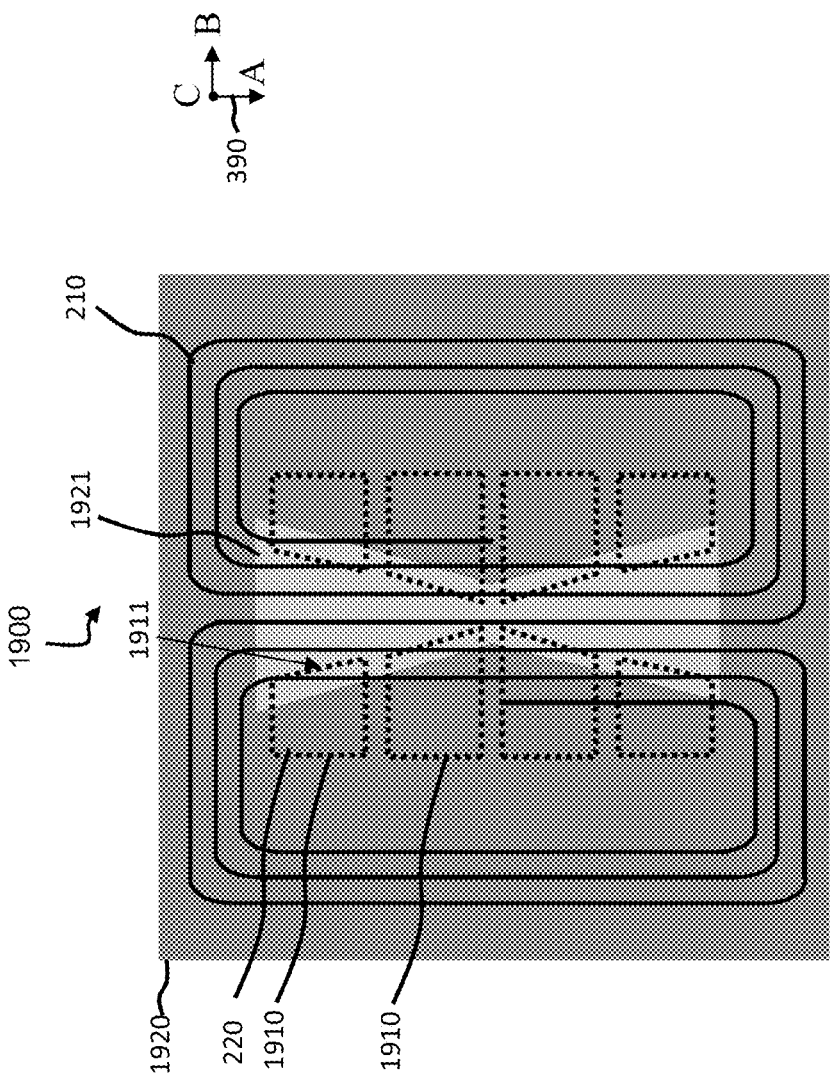

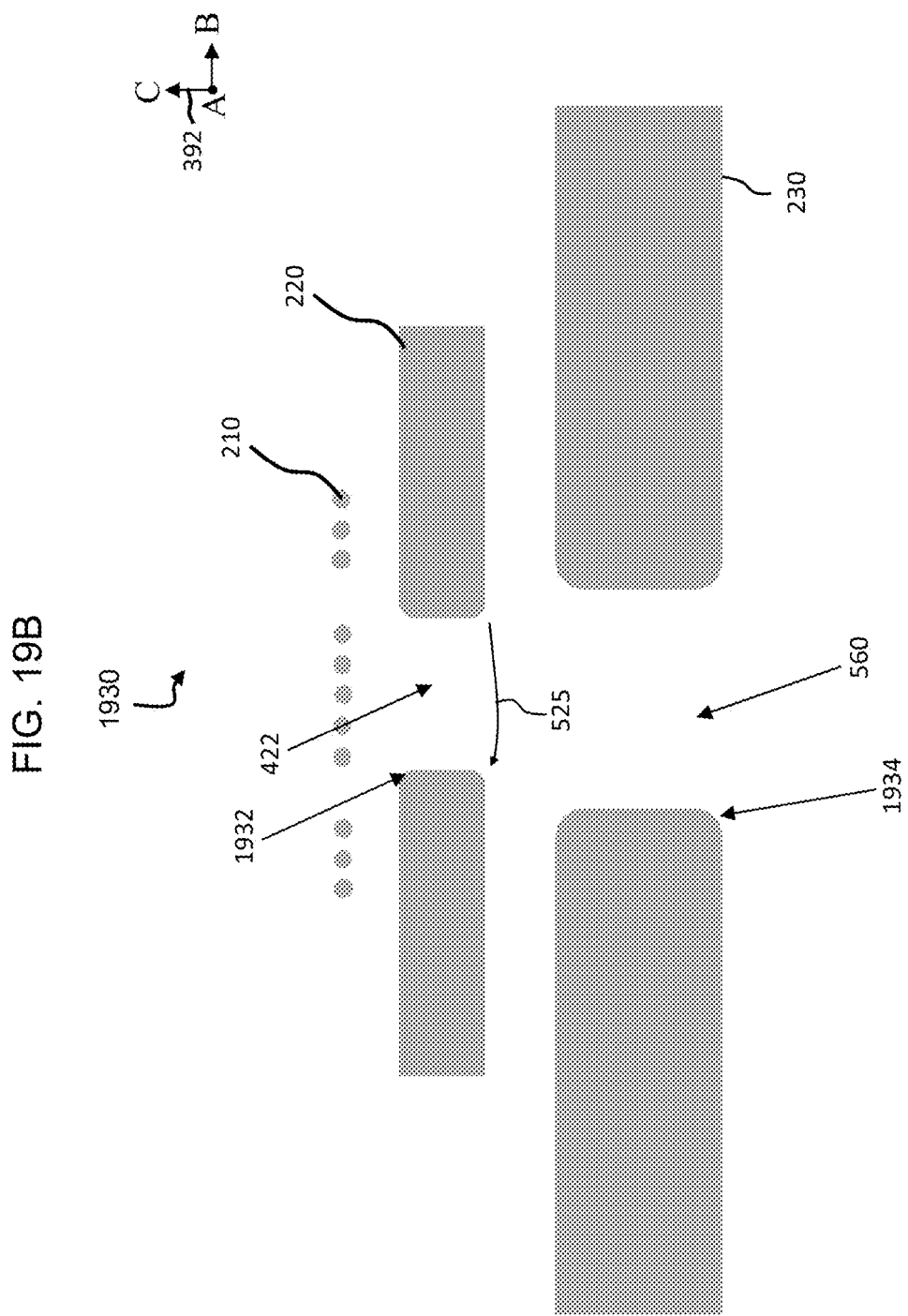

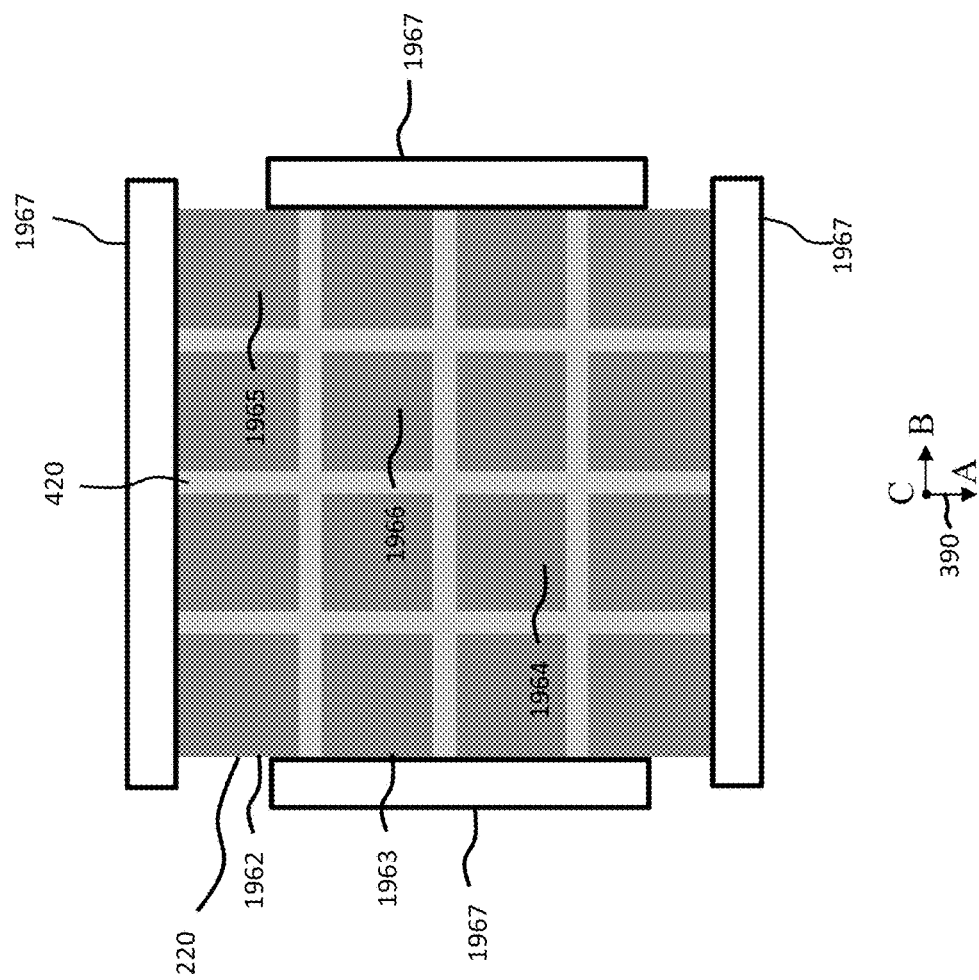

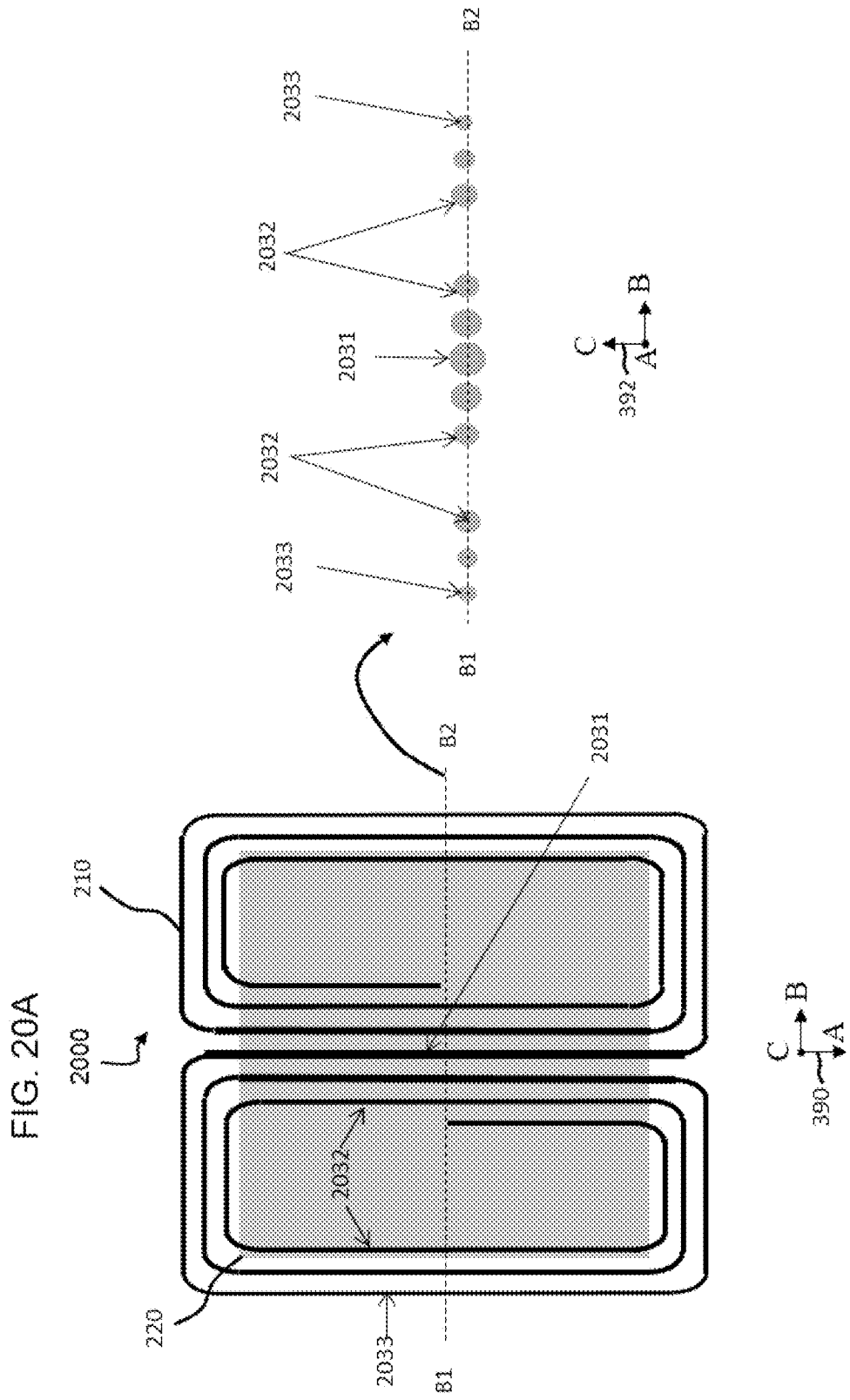

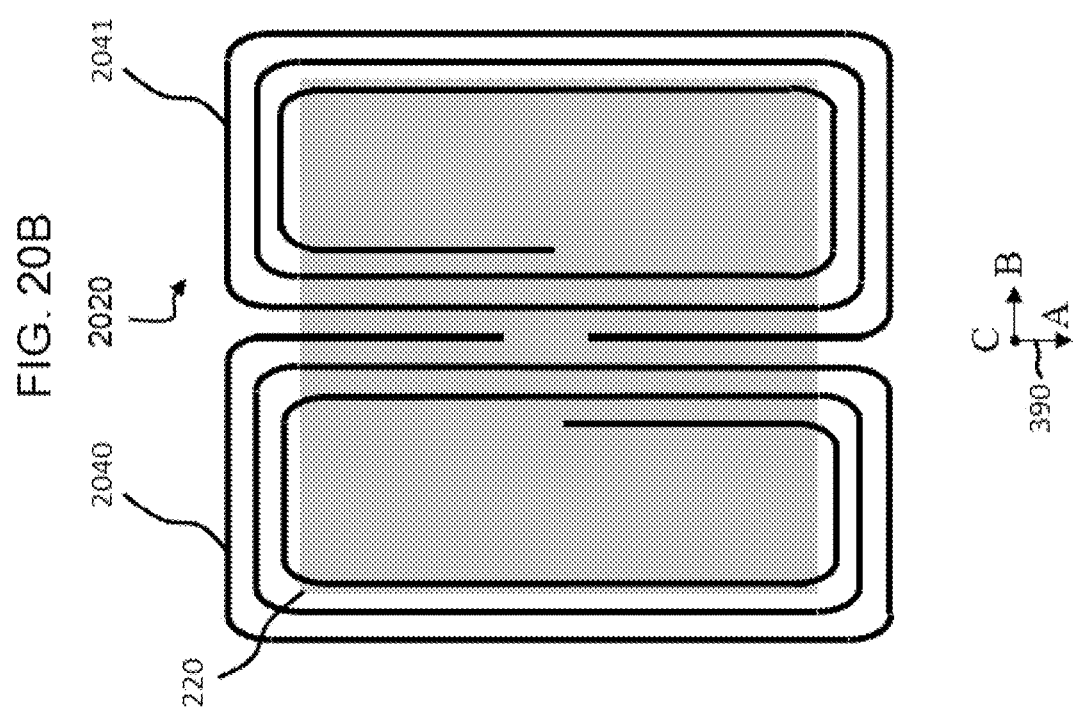

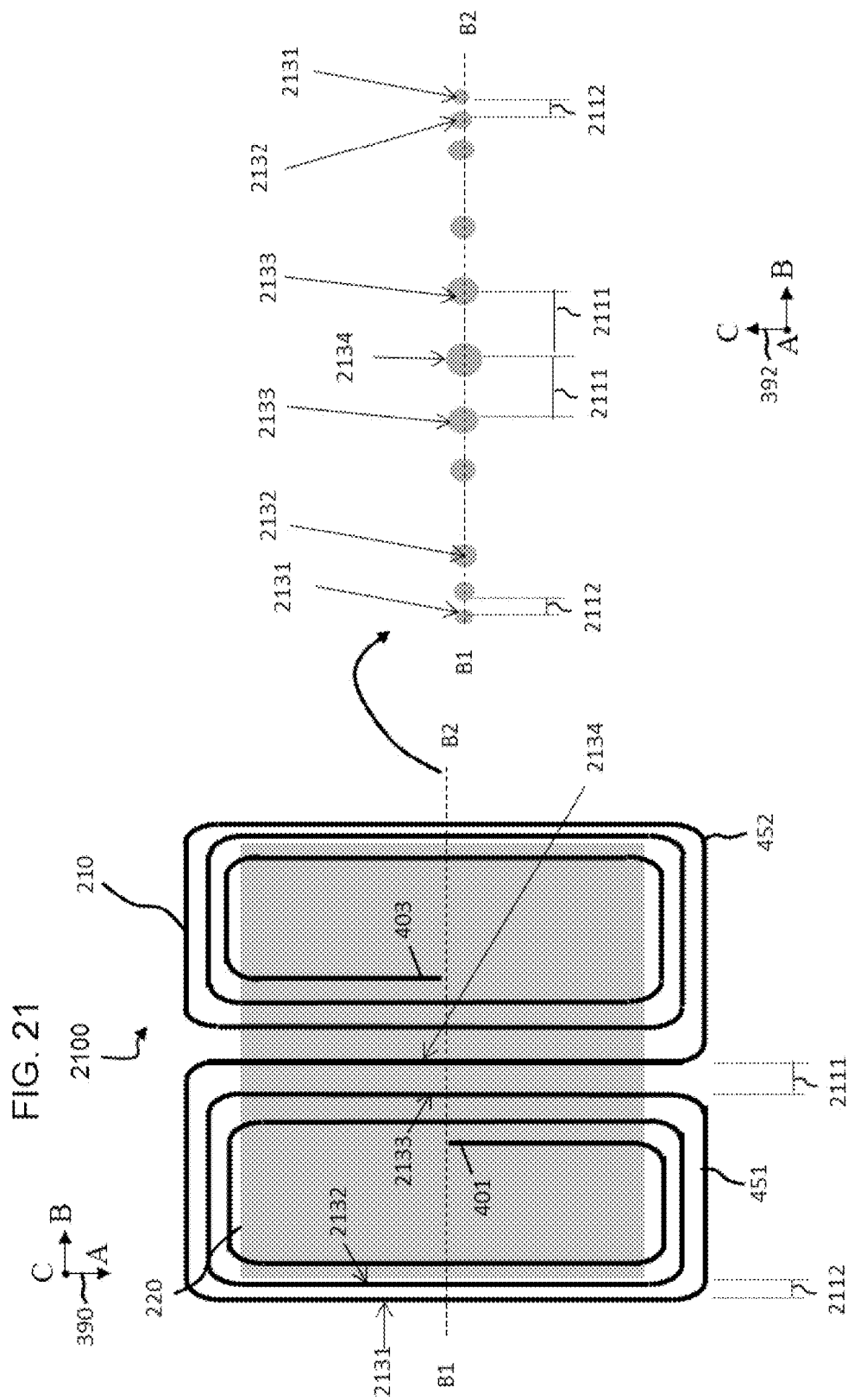

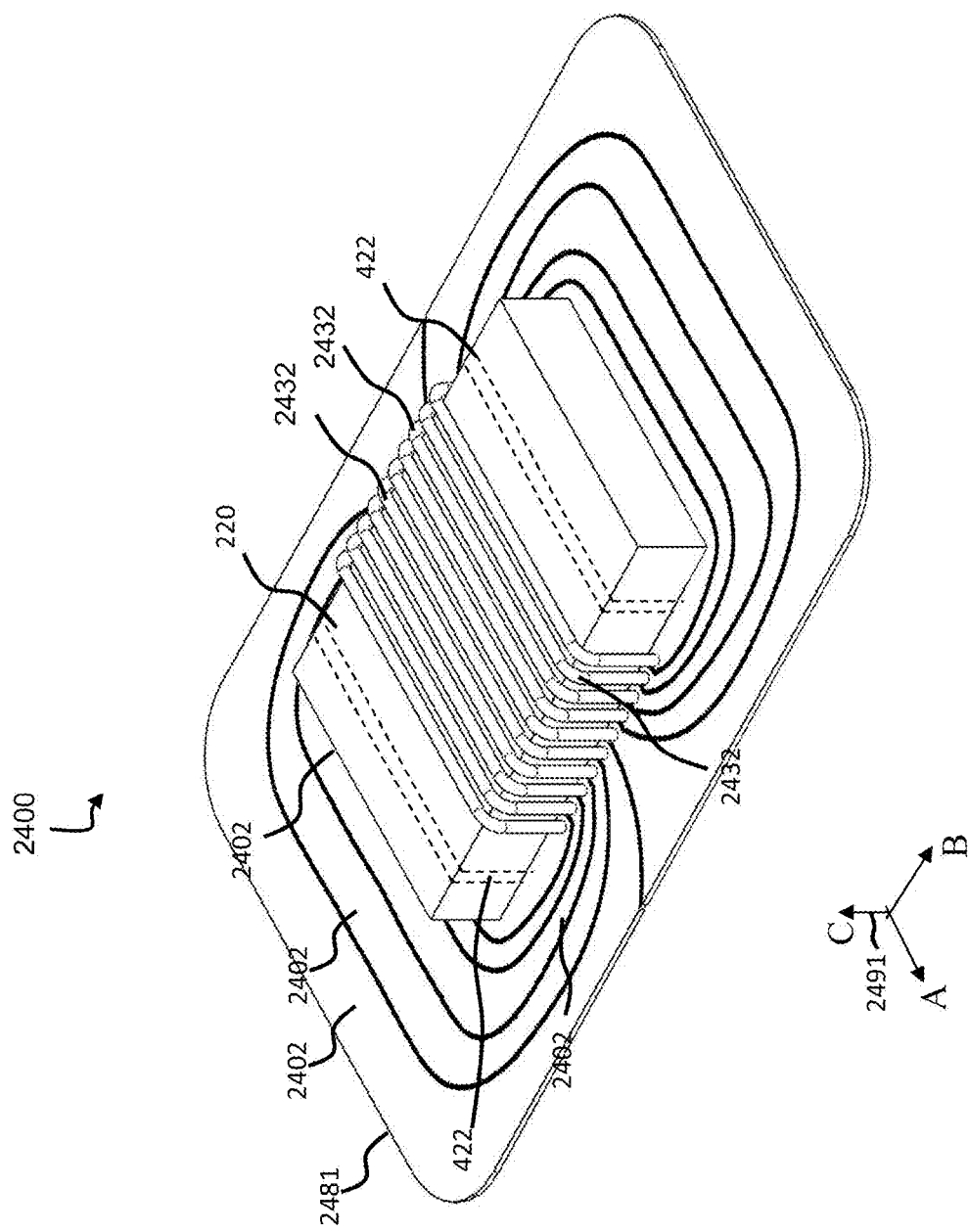

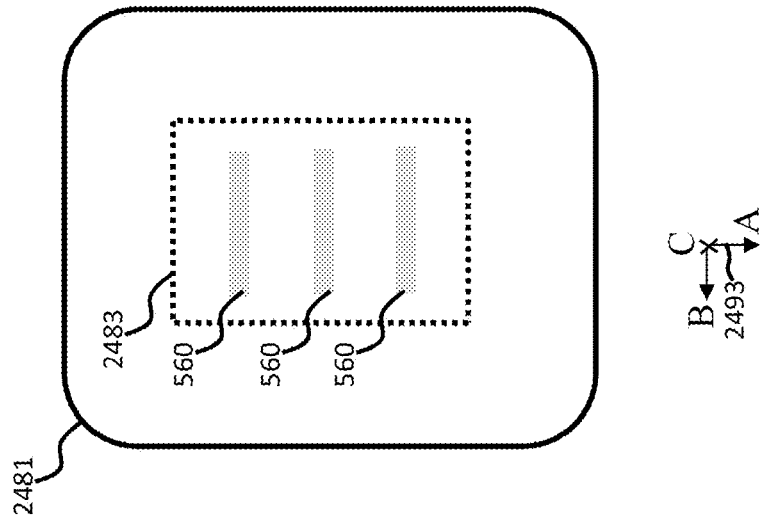
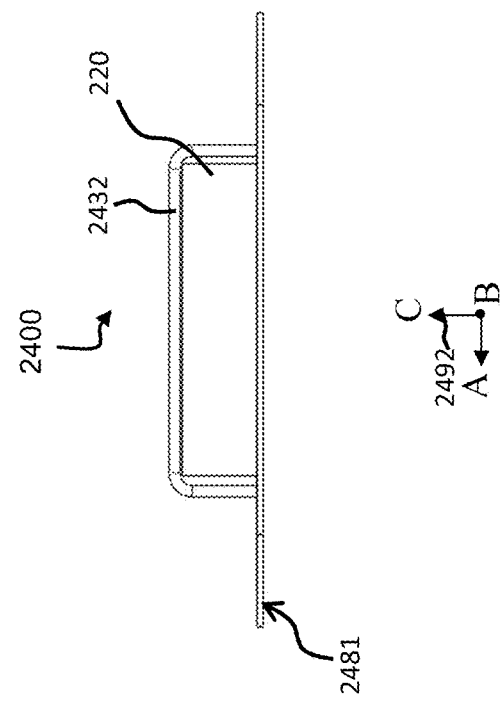

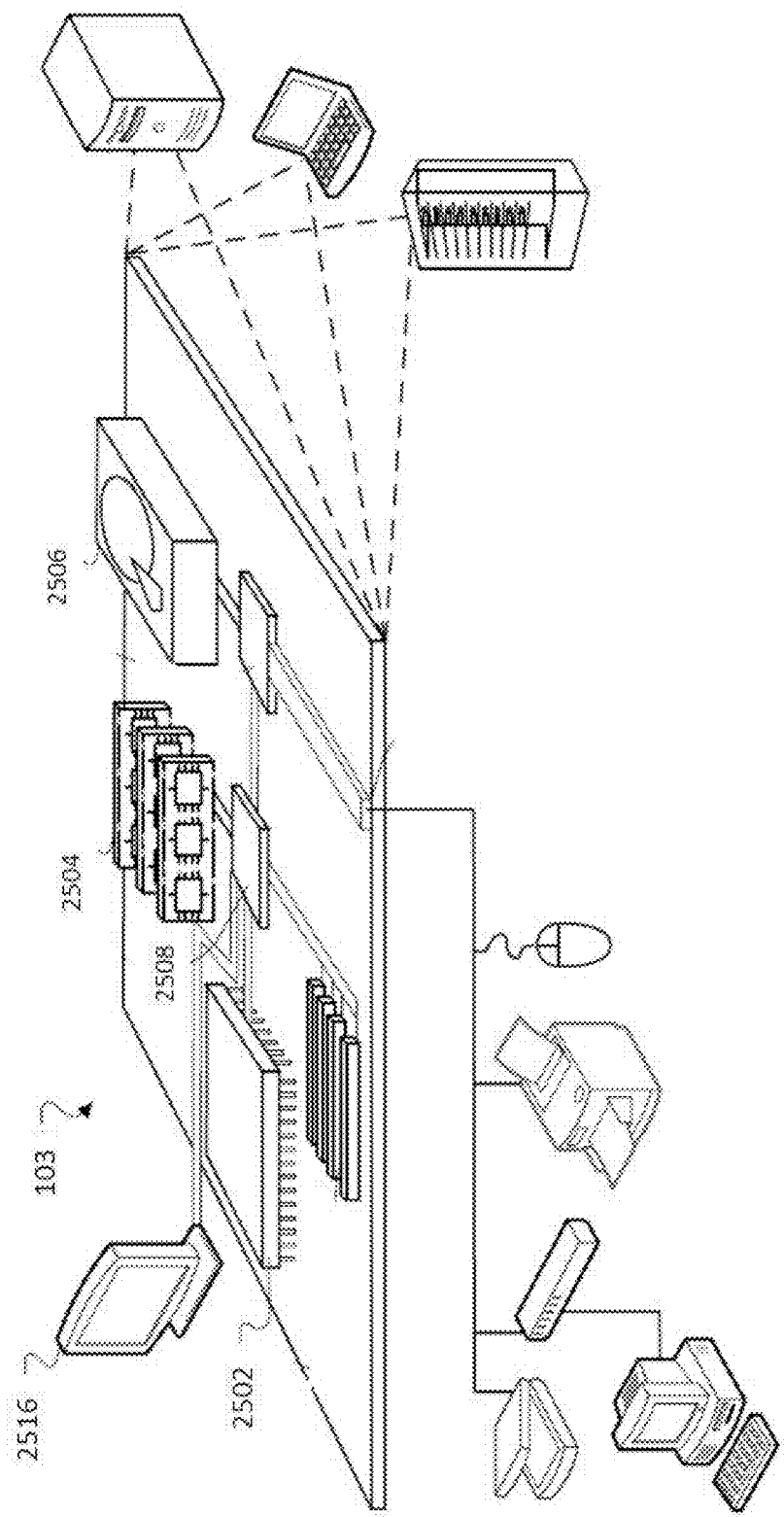

WIRELESS POWER TRANSFER SYSTEMS WITH SHIELD OPENINGS

CROSS-REFERENCE TO RELATED APPLICATIONS

This application is a continuation of and claims priority under 35 U.S.C. § 120 to U.S. application Ser. No. 14/688,025, filed on Apr. 16, 2015, which claims priority to U.S. Provisional Patent Application No. 61/980,712, filed on Apr. 17, 2014. The entire contents of the above-referenced applications incorporated herein by reference in their entirety.

TECHNICAL FIELD

This disclosure relates to wireless power transfer.

BACKGROUND

Energy can be transferred from a power source to a receiving device using a variety of known techniques such as radiative (far-field) techniques. For example, radiative techniques using low-directionality antennas can transfer a small portion of the supplied radiated power, namely, that portion in the direction of, and overlapping with, the receiving device used for pick up. In this example, most of the energy is radiated away in directions other than the direction of the receiving device, and typically the transferred energy is insufficient to power or charge the receiving device. In another example of radiative techniques, directional antennas are used to confine and preferentially direct the radiated energy towards the receiving device. In this case, an uninterruptible line-of-sight and potentially complicated tracking and steering mechanisms are used.

Another approach is to use non-radiative (near-field) techniques. For example, techniques known as traditional induction schemes do not (intentionally) radiate power, but use an oscillating current passing through a primary coil, to generate an oscillating magnetic near-field that induces currents in a near-by receiving or secondary coil. Traditional induction schemes can transfer modest to large amounts of power over very short distances. In these schemes, the offset tolerances between the power source and the receiving device are very small. Electric transformers and proximity chargers use these traditional induction schemes.

SUMMARY

This disclosure relates to wireless transfer systems utilizing wireless power transfer of power from a power transmitting apparatus to a power receiving apparatus. To achieve high power transfer efficiency, the power transmitting apparatus and/or the power receiving apparatus can include a magnetic component and a shield to facilitate the power transfer. Particularly, it can be advantageous to have a large magnetic component in transferring high power for some applications. However, manufacturing the large magnetic component as a single monolithic piece can be impractical or expensive because materials such as ferrites can be difficult to fabricate and/or easily break. Thus, the large magnetic component can instead be formed by combining smaller magnetic elements together. In this approach, the magnetic elements are typically joined across one or more gaps, which can be filled with air or adhesive for connecting the magnetic elements. Such gaps can be problematic, however, because magnetic fields can be concentrated at regions of the gaps. The concentrated magnetic fields can penetrate the nearby shield and other materials or structures and induce eddy currents, thereby leading to losses in the systems and reductions in the amount of power transferred. To address such issues, this disclosure describes a variety of configurations of magnetic components and shields to mitigate losses induced by penetration of magnetic fields into the shields, for example, by aligning openings of the shields to gaps of the magnetic components.

In a first aspect, the disclosure features apparatuses for wireless power transfer, the apparatuses including a plurality of magnetic elements joined together to form a magnetic component extending in a plane, where discontinuities in the magnetic component between adjacent magnetic elements define gaps in the magnetic component, and a coil including one or more loops of conductive material positioned, at least in part, on a first side of the plane. The apparatuses include a conductive shield positioned on a second side of the plane and which the shield includes one or more openings positioned relative to the gaps.

Embodiments of the apparatuses can include any one or more of the following features.

The openings can be respectively aligned with corresponding ones of the gaps. The one or more openings can be positioned relative to the gaps to reduce interactions between magnetic flux crossing the discontinuities and the conductive shield.

The coil can be positioned entirely on the first side of the plane. The one or more loops of conductive material can wrap around the magnetic component. The conductive shield can be substantially parallel to the plane. The one or more openings can extend entirely through the shield.

The plane can extend in orthogonal first and second directions, and where the one or more loops of conducting material wrap around a third direction perpendicular to the first and second directions (i.e., perpendicular to the plane). The gaps can include a first gap having a longest dimension extending in the first direction, and the one or more openings can include a first opening having a longest dimension extending in a direction substantially parallel to the first direction. The first gap can have a maximum width measured in a direction parallel to the second direction, the first opening can have a maximum width measured in a direction parallel to the second direction, and the maximum width of the first opening can be larger than the maximum width of the first gap. A ratio of the maximum width of the first opening to a characteristic size of the magnetic component can be 1:10 or less.

During operation, the coil can generate a magnetic field that oscillates in a direction parallel to the second direction. A first one of the gaps can correspond to a spacing between magnetic elements in a direction parallel to the second direction, and a first one of the one or more openings can be aligned with the first one of the gaps and include a width that extends in a direction parallel to the second direction. Each of the gaps can correspond to a spacing between magnetic elements in a direction parallel to the second direction, and each of the one or more openings can be aligned with a corresponding one of the one or more gaps and includes a width that extends in a direction parallel to the second direction.

The coil can be electrically isolated from the conductive shield.

The one or more loops can include a first plurality of loops concentric about a first axis and a second plurality of loops concentric about a second axis, where the first and second axes are parallel to the third direction. The first plurality of loops can be wound in a first concentric direction about the first axis, and the second plurality of loops can be wound about the second axis in a second concentric direction opposite to the first concentric direction, when measured from an end of the first plurality of loops towards an end of the second plurality of loops. During operation, the coil can generate a magnetic field within the magnetic component that oscillates in a direction parallel to the second direction.

The plurality of magnetic elements can form an array. The plurality of magnetic elements can include 4 or more magnetic elements. At least one of the gaps can include air spaces. At least one of the gaps can include a dielectric material positioned between the magnetic elements. For example, the dielectric material can include an adhesive material.

At least some of the plurality of magnetic elements can be formed of a ferrite material. The ferrite material can include at least one material selected from the group consisting of MnZn-based materials, NiZn-based materials, amorphous cobalt-based alloys, and nanocrystalline alloys.

The coil can be configured to wirelessly transfer power to, or receive power from, another coil. A minimum distance between a surface of the magnetic component and the shield can be 1 mm or less.

At least one of the openings can include lateral surfaces that are angled with respect to the plane.

At least one of the openings can include a triangular cross-sectional profile. At least one of the openings can include a trapezoidal cross-sectional profile. At least one of the openings can include a cross-sectional profile having one or more curved edges.

At least one of the gaps can be with a magnetic material comprising a magnetic permeability different from a magnetic permeability of the plurality of magnetic elements.

In another aspect, the disclosure features apparatuses for wireless power transfer, the apparatuses including a plurality of magnetic elements joined together to form a magnetic component extending in a plane, where discontinuities in the magnetic component between adjacent magnetic elements define gaps in the magnetic component. The apparatuses include a coil comprising one or more loops of conductive material positioned, at least in part, on a first side of the plane, and a conductive shield positioned on a second side of the plane and where the shield includes one or more depressions formed in a surface of the shield facing the magnetic component. Each of the one or more depressions is positioned relative to the gaps.

Embodiments of the apparatuses can include any one or more of the following features.

The one or more depressions can be respectively aligned with corresponding ones of the gaps. The one or more depressions can be positioned relative to the gaps to reduce interactions between magnetic flux crossing the discontinuities and the conductive shield. At least one of the depressions can form an opening that extends entirely through a thickness of the shield.

The coil can be positioned entirely on the first side of the plane. The plane can extend in orthogonal first and second directions, where the one or more loops of conducting material can wrap around a third direction perpendicular to the first and second directions (i.e., perpendicular to the plane). The one or more loops of conductive material wrap around the magnetic component. The conductive shield can be substantially parallel to the plane.

The one or more depressions can include lateral surfaces that are angled with respect to a surface of the shield facing the magnetic component. A width of the one or more depressions measured at the surface of the shield facing the magnetic component can be larger than a width of the one or more depressions measured at another location between the lateral surfaces.

At least one of the depressions can include a cross-sectional profile having a triangular shape. At least one of the depressions can include a cross-sectional profile having a trapezoidal shape. At least one of the depressions can include a cross-sectional profile having one or more curved edges. At least one of the depressions can correspond to a curved groove formed in the shield.

The one or more loops can include a first plurality of loops concentric about a first axis and a second plurality of loops concentric about a second axis parallel to the first axis, and the first and second axes can be orthogonal to the plane of the magnetic component. The first plurality of loops can be wound in a first concentric direction about the first axis, and the second plurality of loops can be wound about the second axis in a second concentric direction opposite to the first concentric direction, when measured from an end of the first plurality of loops towards an end of the second plurality of loops.

During operation, the coil can generate a magnetic field within the magnetic component that oscillates in a direction parallel to a width of at least one of the depressions.

The gaps can include a first gap having a longest dimension extending in a first direction, and the depressions can include a first depression having a longest dimension extending in a direction substantially parallel to the first direction. The first gap can have a maximum width measured in a direction perpendicular to the longest dimension of the first gap. The first depression can have a maximum width measured in a direction perpendicular to the longest dimension of the first depression, and the maximum width of the first opening can be larger than the maximum width of the first gap.

Each of the gaps can correspond to a spacing between magnetic elements in a direction perpendicular to the first direction, and each of the depressions can be aligned with a corresponding one of the gaps and can have a width that extends in a direction perpendicular to the first direction.

The plurality of magnetic elements can form an array. The plurality of magnetic elements can include 4 or more magnetic elements.

At least one of the one or more gaps can include air spaces. At least one of the one or more gaps can include a dielectric material positioned between the magnetic elements. For example, the dielectric material can include an adhesive material.

At least some of the plurality of magnetic elements can be formed of a ferrite material. The ferrite material can include at least one material selected from the group consisting of MnZn-based materials, NiZn-based materials, amorphous cobalt-based alloys, and nanocrystalline alloys.

The coil can be configured to wirelessly transfer power to, or receive power from, another coil.

A ratio of the maximum width of the first depression to a characteristic size of the magnetic component can be 1:10 or less. A minimum distance between a surface of the magnetic component and the shield can be 1 mm or less. At least one of the gaps is filled with magnetic material can have a magnetic permeability different from a magnetic permeability of the magnetic elements.

In another aspect, the disclosure features methods for wirelessly transferring power using apparatuses, the methods including wirelessly transferring power from a power transmitting apparatus to a power receiving apparatus, where at least one of the power transmitting apparatus and the power receiving apparatus includes: a magnetic component extending in a plane and formed from a plurality of magnetic elements joined together, where discontinuities in the magnetic component between adjacent magnetic elements define gaps in the magnetic component, a coil including one or more loops of conductive material positioned, at least in part, on a first side of the plane, and a conductive shield positioned on a second side of the plane and comprising one or more openings positioned relative to the gaps.

The power transmitting apparatus and the power receiving apparatus can each include the magnetic component, the coil, and the conductive shield.

Embodiments of the apparatuses and methods can also include any other features disclosed herein, including features disclosed in connection with other apparatuses and methods, in any combination as appropriate.

Unless otherwise defined, all technical and scientific terms used herein have the same meaning as commonly understood by one of ordinary skill in the art to which this disclosure belongs. In case of conflict with publications, patent applications, patents, and other references mentioned or incorporated herein by reference, the present disclosure, including definitions, will control. Any of the features described above may be used, alone or in combination, without departing from the scope of this disclosure. Other features, objects, and advantages of the systems and methods disclosed herein will be apparent from the following detailed description and figures.

BRIEF DESCRIPTION OF THE DRAWINGS

FIGS. 4A and 4B are schematic diagrams showing an example of a power transmitting apparatus.

FIG. 6 is a schematic diagram of a cross-section of the power transmitting apparatus shown in FIGS. 4A, 4B and 5.

FIG. 7A-C are schematic diagrams showing examples of power transmitting apparatuses.

FIG. 7D is a schematic diagram of a magnetic component used in apparatuses shown in FIGS. 7B and 7C.

FIGS. 10A and 10B are schematic diagrams showing cross-sectional views of two examples of power transmitting apparatuses.

FIG. 10C is a schematic diagram showing the magnetic component described in FIGS. 10A and 10B and its characteristic size.

FIGS. 11A and 11B are schematic diagrams showing two examples of a power transmitting apparatuses.

FIGS. 13A and 13B are schematic diagrams showing two examples of power transmitting apparatuses.

FIG. 15A shows three images of an example of a power transmitting apparatus.

FIG. 16 is a plot showing measured values of $Q_{trans}$ of apparatuses shown in FIGS. 15A and 15B.

FIG. 17 is a plot showing measured values of $Q_{shield}$ of apparatuses shown in FIGS. 15A and 15B.

FIG. 19A is a schematic diagram of an example of a power transmitting apparatus.

FIG. 19B is a schematic diagram of a cross-section of an example of a power transmitting apparatus.

FIG. 19E is a schematic diagram showing an example of a magnetic component.

FIG. 20A is a schematic diagram showing an additional example of a coil in a power transmitting apparatus.

FIG. 20B is a schematic diagram showing another example of a coil in a power transmitting apparatus.

FIG. 21 is a schematic diagram showing another example of a coil in a power transmitting apparatus.

FIGS. 24A-C are schematic diagrams showing an example of a power transmitting apparatus.

FIG. 25 is a block diagram of a computing device.

Like reference numbers and designations in the various drawings indicate like elements.

DETAILED DESCRIPTION

Introduction

Figure 1:
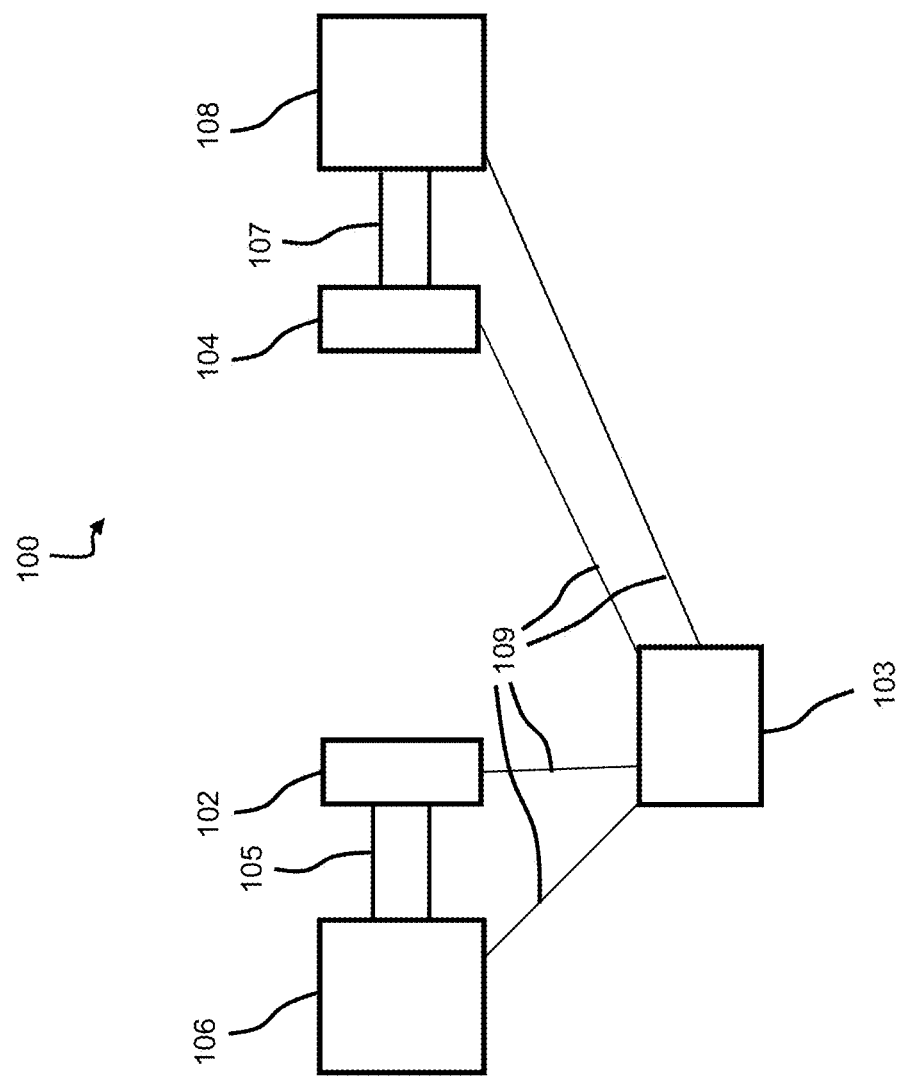
FIG. 1 is a schematic diagram of a wireless power transfer system.

FIG. 1 is a schematic diagram of a wireless power transfer system 100. System 100 includes a power transmitting apparatus 102 and a power receiving apparatus 104. Power transmitting apparatus 102 is coupled to power source 106 through a coupling 105. In some embodiments, coupling 105 is a direct electrical connection. In certain embodiments, coupling 105 is a non-contact inductive coupling. In some embodiments, coupling 105 can include an impedance matching network (not shown in FIG. 1). Impedance matching networks and methods for impedance matching are disclosed, for example, in commonly owned U.S. patent application Ser. No. 13/283,822, published as US Patent Application Publication No. 2012/0242225, the entire contents of which are incorporated herein by reference.

In similar fashion, power receiving apparatus 104 is coupled to a device 108 through a coupling 107. Coupling 107 can be a direct electrical connection or a non-contact inductive coupling. In some embodiments, coupling 107 can include an impedance matching network, as described above.

In general, device 108 receives power from power receiving apparatus 104. Device 108 then uses the power to do useful work. In some embodiments, for example, device 108 is a battery charger that charges depleted batteries (e.g., car batteries). In certain embodiments, device 108 is a lighting device and uses the power to illuminate one or more light sources. In some embodiments, device 108 is an electronic device such as a communication device (e.g., a mobile telephone) or a display. In some embodiments, device 108 is a medical device which can be implanted in a patient.

During operation, power transmitting apparatus 102 is configured to wirelessly transmit power to power receiving apparatus 104. In some embodiments, power transmitting apparatus 102 can include a source coil, which can generate oscillating fields (e.g., electric, magnetic fields) when electrical currents oscillate within the source coil. The generated oscillating fields can couple to power receiving apparatus 104 and provide power to the power receiving apparatus through the coupling. To achieve coupling between power transmitting apparatus 102 and power receiving apparatus 104, the power receiving apparatus 104 can include a receiver coil. The oscillating fields can induce oscillating currents within the receiver coil. In some embodiments, either or both of the source and receiver coils can be resonant. In certain embodiments, either or both of the source and receiver coils can be non-resonant so that the power transfer is achieved through non-resonant coupling.

In certain embodiments, the system 100 can include a power repeating apparatus (not shown in FIG. 1). The power repeating apparatus can be configured to wirelessly receive power from the power transmitting apparatus 102 and wirelessly transmit the power to the power receiving apparatus 104. The power repeating apparatus can include similar elements described in relation to the power transmitting apparatus 102 and the power receiving apparatus 104 above.

System 100 can include an electronic controller 103 configured to control the power transfer in the system 100, for example, by directing electrical currents through coils of the system 100. In some embodiments, the electronic controller 103 can tune resonant frequencies of resonators included in the system 100, through coupling 109. The electronic controller 103 can be coupled to one or more elements of the system 100 in various configurations. For example, the electronic controller 103 can be only coupled to power source 106. The electronic controller 103 can be coupled to power source 106 and power transmitting apparatus 102. The electronic controller 103 can be only coupled to power transmitting apparatus 102. In some embodiments, coupling 109 is direct connection. In certain embodiments, coupling 109 is a wireless communication (e.g., radio-frequency, Bluetooth communication). The coupling 109 between the electronic controller 103 can depend on respective one or more elements of the system 100. For example, the electronic controller 103 can be directly connected to power source 106 while wirelessly communicating with power receiving apparatus 104.

In some embodiments, the electronic controller can configure the power source 106 to provide power to the power transmitting apparatus 102. For example, the electronic controller can increase the power output of the power source 106 sent to the power transmitting apparatus 102. The power output can be at an operating frequency, which is used to generate oscillating fields by the power transmitting apparatus 102.

In certain embodiments, the electronic controller 103 can tune a resonant frequency of a resonator in the power transmitting apparatus 102 and/or a resonant frequency of a resonator in the power receiving apparatus 104. By tuning resonant frequencies of resonators relative to the operating frequency of the power output of the power source 106, the efficiency of power transfer from the power source 106 to the device 108 can be controlled. For example, the electronic controller 103 can tune the resonant frequencies to be substantially the same (e.g., within 0.5%, within 1%, within 2%) to the operating frequency to increase the efficiency of power transfer. The electronic controller 103 can tune the resonant frequencies by adjusting capacitance values of respective resonators. To achieve this, for example, the electronic controller 103 can adjust a capacitance of a capacitor connected to a coil in a resonator. The adjustment can be based on the electronic controller 103's measurement of the resonant frequency or based on wireless communication signal from the apparatuses 102 and 104. In certain embodiments, the electronic controller 103 can tune the operating frequency to be substantially the same (e.g., within 0.5%, within 1%, within 2%) to the resonant frequencies of the resonators.

In some embodiments, the electronic controller 103 can control an impedance matching network in the system 100 to optimize or de-tune impedance matching conditions in the system 100, and thereby control the efficiency of power transfer. For example, the electronic controller 103 can tune capacitance of capacitors or networks of capacitors included in the impedance matching network connected between power transmitting apparatus 102 and power source 106. The optimum impedance conditions can be calculated internally by the electronic controller 103 or can be received from an external device.

In some embodiments, wireless power transfer system 100 can utilize a source resonator to wirelessly transmit power to a receiver resonator. For example, power transmitting apparatus 102 can include a source resonator that includes a source coil, and power receiving apparatus 104 can include a receiver resonator that includes a receiver coil. Power can be wirelessly transferred between the source resonator and the receiver resonator.

In this disclosure, "wireless energy transfer" from one coil (e.g., resonator coil) to another coil (e.g., another resonator coil) refers to transferring energy to do useful work (e.g., electrical work, mechanical work, etc.) such as powering electronic devices, vehicles, lighting a light bulb or charging batteries. Similarly, "wireless power transfer" from one coil (e.g., resonator coil) to another resonator (e.g., another resonator coil) refers to transferring power to do useful work (e.g., electrical work, mechanical work, etc.) such as powering electronic devices, vehicles, lighting a light bulb or charging batteries. Both wireless energy transfer and wireless power transfer refer to the transfer (or equivalently, the transmission) of energy to provide operating power that would otherwise be provided through a wired connection to a power source, such as a connection to a main voltage source. Accordingly, with the above understanding, the expressions "wireless energy transfer" and "wireless power transfer" are used interchangeably in this disclosure. It is also understood that, "wireless power transfer" and "wireless energy transfer" can be accompanied by the transfer of information; that is, information can be transferred via an electromagnetic signal along with the energy or power to do useful work.

Multiple-Element Magnetic Components

Figure 2:
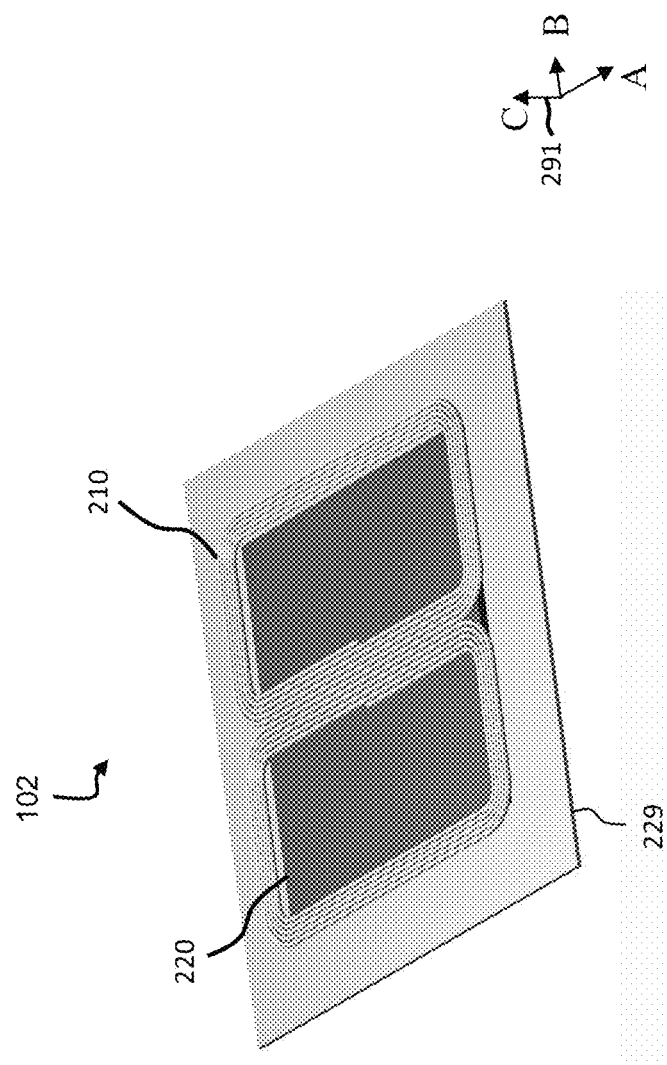
FIG. 2 is a schematic diagram of an example of a power transmitting apparatus.

FIG. 2 is a schematic diagram of an example of a power transmitting apparatus 102 including a coil 210, a magnetic component 220 and a shield 229 according to coordinate 291. The coil 210 includes a plurality of loops and can be connected to a capacitor (not shown). The coil 210 can be formed of a first conductive material. In some embodiments, the coil 210 can be a litz wire. For example, litz wire can be used for operation frequencies of lower than 1 MHz. In certain embodiments, the coil 210 can be a solid core wire or conducting layers (e.g., copper layers) in a printed circuit board (PCB). For example, such solid core wire or conducting layers can be used for operation frequencies of 1 MHz or higher. The magnetic component 220 is positioned between the coil 210 and the shield 229. The magnetic component 220 can guide a magnetic flux induced by the plurality of loops of the coil 210. The presence of the magnetic component 220 can lead to an increase of a magnetic flux density generated by the coil 210 in a region adjacent to the coil 210 when oscillating electrical currents circulate in the coil 210, compared to the case without the magnetic component 220.

The shield 229 (e.g., a sheet of electrically conductive material) can be positioned adjacent to the source resonator. The shield 229 can be formed of a second conductive material. For example, the shield 229 can be formed from a sheet of material such as copper, silver, gold, iron, steel, nickel and/or aluminum. Typically, the shield 229 acts to shield the resonator from loss-inducing objects (e.g., metallic objects). Further, in some embodiments, the shield 229 can increase coupling of the source resonator to another resonator by guiding magnetic field lines in the vicinity of the source resonator. For example, energy loss from aberrant coupling to loss-inducing objects can be reduced by using the shield 229 to guide magnetic field lines away from the loss-inducing objects.

While FIG. 2 shows power transmitting apparatus 102, it should be understood that a power receiving apparatus (e.g., power receiving apparatus 104 in FIG. 1) or power repeating apparatus can include similar elements. For example, power receiving apparatus 104 can include a coil, a capacitor and a magnetic component. A shield can be positioned adjacent to these elements.

Magnetic components can include magnetic materials. Typical magnetic materials that are used in the magnetic components disclosed herein include materials such as manganese-zinc (MnZn) and nickel-zinc (NiZn) ferrites. MnZn based ferrites can include a $Mn_xZn_{1-x}Fe_2O_4$ where x ranges from 0.1-0.9. For example, x can be 0.2-0.8. NiZn based ferrites can include a $Ni_xZn_{1-z}Fe_2O_4$ ferrite where x ranges from 0.1-0.9. For example, x can be in a range of 0.3-0.4. In some embodiments, magnetic materials can include NiZn based ferrites such as NL12® from Hitachi and 4F1® from Ferroxcube, for example, for operation frequencies of 2.5 MHz or above. In certain embodiments, magnetic materials can include MnZn based ferrites such as ML90S® from Hitachi, for example, for operation frequencies between 500 kHz and 2.5 MHz. In some embodiments, magnetic materials can include MnZn based ferrites such as PC95® from TDK, N95®, N49® from EPCOS and ML24D® from Hitachi, for example, for operation frequencies of 500 kHz or lower. In certain embodiments, magnetic materials can include amorphous cobalt-based alloys and nanocrystalline alloys, for example, for operation frequencies of 100 kHz or lower. Nanocrystalline alloys can be formed on a basis of Fe, Si and B with additions of Nb and Cu. Nanocrystalline magnetic materials can be an alloy of Fe, Cu, Nb, Si and B (e.g., $Fe_{73.5}Cu_1Nb_3Si_{15.5}B_7$). In some embodiments, nanocrystalline magnetic materials can be an alloy of Fe, Co, Zr, B and Cu. In certain embodiments, nanocrystalline magnetic materials can be an alloy of Fe, Si, B, Cu and Nb. In certain embodiments, nanocrystalline magnetic materials can be an alloy of Fe, Co, Cu, Nb, Si and B. The nanocrystalline magnetic materials can include an alloy based on Fe. For example, the alloy can be a FeSiB alloy.

While these materials are generally available in small sizes, some applications for wireless power transfer utilize magnetic components with a large areal size. For example, a car battery charging application may need to use a large areal size (e.g., 30 cm×30 cm) magnetic component to transfer high power of 1 kW or more (e.g., 2 kW or more, 3 kW or more, 5 kW or more, 6 kW or more).

In some embodiments, a single monolithic piece of magnetic components can be utiltized when the single monolithic piece of the required size is available. In some embodiments, it can be difficult and/or expensive to manufacture a monolithic piece of magnetic component such as MnZn or NiZn ferrites with a large areal size (e.g., 30 cm×30 cm) needed for the high power transfer. Moreover, MnZn and NiZn ferrites can be brittle, and accordingly, large-area pieces of these materials can be highly susceptible to breakage. To overcome such difficulties when fabricating the magnetic components disclosed herein, ferrite materials can be manufactured in pieces of small areal size (e.g., 5 cm×5 cm), and several such pieces can be joined together to form a larger combined magnetic component. These smaller magnetic elements can behave functionally in a very similar manner as a larger magnetic element when they are joined.

However, joining multiple smaller magnetic elements to form a larger magnetic component can introduce gaps and certain inhomogeneities relative to a single sheet of magnetic component. In particular, irregularities at the edges of the small pieces can lead to "magnetic field hot spots," where magnetic fields are locally concentrated at the irregularities. Magnetic field hot spots due to irregularities at the edges of the joined pieces of magnetic component can damage the magnetic component due to heating, and/or reduce the quality factor of the apparatus.

Figure 3:
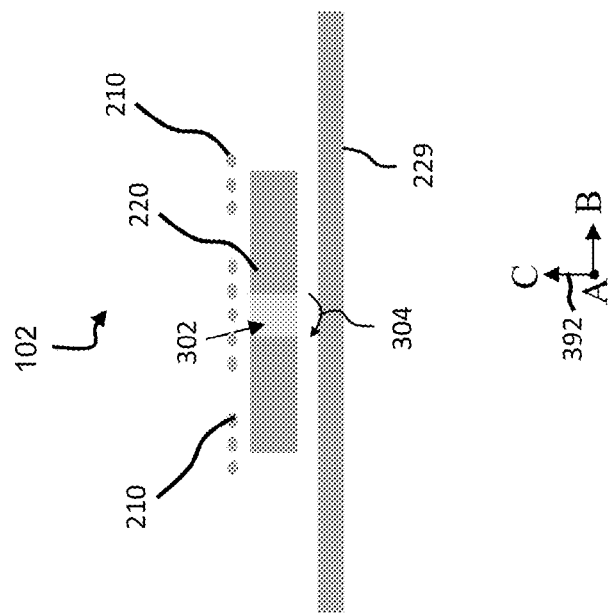
FIG. 3 is a schematic diagram showing a cross-sectional view of the power transmitting apparatus shown in FIG. 2.

In some embodiments, a gap can be formed between two pieces of magnetic elements. The gap can be an air gap, or can be filled with a dielectric material such as adhesive or a type of material different from the material of the magnetic elements (e.g., ferrite). When magnetic fields oscillate substantially perpendicular to interfaces of the gap, the magnetic fields can be concentrated with high density within the gap. In addition, magnetic fields can also be concentrated with high density at locations above or below the gap, and these concentrated magnetic fields can penetrate a portion of a shield at positions above or below or in the general vicinity of the gap. Such penetration can lead to loss of energy by generating eddy currents and heat in the corresponding portions of the shield. Similarly, strongly localized magnetic field hot spots induced by irregularities in the magnetic component may penetrate the shield and lead to loss of energy. To illustrate this phenomena, FIG. 3 is a schematic diagram showing a cross-sectional view of the power transmitting apparatus 102 shown in FIG. 2 according to coordinate 392. In this example, when coil 210 generates a magnetic field within a gap 302 of magnetic component 220, portions of the magnetic field 304 extend below the gap 302 and penetrate the shield 229, which leads to energy loss as discussed above.

To mitigate such energy losses, this disclosure features shield geometries that reduce the effects of hot spots and concentrated magnetic fields due to irregularities at the edges and gaps of joined magnetic elements (e.g., pieces of magnetic component). In particular, energy losses due to the penetration of magnetic fields into shield 229 can be reduced by forming openings in the shield 229 and/or by modifying the shape of shield 229 in regions where the magnetic field density is locally increased, e.g., in regions corresponding to gaps between the magnetic elements. By adjusting the shape of the shield 229, the extent to which the magnetic field 304 penetrates the shield 229 can be reduced, thereby mitigating energy losses.

The shields disclosed herein allow the use of magnetic components of large areal sizes (e.g., by joining many smaller pieces of magnetic component) while reducing energy losses due to interactions between the shield and concentrated magnetic fields. As a result, apparatuses that include the shields disclosed herein can achieve high power transfer efficiencies and can operate over a wide range of power transfer levels (e.g., between 0.5 kW to 50 kW). For example, the power transfer can be 3.3 kW or more (e.g., 6.6. kW or more).

Shield Configurations

FIG. 4A is a schematic diagram showing an example of a power transmitting apparatus 102 including a coil 210, a magnetic component 220 and a shield 230. Shield 230 can function in a manner similar to shield 229 in FIG. 2, and the shield 230 can include an opening 560 which will be described later. Shield 230 can be formed of a conductive material similar to shield 229. Coordinate 390 is the local coordinate of the magnetic component 220.

In FIG. 4A, the coil 210 is positioned above the magnetic component 220. The magnetic component 220 is positioned above the shield 230 in the C-direction without a portion of the coil 210 in between the magnetic component 220 and the shield 230 (e.g., without coil 210 extending in the C-direction). This configuration of the coil 210 can provide a compact power transmitting apparatus because the coil 210 does not take up space between the magnetic component 220 and the shield 230 as compared to FIG. 22 described later.

The shield 230 lies in a plane nominally parallel to another plane in which the coil 210 lies. In this example, the magnetic component 220 lies in a plane parallel to another plane in which the coil 210 lies. In certain embodiments, the magnetic component 220 lies in a plane substantially parallel (e.g., within 3°, within 5°, within 10°, within 15°) to another plane in which the coil 210 lies.

The magnetic component 220 includes four magnetic elements 410, 412, 414 and 416 (e.g., ferrite tiles) each shaped as a rectangular slab. The magnetic elements are joined together with a dielectric material 420 to form the magnetic component 220, which extends in a plane parallel to the A-B plane. In this example, the dielectric material 420 is an adhesive material which bonds the four magnetic elements 410, 412, 414 and 416 together. As explained previously, by fabricating a magnetic component from smaller magnetic elements, large-size magnetic components can be produced more easily and at lower cost compared to fabrication methods that rely on producing monolithic elements. By using multiple small magnetic elements to form a larger magnetic component, the size of the magnetic component can generally be selected as desired for a particular apparatus. In some embodiments, the size of the magnetic component can have an area of 30 cm×30 cm or larger (e.g., 40 cm×40 cm or larger, 50 cm×50 cm or larger).

In some embodiments, the magnetic component 220 can be formed from a plurality of tiles, blocks, or pieces of magnetic component that are arranged together to form magnetic component 220. The plurality of tiles, blocks, or pieces can all be formed from the same type of magnetic component, or can be formed from two or more different types of magnetic components. For example, in some embodiments, materials with different magnetic permeability can be located at different positions of the magnetic component 220. A dielectric material such as adhesive can be used to glue the different magnetic elements together. In some embodiments, magnetic elements can be in direct contact with one another. Irregularities in interfaces between the direct contact can lead to magnetic field hot spots. In some embodiments, the magnetic component 220 can include electrical insulator layers, coatings, strips, adhesives for mitigating build-up of heat at irregular interfaces within the magnetic component 220.

Referring back to FIG. 4A, the magnetic component 220 includes gaps 422 and 423, which are formed between the magnetic elements 410, 412, 414 and 416. The discontinuities in the magnetic component 220 between adjacent magnetic elements define the gaps 422 and 423. The gap 422 has its longest dimension extending in the A-direction and a maximum width 424 measured in a direction parallel to the B-direction. The gap 423 has its longest dimension extending in the B-direction and a maximum width 425 measured in the A-direction. The dielectric material 420 can fill the gaps 422 and 423. In some embodiments, the gap 422 has a constant width measured in the B-direction. In certain embodiments, the gap 422 can have a non-constant width measured in the B-direction, e.g., depending upon the shapes of magnetic elements 410, 412, 414, and 416. For example, the magnetic elements can be arranged so that the gap 422 has a varying width. In some embodiments, the non-constant width can be due to curved edges of the magnetic elements.

The coil 210 has a plurality of loops which lie in the A-B plane, and includes windings 451 and 452. The windings 451 and 552 correspond to first and second plurality of loops, respectively of the coil 210. The winding 451 has an end 401 and connects to the winding 452, which has an end 403. In this example, starting from the end 401, the winding 451 is concentrically wound around an axis 402 (starting from the inner winding of winding 452 towards its outer winding), which points into the drawing plane in (i.e., negative C-direction in FIG. 4A) according to the right-hand rule convention, which is used through-out this disclosure. The C-direction is perpendicular to the A-direction and the B-direction. As starting from the connected part between windings 451 and 452, the winding 452 is concentrically wound around an axis 404 (starting from the outer winding of winding 452 towards its inner winding), which points out of the drawing plane (i.e., positive C-direction in FIG. 4A). In this example, the winding 451 is wound around in opposite direction of the winding 452 when measured from end 401 to end 403. Dashed arrows 479 depict the direction of current flow in the windings 451 and 452 at a given time. In another way to described the winding directions, the winding 451 can be said to have clock-wise winding starting from its inner winding as seen towards the negative C-direction from the positive C-direction, and the winding 451 can be said to have clock-wise winding starting from its inner winding as seen towards the negative C-direction from the positive C-direction. In other words, the two windings can be said to have the same winding directions when measured from starting at their respective inner winding towards their outer windings.

The coil 210 is configured to generate oscillating magnetic fields and magnetic dipoles in the magnetic component 220, which oscillate substantially along the B-axis, when currents oscillate within the coil 210. The plurality of loops of the coil 210 define a coil that is positioned in the A-B plane. More generally, the coil 210 may form a flat portion of the coil 210 that is oriented at an angle to the A-B plane. For example, the angle can be within 5° or less (e.g., 10° or less, 15° or less, 20° or less). Generally, either or both of the axes 402 and 404 may point at an angle with respect to the C-direction. For example, the angle can be within 5° or less (e.g., 10° or less, 15° or less, 20° or less). In this disclosure, the "x" notation (e.g., of axis 402) refers to a direction pointing into the drawing plane (i.e., negative C-direction in FIG. 4A) and the "dot" notation (e.g., of axis 404) refers to a direction pointing out of the drawing plane (i.e., positive C-direction in FIG. 4A).

In this disclosure an "average magnetic field" of a magnetic component at a given time refers to the magnetic field integrated over the total volume of all magnetic elements in the magnetic component at the given time. Referring back to FIG. 4A, when an electrical current flows through the coil 210 from the end 403 to the end 401, the current in the winding 451 circulates counter-clockwise, while current in the winding 452 circulates clockwise, as viewed from the positive C-direction towards the negative C-direction.

Figure 4B:
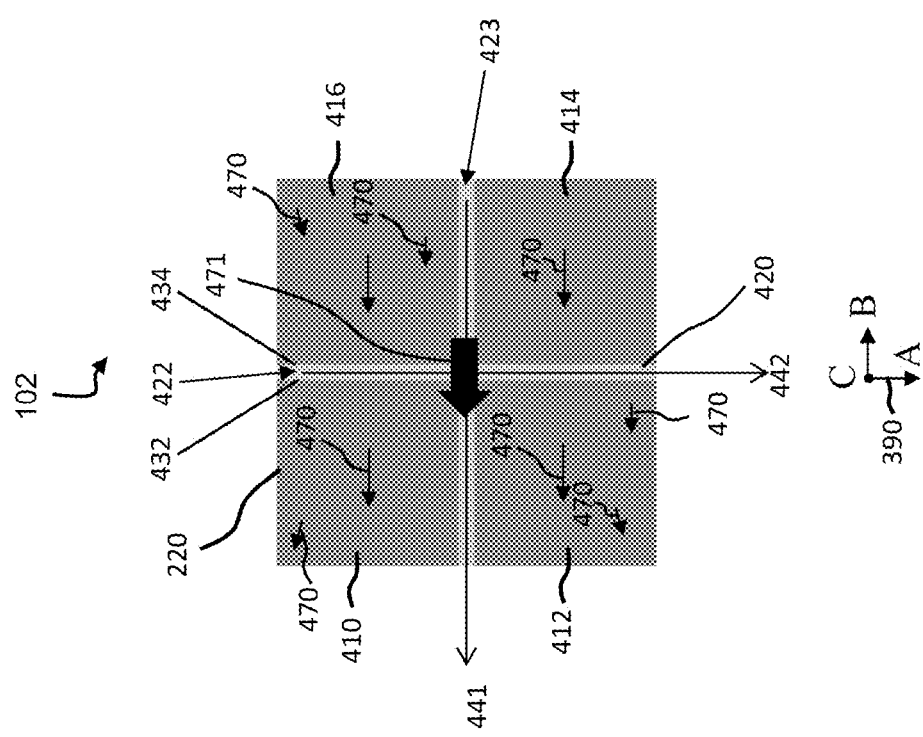

The oscillating electrical current in the coil 210 generates magnetic fields within the magnetic component 220. To illustrate this, the power transmitting apparatus 102 shown in FIG. 4A is depicted in FIG. 4B. The coil 210 and the shield 230 are not shown. Coordinate 390 is the local coordinate of the magnetic component 220. Magnetic fields at several locations of the magnetic elements 410, 412, 414 and 416 at a particular time are schematically drawn as magnetic field lines 470. FIG. 4B also schematically depicts an average magnetic field 471 of the magnetic component 220, which is the average of magnetic fields within the volume of magnetic elements 410, 412, 414 and 416 at a given time. In this example, the average magnetic field 471 points in direction 441 along the negative B-direction, at a given time. More generally, in some embodiments, the average magnetic field 471 points substantially along the direction 441 within 1° (e.g., within 3°, within 5°, within 10°) at a given time. Furthermore, the magnetic fields generated in the gap 422 oscillate in the B-direction. Accordingly, the magnetic fields generated in the gap 422 oscillate in a direction nominally perpendicular to an interface 432 between the magnetic element 410 and the dielectric material 420 and an interface 434 between the magnetic element 416 and the dielectric material 420. Direction 442 is perpendicular to the direction 441.

Generally, when the coil 210 generates magnetic fields in the magnetic component 220 with the average magnetic field 471 pointing along the direction 441 at a given time, high densities of magnetic fields become concentrated in the gap 422. Moreover, irregularities at interfaces 432 and 434 of the gap 422 can contribute to form magnetic field hot spots.

Figure 5:
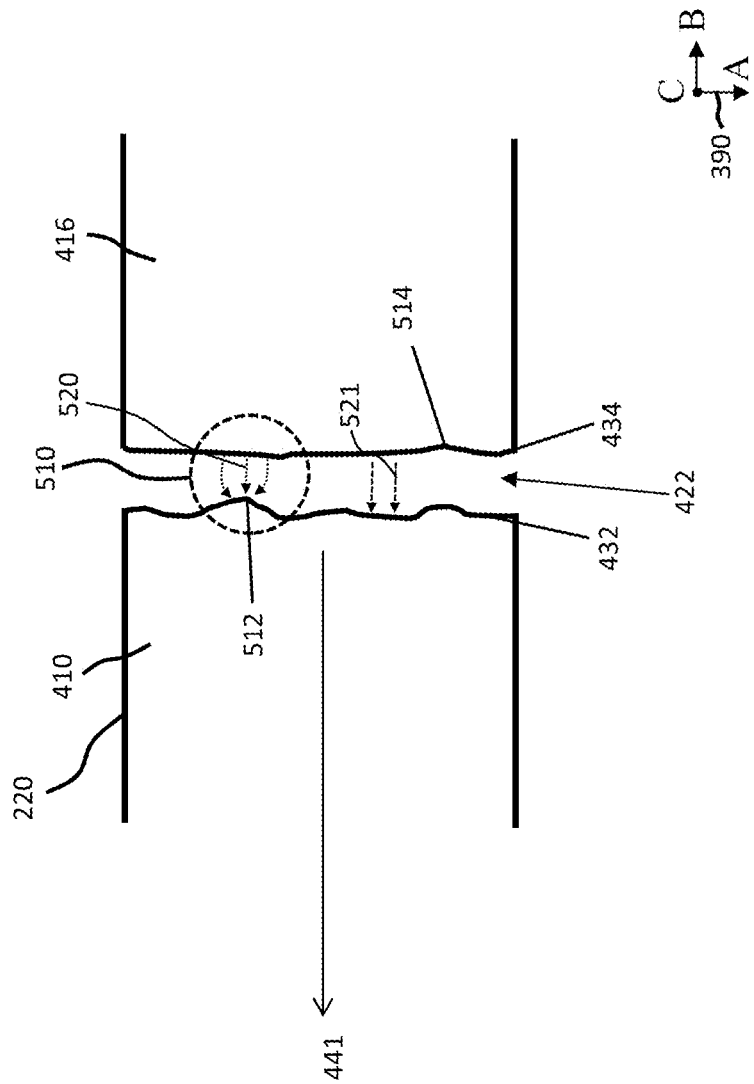
FIG. 5 is a schematic diagram of a portion of the power transmitting apparatus shown in FIGS. 4A and 4B.

FIG. 5 is a schematic diagram of a portion of the power transmitting apparatus 102 shown in FIGS. 4A and 4B, showing the gap 422 between magnetic elements 410 and 416 at higher magnification. Coordinate 390 is the local coordinate as shown in FIGS. 4A and 4B. The interfaces 432 and 434 between the magnetic elements 410 and 416 are also shown. The interfaces 432 and 434 form the discontinuities of the magnetic component 220 between adjacent magnetic elements 410 and 416. During operation, the coil 210 can generate oscillating magnetic fields, with a high density of magnetic fields 521 being concentrated in the gap 422 between the interfaces 432 and 434. The gap 422 is filled with the dielectric material 420 (not shown) such as adhesive for joining the magnetic elements 410 and 416. In some embodiments, the gap 422 is filled with air—in this case, the gap 422 is referred as an air gap.

In some embodiments, strongly localized magnetic field hot spots can be formed within the gap 422. For example, as shown in FIG. 5, interfaces 432 and 434 may not be perfectly planar, and may include local peaks (e.g., peak 512 of interface 432) and/or valleys (e.g., valley 514 of interface 434). Oscillating magnetic fields between the interfaces 432 and 434 along the direction 441 can form "magnetic field hot spots," where the magnetic fields are locally (e.g., in regions of the peaks or valleys) concentrated compared to other regions of the interfaces 432 and 434.

For example, magnetic fields 520 depicted as dashed arrows within region 510 concentrate on the peak 512. Concentrated field regions (e.g., region 510) may lead to increased heating, material breakdown, and/or damaging of the magnetic component, which can lead to deteriorated power transfer efficiency provided by the power transmitting apparatus 102.

Magnetic field hot spots can become more pronounced when the distance between the interfaces 432 and 434 is decreased. The distance between the interfaces 432 and 434 can be reduced (for example, when elements 410 and 416 are joined together more closely) to achieve a more compact arrangement of the magnetic elements 410 and 416. Polishing the interfaces can, in certain embodiments, assist in reducing the extent of irregularities at the surfaces. However, it has generally been found that mechanical polishing alone does not fully ameliorate surface irregularities that lead to magnetic hot spots.

FIG. 6 is a schematic diagram of a cross-sectional view of the power transmitting apparatus 102 described in FIGS. 4A, 4B and 5. Coordinate 392 is the local coordinate of the magnetic component 220 as shown in FIGS. 4A, 4B and 5. The coil 210 can generate magnetic fields 521 in the gap 422 between the interfaces 432 and 434. In addition, concentrated magnetic fields 525 are also generated above and below gap 422 due to fringe effects. The fringe effects arise due to the edges of the magnetic elements 410 and 412 at the gap 422, where the edges induce magnetic fields 525 to curve outwards from the A-B plane of the magnetic elements in FIG. 6. In addition, similarly, locations which form magnetic field hot spots such as in region 510 (shown in FIG. 5) can lead to high magnetic fields above and below the gap 522 due to fringe effects.

In the examples shown in FIGS. 4A, 4B, 5 and 6, the shield 230 is placed adjacent to the magnetic component 420. This is illustrated in FIG. 6, where the shield 230 is depicted below the magnetic elements 410 and 416. The shield 230 includes an opening 560 adjacent to the gap 422. Opening 560 extends entirely through the thickness 611 of shield 230.

For a conventional shield without opening 560, the magnetic fields 525 below the gap 422 would penetrate the shield. Because the magnetic fields 525 can be strong due to the gap as described above, such penetration can induce large eddy currents which can generate heat in the shield. This leads to energy losses in the power transmitting apparatus 102. If the conventional shield were moved closer to the gap 422, the losses become even larger as magnetic fields 525 induce stronger eddy currents in the shield.

However, unlike conventional shields, the shield 230 has its opening 560 aligned to the gap between magnetic elements 410 and 416 and located in a region of the magnetic fields 525. As a result, the penetration of fields 525 into shield 230 is significantly reduced or even eliminated, thereby mitigating the generation of strong eddy currents in the shield 230. Thus, energy losses due to the shield 230 can be reduced or even eliminated, relative to energy losses that would otherwise occur due to a conventional shield.

Electromagnetic simulations can be used to predict and to compare characteristics of various power transmitting apparatuses. FIGS. 7A-C show schematic diagrams of a plurality of different embodiments for which operating characteristics have been both simulated and measured. FIG. 7A shows a portion of a power transmitting apparatus 700 including a coil 210. FIG. 7B shows a portion of a power transmitting apparatus 710 including a coil 210 and a magnetic component 220. FIG. 7C shows a portion of a power transmitting apparatus 720 including a coil 210, magnetic component 220 and a shield 229. FIGS. 7A-C are depicted according to coordinates 291. In all three apparatuses, coil 210 includes a litz wire forming a plurality of loops. In apparatuses 710 and 720, magnetic component 220 includes a 2×2 array of 100 mm×100 mm N95 ferrite tiles. The N95 ferrite tiles are formed from MnZn ferrite materials. In apparatus 720, shield 229 is 0.3 m×0.3 m in size and does not have an opening. The minimum distance between any point on the surface of magnetic component 220 and any point on the surface of shield 229 is 1 mm. FIG. 7D is a schematic diagram of the magnetic component 220 in apparatuses 710 and 720. In these embodiments, the magnetic component 220 has a constant width 424 of gap 422 measured in the B-direction.

Typically, wireless power transfer using high Q-factor resonators can be efficient because the high Q-factor can lead to large energy transfer efficiency between resonators. Furthermore, quality factor $Q_{trans}$ of an apparatus and quality factor contributed by a shield $Q_{shield}$ (which will be described in greater detail in a later section) can be indicators of how efficient the power transfer can be between apparatuses. In the following, the quality factor $Q_{trans}$ of an apparatus and the quality factor contributed by a shield to an apparatus, $Q_{shield}$, are discussed. A smaller value of quality factor $Q_{trans}$ can lead to smaller energy transfer efficiency between apparatuses.

Figure 8:
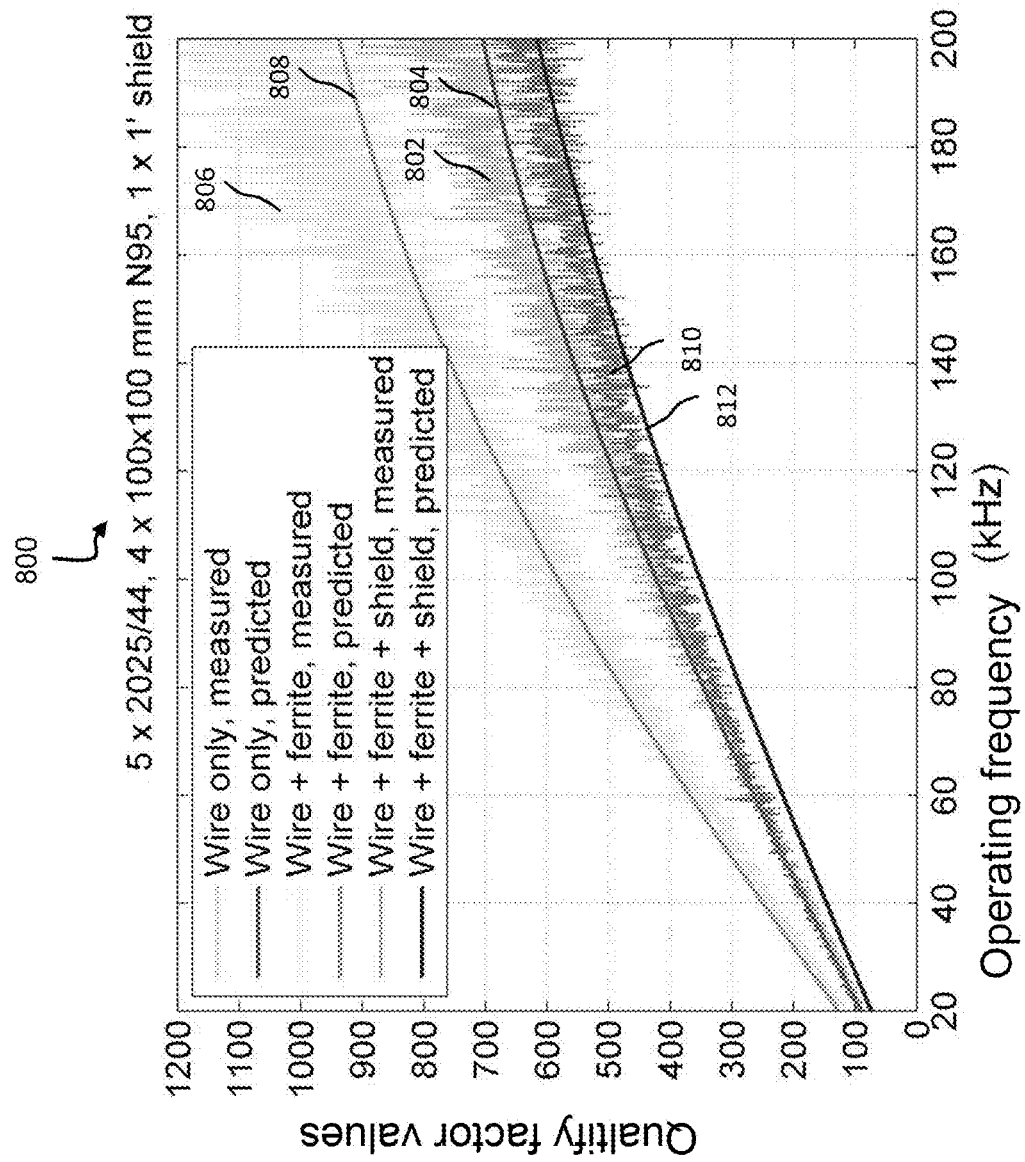
FIG. 8 is a plot showing measured and simulated quality factor values of the power transmitting apparatuses shown in FIGS. 7A-C.

FIG. 8 is a plot 800 showing measured and simulated quality factor values of apparatuses 700, 710 and 720 as function of an operating frequency of currents applied to coil 210, where width 424 of gap 422 is 1 mm. Curves 802 and 804 are the measured and simulated quality factor values for apparatus 700, respectively. Curves 806 and 808 are the measured and simulated quality factor values for apparatus 710, respectively. Curves 810 and 812 are the measured and simulated quality factor values for apparatus 720, respectively. Curves 810 and 812 indicate smaller quality factor values compared to the quality factor values of curves 802, 804, 806 and 808 for a given operating frequency. The smaller values are attributable to the presence of the shield 229 of apparatus 720; energy loss occurs when magnetic fields generated by coil 210 penetrate the shield 229, as described in relation to FIGS. 3 and 6. The measured and simulated inductance values of apparatus 700 are 19.2 µH and 19.6 µH, respectively. The measured and simulated inductance values of apparatus 710 are 26.9 µH and 27.3 µH, respectively. The measured and simulated inductance values of apparatus 720 are 26.1 µH and 26.2 µH, respectively.

Figure 9:
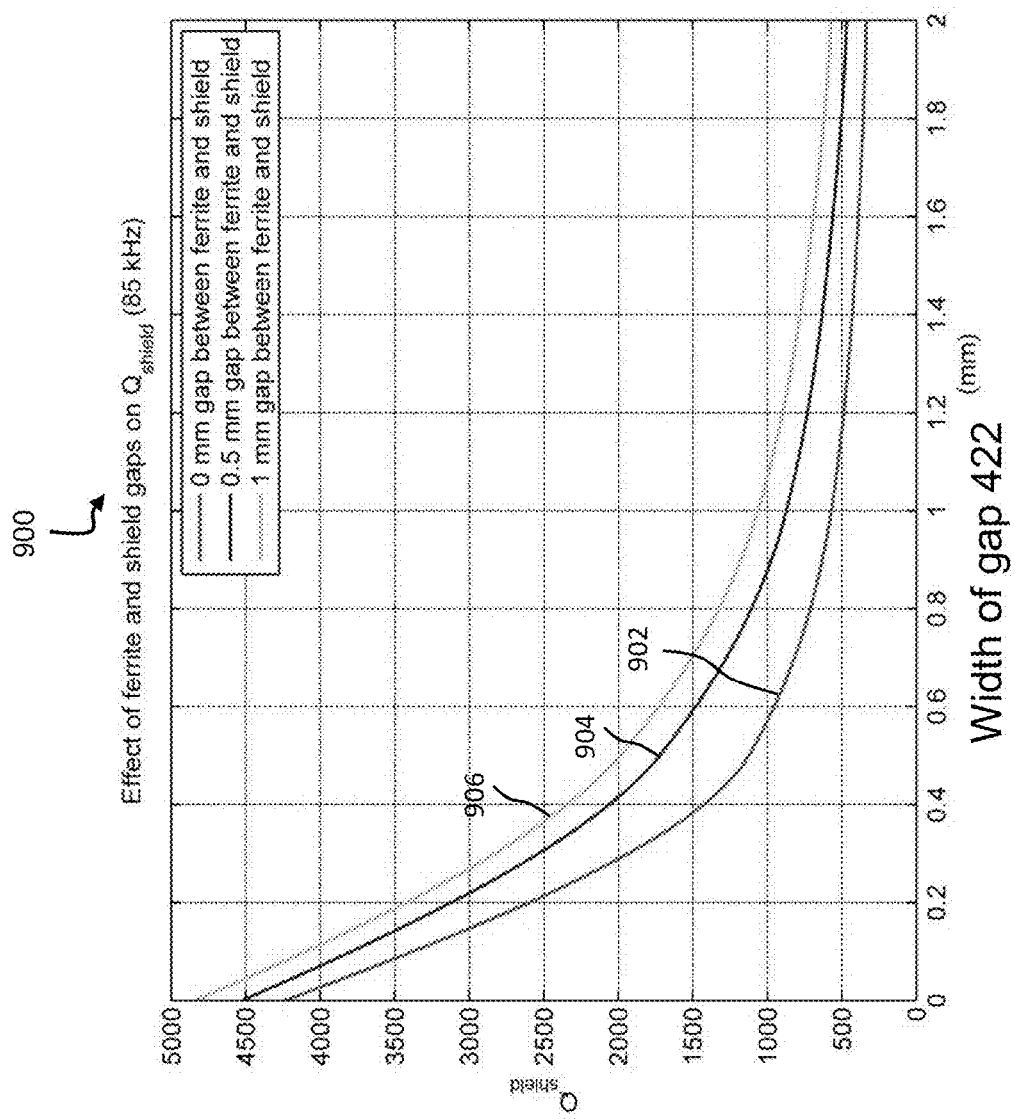
FIG. 9 is a plot showing simulated values of $Q_{shield}$ for an apparatus shown in FIG. 7C.

Electromagnetic simulations can be used to compare characteristics of systems with different distances between magnetic component and shields. Generally, the minimum distance between any point on the surface of magnetic component 220 and any point on the surface of shield 229 can be 1 mm or less (e.g., 2 mm or less, 5 mm or less, 10 mm or less, 15 mm or less, 20 mm or less). FIG. 9 is a plot 900 showing simulated values of $Q_{shield}$ according to Eq. (3) (described later) of the apparatus 720 for different separation distances between the magnetic component 220 and the shield 229 in the C-direction at an operating frequency of 85 kHz. $Q_{shield}$ is calculated as a function of the width 424 of gap 422 measured in the B-direction. Curve 902 corresponds to a zero separation distance. Curve 904 corresponds to a separation distance of 0.5 mm. Curve 906 corresponds to a separation distance of 1 mm. Curve 902 has the smallest $Q_{shield}$ for a given width 424 of the gap 422. Accordingly, shield 229 corresponding to curve 902 leads to the largest energy loss compared to that of other curves. This is because, for the case of curve 902, shield 429 is closest to the magnetic component 220, and thus a larger portion of magnetic fields penetrate the shield 229. For all three curves 902, 904 and 906, $Q_{shield}$ decreases as the width of the gap 422 increases. In some embodiments, a separation distance between a shield and a magnetic component can be increased to have a higher $Q_{shield}$ by reducing penetration of localized magnetic fields into the shield. However, this approach may be disadvantageous because the overall size of a power transmitting apparatus becomes larger due to the increased separation between the shield and the magnetic component.

As previously described, energy loss due to penetration of magnetic fields into shield 229 can be reduced by forming openings in the shield 229 where the magnetic field density is locally increased, e.g., in regions corresponding to gaps between the magnetic elements. FIG. 10A shows a cross-sectional view of apparatus 720 according to coordinate 392. FIG. 10B shows a cross-sectional view of a power transmitting apparatus 1000, which includes a shield 230 according to coordinate 392. The shield 230 includes an opening 560, which extends along the A-direction and has a maximum width 1009 measured in a direction parallel to the B-direction.

In the example shown in FIG. 10B, the magnetic component 220 extends in a plane in which arrow of direction 441 lies on and parallel to the A-B plane. Accordingly, the plane extends in the A-direction and the B-direction, which are orthogonal to each other. The plane passes through the middle of the magnetic component 220 as measured in the C-direction. The coil 210 is positioned on a first side of the plane in the positive C-direction. The shield 230 is positioned on a second side of the plane in the negative C-direction. In this example, the coil 210 is positioned entirely on the first side of the plane. In other examples, the coil 210 can be at least in part positioned on the first side of the plane. As described below, the shield 230 can include one or more openings (e.g., 560) positioned relative to one or more gaps (e.g., gap 422). The shield 230 can lie in a plane substantially parallel (e.g., within 3°, within 5°, within 10°, within 15°) to the plane in which the magnetic component 220 extends. Similar descriptions can be applied to other examples in this disclosure.

When coil 210 generates a magnetic field within gap 422 of the magnetic component 220 in a direction parallel to the B-direction, a portion of the magnetic field 525 extends below gap 422 and penetrates shield 229, which leads to energy loss, as discussed previously. The penetration of portion 525 of the magnetic field into shield 229 is shown on FIG. 10A.

In apparatus 1000, however, penetration of magnetic field 525 into shield 230 is reduced or eliminated because opening 560 is aligned with gap 422, and therefore positioned at the location where magnetic field 525 extends below gap 422. Because there is no shield material where magnetic field 525 extends below the gap 422, the effect of magnetic field 525 on shield 230 is significantly mitigated relative to apparatus 720.

In general, the opening 560 can be located where the magnetic field below the magnetic component 420 is particularly strong due to fringe effects or hot spots. By providing an opening in a region of the shield where strong magnetic fields would otherwise penetrate the shield, energy losses due to the shield can be reduced or eliminated. Accordingly, one or more openings of the shield 230 can be respectively aligned with corresponding ones of the one or more gaps of the magnetic component 220. The relative positioning of the one or more openings with respect to the one or more gaps can reduce interactions between magnetic flux of the magnetic fields crossing discontinuities of the magnetic component 220 and the shield 230. Moreover, the absence of shield material can lead to a lighter weight shield and reduce shield material costs.

In FIG. 10B, opening 560 has the width 1009 and the opening 560 extends in the A-direction, e.g., out of the plane of FIG. 10B. Typically, due to the shapes of the magnetic elements and the gaps between them, the opening 560 has a longest dimension extending along the A-direction. In some embodiments, the longest dimension of the opening 560 is substantially parallel (e.g., within 3°, within 5°) to the A-direction. In the example shown in FIG. 10B, the width 1009 of opening 560 is orthogonal to its longest dimension, and the width 424 of the gap 422 measured in the B-direction is orthogonal to its longest dimension extending in the A-direction.

The width 1009 of opening 560 of shield 230 can be selected to provide reduced energy loss due to magnetic field penetration into the shield 230, while at the same time shield 230 still effectively shields magnetic fields from lossy objects. FIG. 11A is a schematic diagram of a portion of a power transmitting apparatus 1100 with an opening 560 having a width 1009 of 4 mm in direction 441, which is oriented in a direction parallel to the B-direction of coordinate 1191. FIG. 11B is a schematic diagram of a portion of a power transmitting apparatus 1110 with an opening 560 having a width 1009 of 10 mm in direction 441, according to coordinate 1191. Apparatuses 1100 and 1110 each include a magnetic component 220 with a gap 422 (not shown). The gap 422 has a width 424 in the B-direction.

Figure 12:
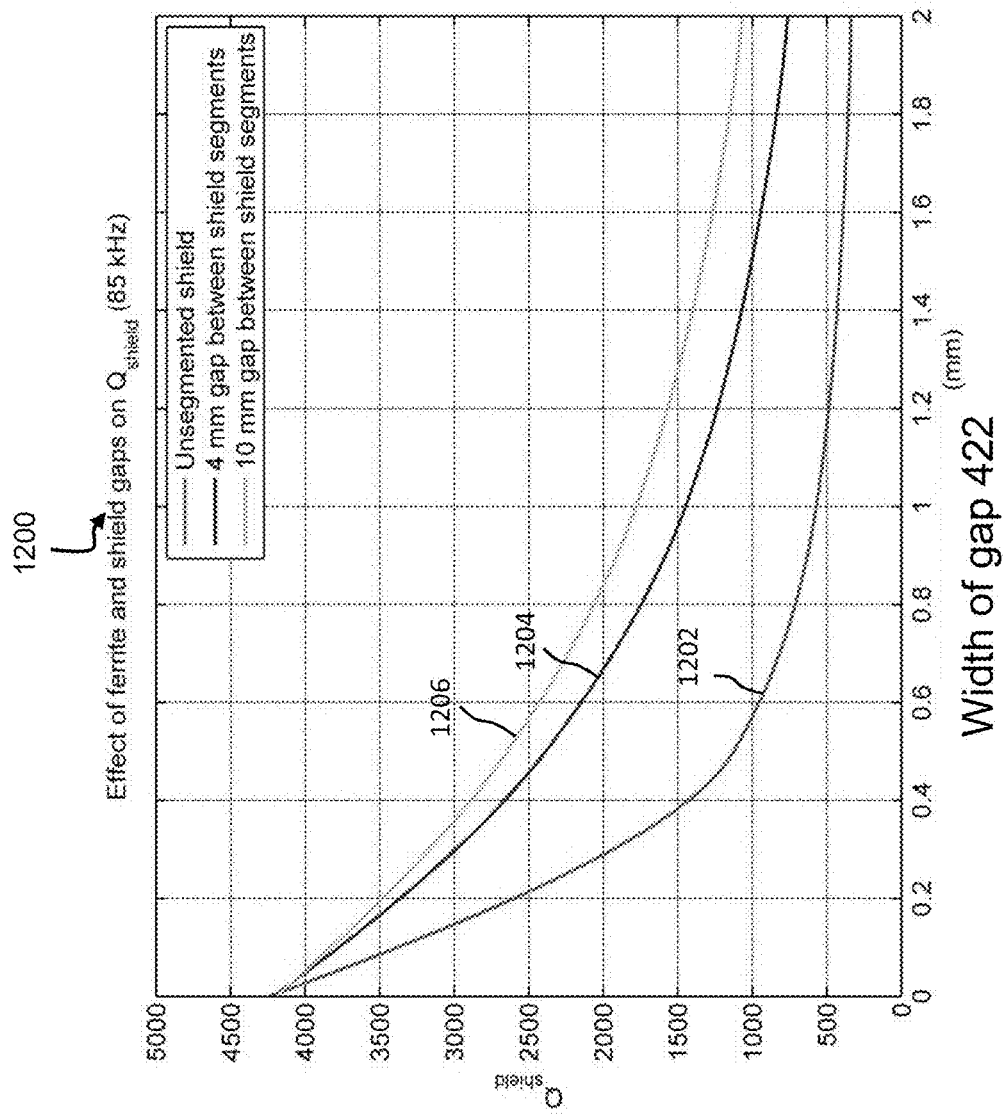
FIG. 12 is a plot showing simulated values of $Q_{shield}$ for apparatuses shown in FIGS. 7C, 11A and 11B.

FIG. 12 is a plot 1200 showing simulated values of $Q_{shield}$ (described later) for apparatuses 720 (curve 1202), 1100 (curve 1204) and 1110 (curve 1206) at an operating frequency of 85 kHz for currents applied to coil 210. $Q_{shield}$ is calculated as a function of the width of gap 422 measured in the B-direction in mm. Curve 1202 has the smallest $Q_{shield}$ for a given width of gap 422 because, for apparatus 720, penetration by magnetic field 525 into shield 229 occurs to a larger extent than for apparatuses 1100 and 1110 due to the absence of an opening in shield 229. For all three apparatuses 720, 1100, and 1110, $Q_{shield}$ decreases as the width of gap 422 of magnetic component 220 increases.

Generally, an opening 560 can have a width 1009 in a direction parallel to oscillations of magnetic fields within a gap of a magnetic component 220. Referring back to FIG. 12, plot 1200 shows that apparatus 1110 has a larger $Q_{shield}$ than that of apparatus 1100 for a given width 424 of gap 422. Accordingly, in some embodiments, it can be advantageous to have an opening 560 with a width 1009 larger than width 424 of the gap 422. This is because with a larger width 1009, penetration of locally concentrated magnetic fields within the gap 422 into shield 230 is reduced.

In certain embodiments, a ratio of the width 1009 to width 424 can be 10:5 or less (e.g., 10:2.5 or less, 10:2 or less, 10:1 or less, 10:0.5 or less, 10:0.4 or less, 10:0.2 or less). A high ratio may lead to a higher $Q_{shield}$. In some cases, if the ratio of the width 1009 to width 424 is too large, the shield 230 may not effectively shield lossy objects. In some embodiments, the ratio of the width 1009 to width 424 is not larger than 100:1 (e.g., not larger than 50:1, not larger than 25:1). For example, the ratio of the width 1009 to width 424 can be about 100:1 rather than 25:1 when the width 424 is smaller compared to the case when it is larger.

In some embodiments, gap 422 can have a minimum width of 0.2 mm or more (e.g., 0.5 mm or more, 1 mm or more, 1.5 mm or more, 2 mm or more). Opening 560 can have a minimum width of 1 mm or more (e.g., 2 mm or more, 4 mm or more, 8 mm or more, 10 mm or more, 15 mm or more).

In some embodiments, width 1009 of opening 560 can be equal to or less than width 424 of gap 422. Such a configuration may be utilized, for example, when a thickness of shield 230 is about a skin depth or less (e.g., half the skin depth) of the shield material and/or one or more lossy objects are close by (e.g., within 3 mm) to the shield 230. The skin depth of the shield material is the length of material through which the oscillating magnetic fields at the operating frequency pass before their amplitudes have decayed by a factor 1/e. In this case, if the width 1009 is larger than the width 424, concentrated magnetic fields within gap 422 can still interact with the lossy object because the thickness of shield 230 is relatively thin and/or the lossy object is close to the shield 230. Therefore, in this case, it can be desirable to have width 1009 to be equal or less than width 424 although magnetic fields may still penetrate the shield 230.

In this disclosure, a characteristic size of the magnetic component 220 is defined as the radius 1011 of the smallest sphere that fits around the magnetic component 220 as illustrated in FIG. 10C. The extent of fringing magnetic field (e.g., field 525) induced in the vicinity of the magnetic component 220 can depend on the characteristic size of the magnetic component 220. For example, if the characteristic size is scaled by a factor of 2, the extent of fringing magnetic field may scale by a factor of 2. Because of the dependence of the fringing magnetic field on the characteristic size, an optimum width 1009 of opening 560 can depend on the characteristic size of the magnetic component 220. When the ratio of the width 1009 to the characteristic size of the magnetic component 220 becomes larger, the fringing magnetic field can more effectively pass through the opening 560 and interact with a lossy object, which may be positioned on the other side of the shield 230. Such interaction can lead to losses of magnetic fields induced in the vicinity of the magnetic component 220. Accordingly, in certain embodiments, it is advantageous to have the ratio of the width 1009 to the characteristic size to be an optimum value or less to avoid the losses described in the preceding sentence. For example, the ratio of the width 1009 to the characteristic size of the magnetic component 220 can be 1:10 or less to mitigate the effects of magnetic fields passing through opening 560 and interacting with lossy objects. In certain embodiments, the ratio can be 1:12 or less (e.g., 1:15 or less).

Referring to FIG. 11B, the coil 210 is electrically disconnected from the shield 230. This approach can lead to easier manufacturing of the arrangement 1110 compared to approaches where a coil is electrically connected to a shield. The coil 210 lies above the magnetic component 220 without passing through gaps of the magnetic component 220. This approach can lead to easier manufacturing of the arrangement 1110 compared to the approach described later in relation to FIG. 22, because the coil 210 can be easily positioned above the magnetic component 220. A single power source can be used to drive the coil 210.

Referring back to FIG. 10B, oscillation of currents in coil 210 can induce "image" currents in shield 230. Such image currents can generally be described in a manner analogous to image charges and the method of images used to replicate electromagnetic boundary conditions along an infinite plane of a perfect conductor. Image currents can flow in a distribution at the surface of the shield 230 and in some embodiments, the image currents in the shield 230 can increase the effective thickness of the magnetic component 220 (e.g., by a factor of about 2). In FIG. 10, opening 560 does not significantly disrupt image currents formed in the shield 230 because the opening 560 extends parallel to the image currents. For example, referring back to FIG. 4A, center portion 440 of coil 210 has currents flowing in positive and negative directions of axis A at a given time. Accordingly, in a shield positioned adjacent to center portion 440, image currents flow in both the positive and negative A-directions as well. When opening 560 extends along the A-direction, the opening 560 does not extend perpendicular to image currents below the center portion 440, but instead extends parallel to the image currents. Accordingly, opening 560 does not significantly disrupt the image currents in the shield 230.

FIG. 13A is a schematic diagram of a power transmitting apparatus 1300 without a shield placed between a magnetic component 220 and a lossy object 1302 according to coordinate 1391. Direction 441 points in the negative B-direction. FIG. 13B is a schematic diagram of a power transmitting apparatus 1310 including a shield 230 (e.g., a copper shield) with an opening 560, positioned between a magnetic component 220 and a lossy object 1302, according to coordinate 1391. Direction 441 points in the negative B-direction. The shield 230 is separated from the lossy object 1302 by a distance of 2.5 mm in the C-direction. Magnetic component 220 is formed from a 2×2 array of magnetic elements joined by dielectric material 420, which fills the gaps between the magnetic elements, in the same manner as described previously. Dielectric material 420 is not depicted in FIGS. 13A and 13B. In these examples, the lossy object 1302 formed of ASTM type A1008 steel.

Figure 14:
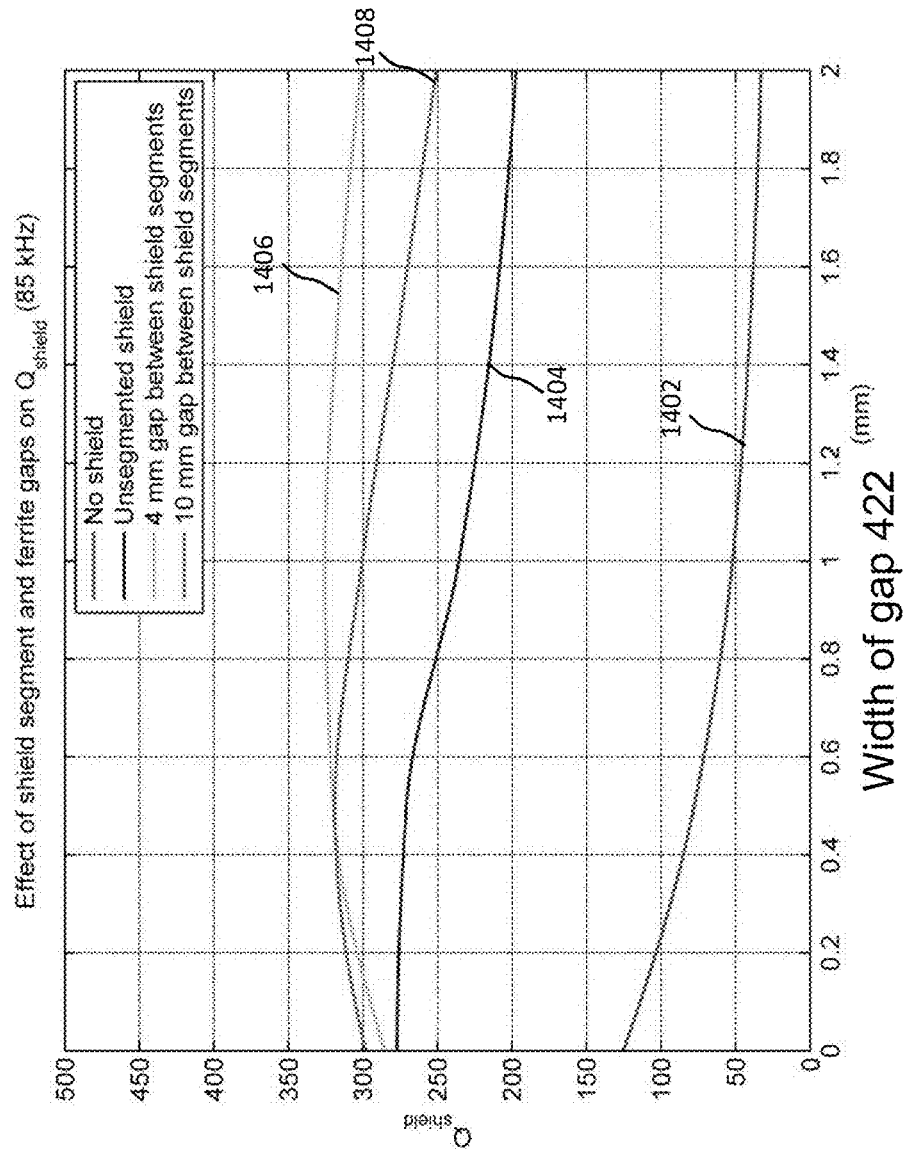
FIG. 14 is a plot 1400 showing simulated values of $Q_{shield}$ for apparatuses shown in FIGS. 13A and 13B.

FIG. 14 is a plot 1400 showing simulated values of $Q_{shield}$ (described later) for apparatuses 1300 and 1310 at an operating frequency of 85 kHz for currents applied to coil 210. $Q_{shield}$ was calculated as a function of width 424 of gap 422 of the magnetic component 420 measured in direction 441. Curve 1220 corresponds to apparatus 1300 with no shield. Curve 1404 corresponds the apparatus 1310 where the width 1009 of opening 560 is 0 mm. Curve 1406 corresponds to apparatus 1310 where the width 1009 of opening 560 measured in the direction 441 is 4 mm. Curve 1408 corresponds to apparatus 1310 where the width 1009 of opening 560 is 10 mm. Apparatus 1300 has the smallest $Q_{shield}$ due to absence of a shield. The apparatuses that correspond to openings of width 4 mm and 10 mm have higher $Q_{shield}$ than the apparatus that corresponds to no opening, indicating that the presence of opening 560 can reduce power dissipation and energy losses induced by the presence of a shield.

As described above, in some embodiments, the width of opening 560 can be selected based on the width of gap 422. To choose the width of opening 560, a plot such as plot 1400 can be used. In certain embodiments, where width of gap 422 is fixed, the width of opening 560 can be selected. For example, for a width of 0.2 mm of gap 422, the width of opening 560 can be selected to be 4 mm over 10 mm. For a width of 1.8 mm of gap 422, the width of opening 560 can be selected to be 10 mm over 4 mm according to plot 1400. Other widths than 4 mm and 10 mm of opening 560 can be selected to have a higher $Q_{shield}$ depending on a fixed width of gap 422.

FIG. 15A shows a series of images of an example of a power transmitting apparatus including a coil 210. Image 1500 shows the coil 210 positioned on one side of a support 1502. Image 1510 shows the other side of support 1502 where a magnetic component 220 is positioned. Image 1520 shows a shield 229 without an opening or segments. The shield 229 is positioned such that magnetic component 220 is positioned between shield 229 and support 1502.

Figure 15B:
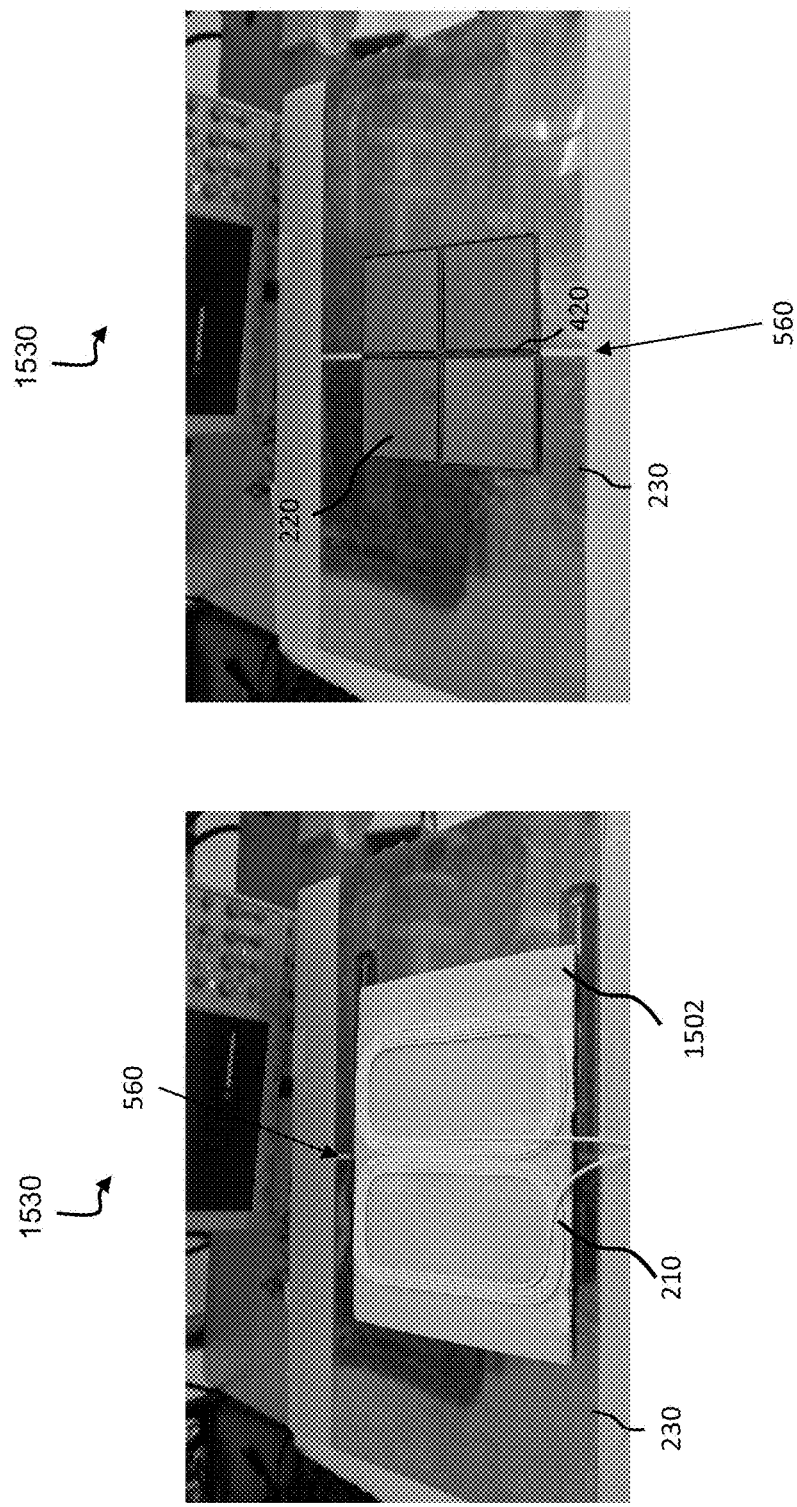
FIG. 15B shows two images of an example of another power transmitting apparatus.

FIG. 15B shows a series of images of example of another power transmitting apparatus including a coil 210. Image 1530 shows a coil 210 positioned on one side of a support 1502. A shield 230 with an opening 560 is positioned below the support 1502. Image 1540 shows a magnetic component 220 a shield 230, which are positioned on the opposite side of support 1502 from the coil 210.

FIG. 16 is a plot 1600 showing measured values of $Q_{trans}$ values for the apparatuses shown in FIGS. 15A and 15B as a function of operating frequencies of currents applied to coil 210. Curve 1602 corresponds to the apparatus in FIG. 15A with no opening in shield 229. Curve 1604 corresponds to the apparatus in FIG. 15B with a shield opening of width 2 mm. Curve 1606 corresponds to the apparatus in FIG. 15B with a shield opening of width 5 mm. Curve 1608 corresponds to the apparatus in FIG. 15B with a shield opening of width 10 mm. It is evident from plot 1600 that as the width of opening 560 increases, $Q_{trans}$ also increases at each operating frequency.

FIG. 17 is a plot 1700 showing measured values of $Q_{shield}$ for the apparatuses shown in FIGS. 15A and 15B as a function of the operating frequencies of currents applied to coil 210. Curve 1702 corresponds to the apparatus in FIG. 15A with no opening in shield 481. Curve 1704 corresponds to the apparatus in FIG. 15B with a width of 2 mm for opening. Curve 1706 corresponds to the apparatus in FIG. 15B with a width of 5 mm for opening. Curve 1708 corresponds to the apparatus in FIG. 15B with a width of 10 mm for opening. It is evident from plot 1700 that $Q_{shield}$ increases for a given operating frequency as width of the opening 560 becomes larger.

Figure 18A:
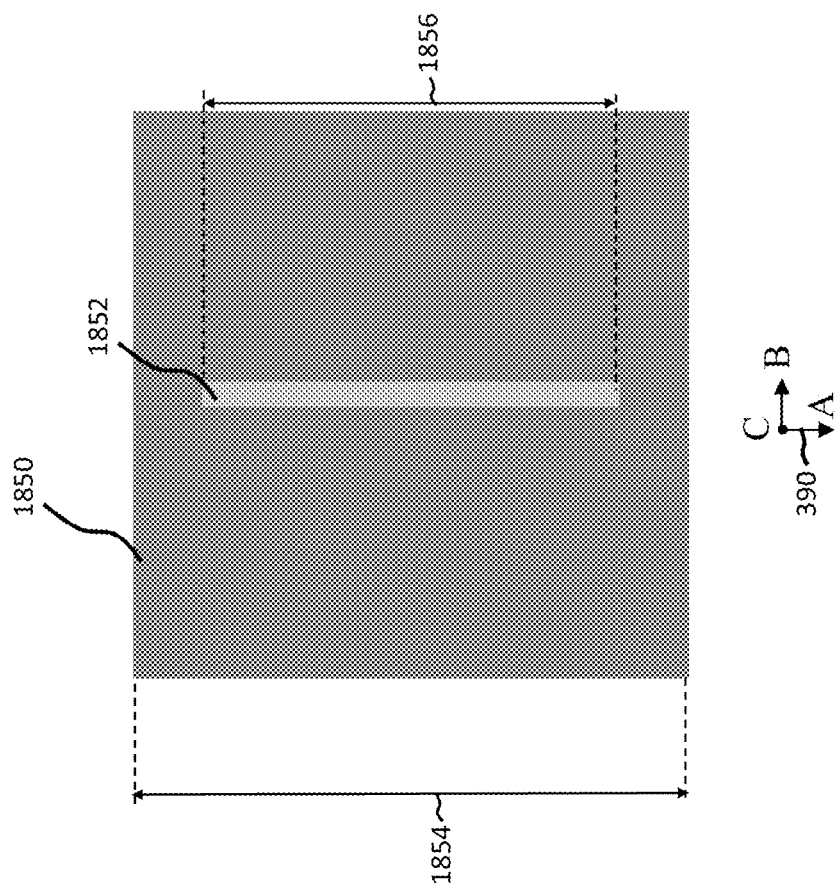
FIG. 18A is a schematic diagram showing an example of a shield.

Openings in the shield can generally be implemented in a variety of ways. In some embodiments, a shield can be segmented into two pieces like the example shown in FIG. 15B. In certain embodiments, a shield can be a monolithic piece of conductor with an opening. To illustrate this, FIG. 18A shows a schematic diagram of a shield 1850 formed of a monolithic piece of conductor with length 1854 measured in the A-direction of coordinate 390. The shield 1850 includes an opening 1852 having a length 1856 smaller than the length 1854 in the A-direction. Such a shield 1850 can be fabricated from a single sheet of conductor, where the opening 1852 is drilled, punched, cut, stamped, pressed, or otherwise introduced into shield 1850. Such an approach can be advantageous due to ease of manufacturing. Further, the use of a monolithic shield can eliminate the alignment of two different pieces of conductor to form a shield. In this example, the opening 1852 extends entirely through the thickness of the shield 1850, although more generally, opening 1852 can also extend only partially through the thickness of shield 1850. Further, although shield 1850 includes one opening 1852 in FIG. 18A, more generally shield 1850 can include any number of openings.

Figure 18C:
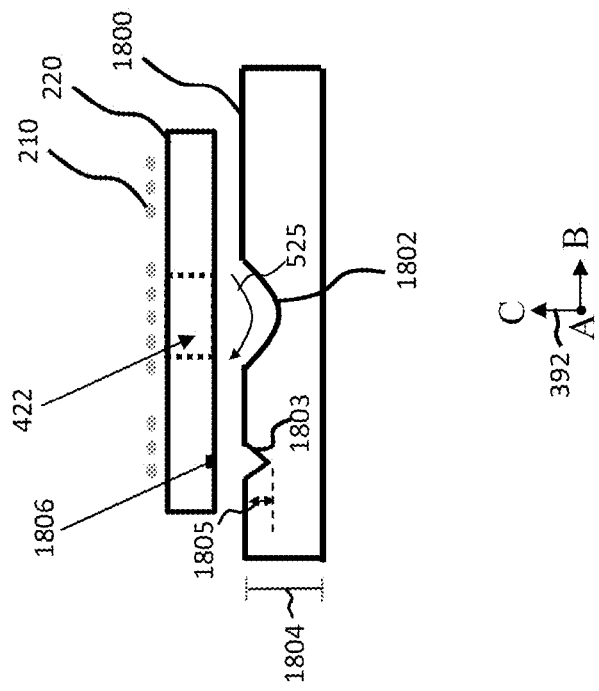
FIGS. 18B and 18C are schematic diagrams showing an example of a shield.
Figure 18B:
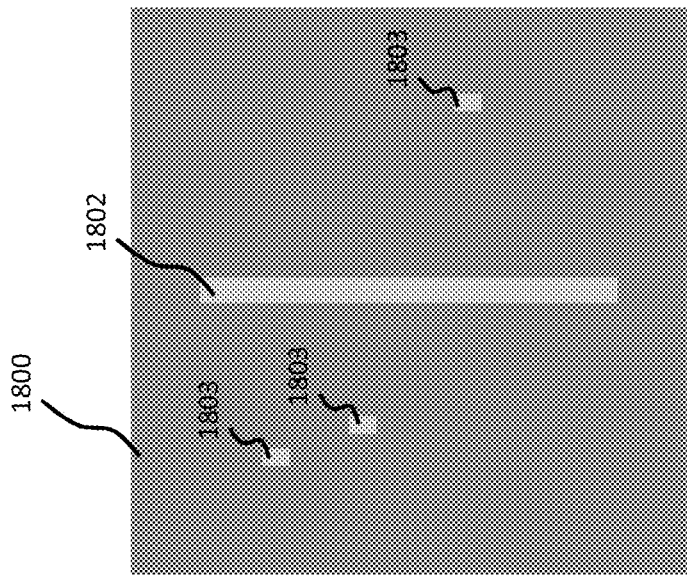

FIGS. 18B and 18C show schematic diagrams of a shield 1800 with notches 1802 and 1803. In FIG. 18B, coordinate 390 indicates the orientation of the shield 1800. The notch 1802 can be positioned such that it is aligned with a gap 422 of a magnetic component 220 where magnetic fields can be concentrated, as shown in FIG. 18C. Similarly, the shield 1800 can be positioned such that notches 1803 are aligned with magnetic field hot spots 1806 in the magnetic component 220 (shown in FIG. 18C), which are described in greater detail above.

FIG. 18C shows a cross-sectional view of the shield 1800 according to coordinate 392. The notch 1802 extends to a fraction of the thickness 1804 of the shield 1800 but sufficiently deep enough to reduce penetration of magnetic field 525 into the shield 1800. For example, a depth 1805 from a surface of the shield 1800 to the deepest point of the notch 1803 can be about twice or more (e.g., three times or more, four times or more) of a skin depth of the shield material of the shield 1800 at the operating frequency. Generally, the shield 1800 can include curved grooves forming depressions in the shield.

The strength of the magnetic field 525 typically decays away from the surface of magnetic component 220 according to a power law of the ratio ($\alpha$) of the width of gap 422 (i.e., width 424 in FIG. 10B) to the distance of magnetic field 525 from the surface of the magnetic component (i.e., the surface facing shield 1800 in FIG. 18C), where the distance is measured in the −C direction in FIG. 18C. To reduce penetration of the magnetic field into shield 1800, in some embodiments, notch 1802 and/or notch 1803 can extend to a depth below a surface of the shield (i.e., below the surface facing magnetic component 220 in FIG. 18C) of $1/\alpha$ or more (e.g., about $1/2\alpha$ or more). The cross-sectional profile of the notch 1802 can be curved, as shown in the cross-sectional view, or triangular, as shown for notch 1803. Similarly, the cross-sectional profile for notch 1803 can be triangular, as shown in the cross-sectional view, or curved as shown for notch 1802.

Figure 18E:
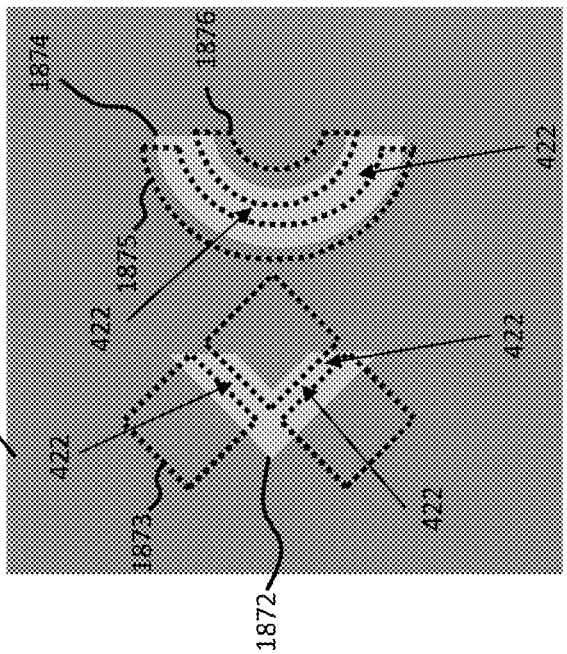
FIG. 18E is a schematic diagram showing an example of a shield.
Figure 18D:
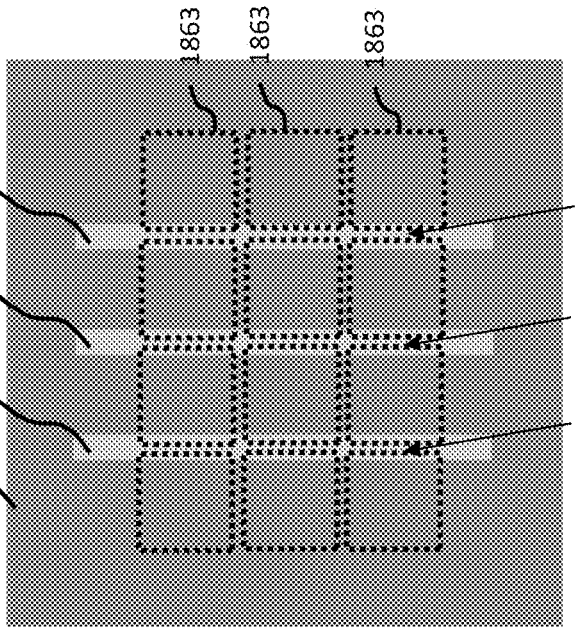
FIG. 18D is a schematic diagram showing an example of a shield.

FIG. 18D is a schematic diagram of a shield 1860 including multiple openings 1862. In this example, each of the openings 1862 are aligned to multiple gaps 422 between magnetic elements 1863 to mitigate the penetration of concentrated magnetic fields into the shield 1860. Each of the openings 1862 has a width that extends parallel to the B-direction. FIG. 18E is a schematic diagram of a shield 1870 including openings 1872 and 1874. The openings 1872 and 1874 have non-rectangular cross-sectional shapes so that the openings 1872 and 1874 are aligned to gaps 422 between magnetic elements 1873, 1875 and 1876 to mitigate the penetration of concentrated magnetic fields into the shield 1870. Generally, openings can have cross-sectional profiles including triangular, trapezoidal, circular, elliptical, parabolical and hyperbolical shapes. The profiles can be selected based on geometry of gaps and arrangements of magnetic elements.

More generally, a magnetic component can be formed in a way that multiple gaps exist and magnetic fields oscillate perpendicular to surfaces of the gap, for example, as described above. In this case, multiple openings and notches can be formed in the shield to reduce power dissipation and energy loss due to the shield positioned below the magnetic component. The openings and notches can form depressions in the shield that extend only partially through a thickness of the shield, or can extend completely through the shield. In similar manner described in preceding paragraphs, the depressions can be positioned to be respectively aligned with corresponding gaps of the magnetic component. The depressions can be positioned relative to the gaps to reduce interactions between magnetic flux of magnetic fields crossing discontinuities of the magnetic component and the shield.

In the example shown in FIG. 18D, the shield 1860 has three openings 1862. In certain embodiments, the shield 1860 can have other number (e.g., two, four, five) of openings to match a number of gaps 422 formed by magnetic elements. At least one of the gaps 422 can be filled with dielectric material (e.g., adhesive material).

In some embodiments, openings formed in the shield have lateral surfaces that are orthogonal to the surface of the shield that faces the magnetic component. More generally, however, openings formed in the shield can have lateral surfaces with a variety of orientations with respect to the surface of the shield that faces the magnetic component. FIG. 18F is a schematic diagram of a cross-sectional view of a shield 1880 according to coordinate 392. The shield 1880 includes an opening 1882, which extends entirely through the shield 1880 of its thickness 1886. In this example, the opening 1882 has tapered side-walls. In other words, the side-walls of the opening 1882 form angle 1888 with respect to the C-direction, which is normal to the surface of shield 1880 that faces magnetic component 220. In some embodiments, the angle 1888 can be 45° or less (e.g., 30° or less, 15° or less). By having a larger open region closer to gap 422 of magnetic component 220 and a smaller open region on the other side of the magnetic component 220, where lossy object 1889 is positioned, the opening 1882 can mitigate penetration of magnetic field 525 into the shield 1880 due to the larger open region, while effectively shielding lossy object 1889 due the smaller open region. Similarly, notch 1884 can be aligned to magnetic field hot spot 1806 to mitigate magnetic field penetration into shield 1880. In this example, notch 1884 has cross-sectional profile of a trapezoidal shape. Generally, the profile can be a triangular, trapezoidal, circular, elliptical, parabolical and hyperbolical shapes. The profiles can be selected based on geometry of gaps and arrangements of magnetic elements. An opening or notch which forms a depression can have a width measured at the surface of the shield facing the magnetic component to be larger than a width of the depression measured at another location between its lateral surfaces.

Figure 18G:
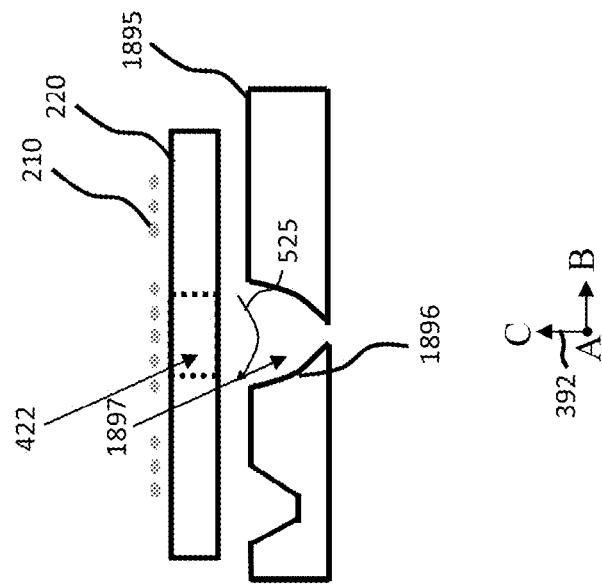
FIG. 18G is a schematic diagram showing an example of a shield.
Figure 18F:
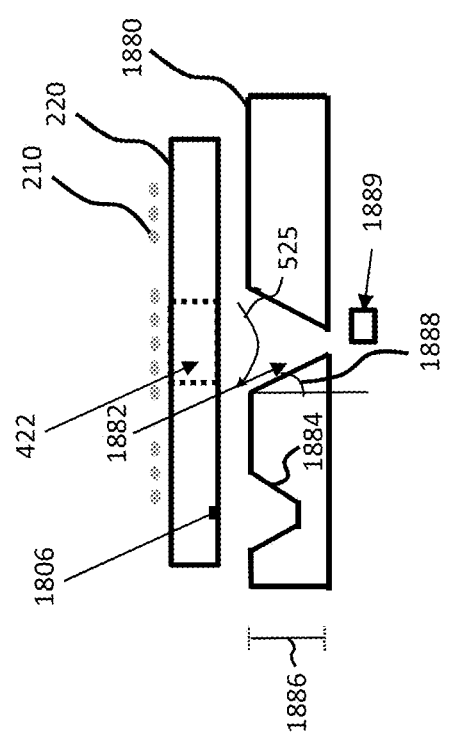
FIG. 18F is a schematic diagram showing an example of a shield.

FIG. 18G is a schematic diagram of a cross-sectional view of a shield 1895 according to coordinate 392. In this example, opening 1897 of shield 1895 has one or more curved edges 1896, which are shaped to conform to a distribution of the magnetic field 525 along the negative C-direction to mitigate penetration of field 525 into the shield 1895.

During use of a power transmitting apparatus, magnetic component 220 can become damaged, which may lead to the formation of hot spots. The existence and/or development of hot spots can be monitored using a thermal detector with appropriate spatial resolution. For example, the thermal detector can measure localized high temperature points which can correspond to damage or defects in the magnetic component 220. Then openings or notches described in detail above can be formed into a shield based on the monitored hot spots to accommodate the presence of hot spots.

In some embodiments, the width of gap 422 between elements of the magnetic component can vary, and accordingly, an opening of shield 230 can have a varying width to match the varying width of gap 422. To illustrate this, FIG. 19A shows a schematic diagram of an example of a power transmitting apparatus 1900 according to coordinate 390. The apparatus 1900 includes a coil 210, a magnetic component 220 and a shield 1920. The magnetic component 220 includes an array of magnetic elements 1910. The coil 210 is configured to generate magnetic fields oscillating along the B-direction within the magnetic component 220. The magnetic elements 1910 are positioned between the coil 210 and the shield 1920 along the C-direction. The magnetic elements 1910 are tapered and have side-walls 1911 extending at an angle relative to the A-direction. The angle can be, for example, 45° or less (e.g., 30° or less, 15° or less). The angle of the side-walls with respect to the A-direction produces a gap of varying width in the B-direction between elements 1910 of the magnetic component 220 (exaggerated in FIG. 19A for purposes of illustration).

The varying width of the gap leads to varying magnetic resistance of the magnetic component 220 along the A-direction. Accordingly, when the coil 210 generates magnetic field within the magnetic component 220, magnetic elements 1910 can be arranged so that the varying magnetic resistance provides a more uniform distribution of magnetic fields than would otherwise be possible with a gap of constant width in the B-direction, thereby leading to less power dissipation in the magnetic component 220.

For magnetic components with gaps between elements that vary in width, opening 1921 of the shield 1920 can also have varying width to match the varying width of the gap between magnetic elements 1910 to mitigate concentration of penetration of magnetic fields into the shield 1920.

FIG. 19B is a schematic diagram of a cross-sectional view of a power transmitting apparatus 1930, which includes a magnetic component 220 and a shield 230, according to coordinate 392. In this example, the magnetic component 220 has curved edges 1932. The curved edges 1932 can lead to reduced fringe effects at gap 422 so that magnetic fields 525 extend less outward of the gap 422 compared to the case shown in FIG. 10B with straight edges. Thus, in this approach, shield 230 can have an opening 560 with smaller width because magnetic field 525 can penetrate less into the shield 230 due to reduced fringe effects. In some embodiments, the magnetic component 220 can have beveled edges cut as a straight line instead of curved edges. In some embodiments, the shield 230 can have curved edges 1934 at its opening 560. An opening with curved edges may reduce concentration of induced eddy currents by magnetic field 525, and thereby reducing losses by the shield 230. In certain embodiments, the shield 230 can have beveled edges cut as a straight line instead of curved edges.

Figure 19C:
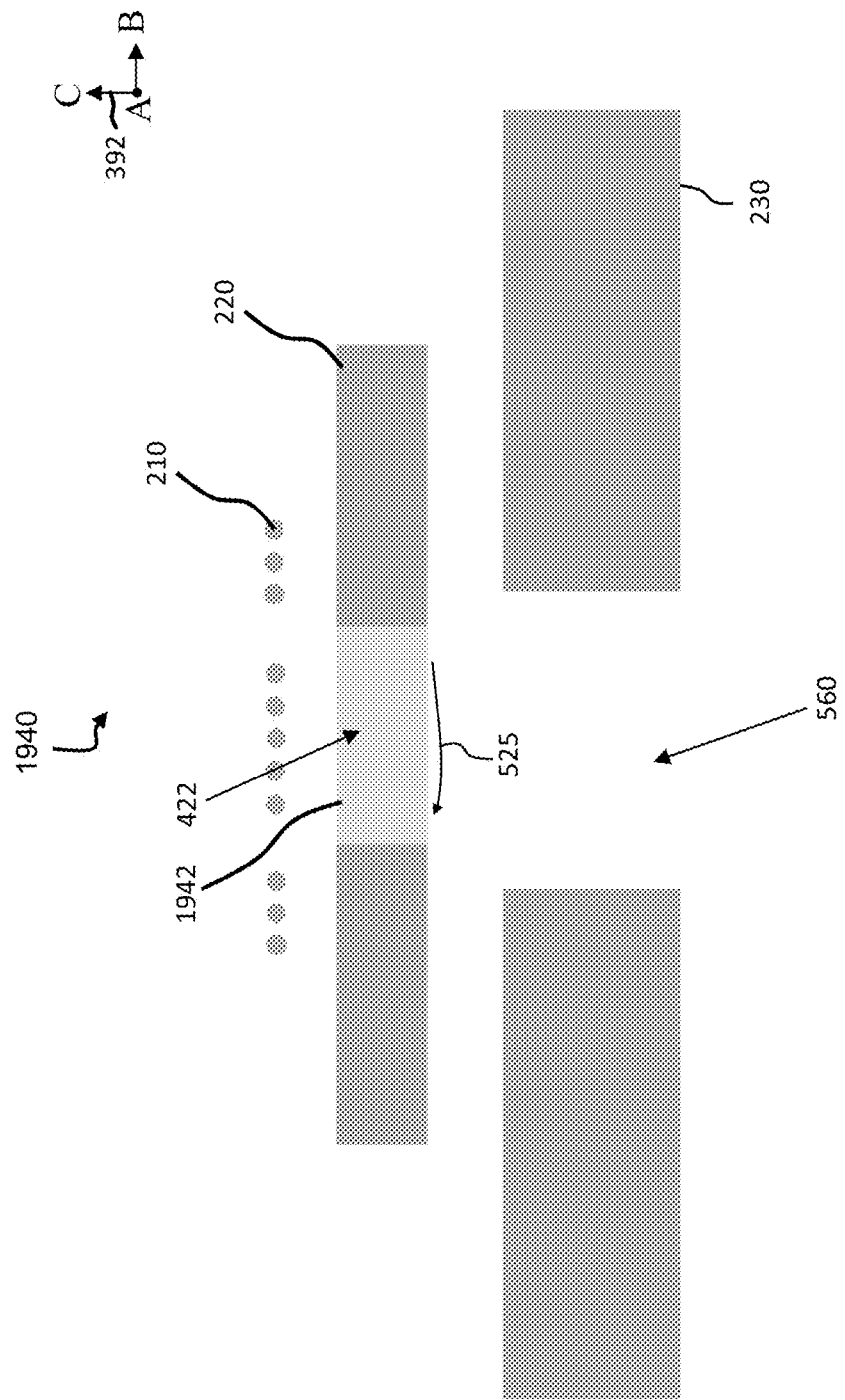
FIG. 19C is a schematic diagram of a cross-section of an example of a power transmitting apparatus.

FIG. 19C is a schematic diagram of a cross-sectional view of a power transmitting apparatus 1940, which includes a magnetic component 220 and a shield 230, according to coordinate 392. In this example, a magnetic material 1942 fills in gap 422. The magnetic material 1942 can be a different type of material from that of magnetic component 220. For example, in some embodiments, magnetic material 1942 can have a larger magnetic permeability than that of magnetic component 220. When magnetic material 1942 has a larger magnetic permeability than magnetic component 220, magnetic fields 525 typically do not extend outward from gap 422 as far as they would if magnetic material 1942 had a smaller magnetic permeability than magnetic component 220, because the magnetic material 1942 helps to confine magnetic fields within the gap 422. In certain embodiments, the magnetic material 1942 can be applied to thoroughly fill in the gap 422. Thus, in the above approach, shield 230 can have an opening 560 with smaller width because magnetic field 525 penetrates less into the shield 230 due to reduced fringe effects.

Figure 19D:
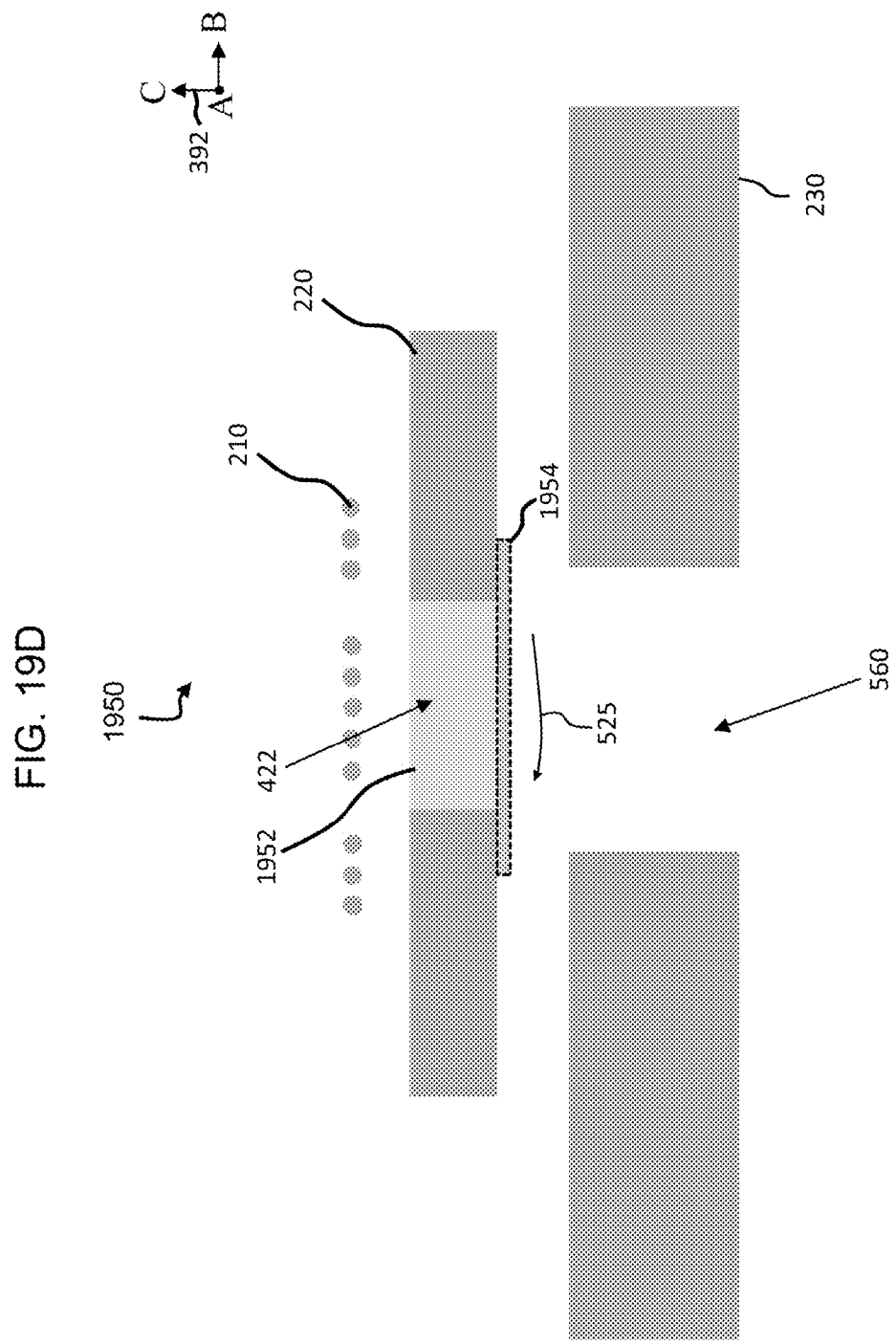
FIG. 19D is a schematic diagram of a cross-section of an example of a power transmitting apparatus.

FIG. 19D is a schematic diagram of a cross-sectional view of an example of a power transmitting apparatus 1950, which includes a magnetic component 220 and a shield 230, according to coordinate 392. In this example, magnetic tape 1954 is attached over gap 422 in a location between the magnetic component 220 and the shield 230. The magnetic tape 1954 can contact the magnetic component 220. Due to the magnetic permeability of the magnetic tape 1954, the magnetic tape 1954 can confine magnetic fields, mitigating the fringe effect of gap 422. As a result, magnetic fields 525 do not extend as far outward from gap 422. Thus, in this approach, shield 230 can have an opening 560 with smaller width because magnetic field 525 penetrate less into the shield 230 due to reduced fringe effects attributable to the presence of magnetic tape 1954. Material within gap 422 can include dielectric material and/or magnetic material as described in preceding paragraphs.

In some embodiments, a dielectric material or magnetic material can fill in gap 422 of a magnetic component 220. The dielectric material (e.g., coolant liquids) or magnetic material filling the gap 422 can have high thermal conductivity and be placed between magnetic elements to facilitate the dissipation of heat generated within the magnetic elements. Referring to FIG. 19E, a magnetic component 220 includes an array of magnetic elements 1962-1966 according to coordinate 390. Only a few magnetic elements are labeled in FIG. 19E for simplicity. A dielectric material 420 of high thermal conductivity fills in gaps between the magnetic elements 1962-1966. Accordingly, heat generated at magnetic elements 1964 and 1966 in inner regions of the magnetic component 220 can effectively transfer to heat sinks 1967 contacting sides of the magnetic component 220. For example, the heat sinks 1967 can contain coolant for transferring heat out of the magnetic component 220.

In the example shown in FIG. 19E, the array is a 4×4 array. More generally, however, any number of magnetic elements can be joined to form a magnetic component, which allows the size of the magnetic component to extend over a larger area than that shown in FIG. 19E.

Figure 19G:
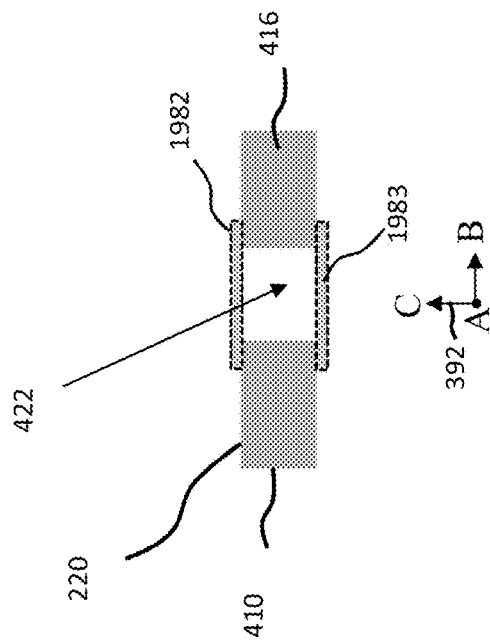
FIGS. 19F-J are schematic diagrams showing examples of several magnetic components.
Figure 19F:
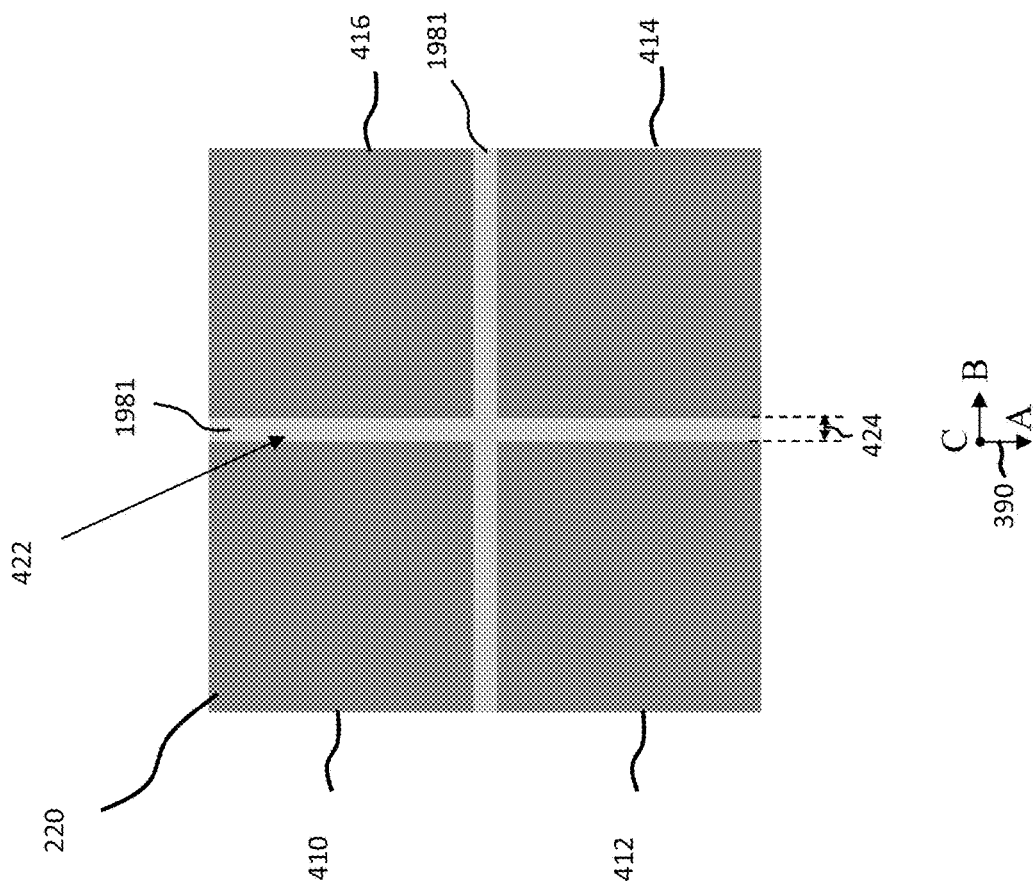

In some embodiments, magnetic elements can be joined together by an adhesive tape. For example, FIG. 19F is a schematic diagram showing an example of a magnetic component 220 joined by an adhesive tape 1981 within gaps 422 and 423 and sandwiched between magnetic elements 410, 412, 414 and 416. As another example, FIG. 19G is a schematic diagram showing an example of another magnetic component 220 with magnetic elements joined together by adhesive tape 1982 and 1983.

Figure 19I:
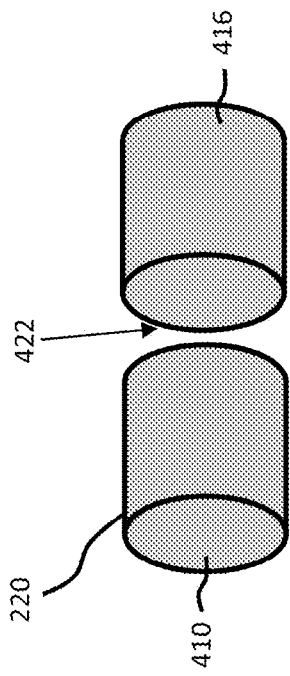
Figure 19J:
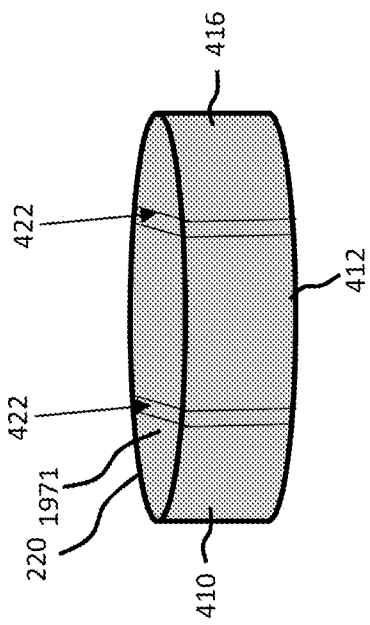
Figure 19H:
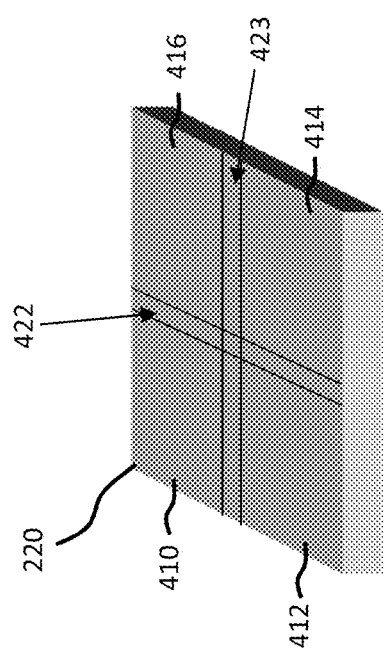

FIG. 19H is a schematic diagram of a magnetic component 220 having a rectangular cuboid shape with magnetic elements 410, 412, 414 and 416 and gaps 422 and 423. Generally, a magnetic component can be in other forms than a rectangular cuboid. For example, FIG. 19I is a schematic diagram of an example of a magnetic component 220 of a cylindrical shape. The magnetic component 220 has two magnetic elements 410 and 416 with gap 422 in between. As another example, FIG. 19J is a schematic diagram of another example of a magnetic component 220 of an elongated cylinder with oval face 1971. The magnetic component 220 includes magnetic elements 410, 412 and 414 with gaps 422.

In addition to the shield geometries disclosed above for mitigating energy losses due to penetration of the magnetic fields from the magnetic component into the shield, other techniques can also be used to reduce energy losses.

In some embodiments, for example, energy losses due to penetrating magnetic fields can be reduced by adjusting the magnetic field distribution within the magnetic component. FIGS. 20A and 20B are schematic diagrams of additional examples of coil 210. Coordinate 390 indicates the coordinate axis. A shield is not shown. In the left-hand side of FIG. 20A, coil 210 includes a conducting wire forming a plurality of loops, where different portions of the loops correspond to different diameters of the wire. For example, portion 2031 of the wire has a larger diameter than portion 2032. Portion 2032 of the wire has a larger diameter than portion 2033. Differences in diameters in different portions of the coil are schematically depicted by the thickness of lines of the coil 2030. To illustrate this, a cross-sectional view along section line B1-B2 is depicted on the right-hand side of FIG. 20A according to coordinate 392. The variations of diameters along the wire may be used to control a uniformity of magnetic field distribution induced in magnetic component 220 by the coil 210. For example, a more uniform distribution can lead to less hot spots and energy losses of the magnetic fields. In some embodiments, the diameter variation can be selected based on the geometry of magnetic component 220.

FIG. 20B is a schematic diagram of an example of a power transmitting apparatus 2020. A shield is not shown. Two coils 2040 and 2041 are positioned adjacent to a magnetic component 220. Each of two coils 2040 and 2041 includes a plurality of loops. Currents can be separately applied to coils 2040 and 2041 to generate a magnetic field distribution in the magnetic component 220. For example, oscillating currents can be applied with equal magnitude and phase to coils 2040 and 2041 so that, at a given time, currents within the coil 2040 circulate counter-clockwise and currents within the coil 2041 circulate clockwise as seen from the positive C-direction towards the negative C-direction.

The magnitudes and phases of the applied currents in each of the two coils 2040 and 2041 can be selected to control a uniformity of magnetic field distribution induced in the magnetic component 220. A more uniform distribution can lead to less hot spots and energy losses of the magnetic fields within the magnetic component 220. In contrast, less uniform magnetic distribution may localize fields into hot spots. The magnitudes and phases can be selected depending on the geometry and/or properties of the magnetic component 220.

Non-uniform magnetic field distributions within the magnetic component lead to the formation of hot spots, because power is dissipated locally in proportion to the square of the magnetic field amplitude. Moreover, a non-uniform magnetic field distribution increases the loss coefficient of the magnetic component. Both of these effects lead to a reduced quality factor for a resonator that includes the magnetic component, and can even cause the magnetic component to saturate at lower power levels.

However, these effects can be mitigated by generating a more uniform magnetic field distribution within the magnetic component, as described above. In particular, because power dissipation varies approximately proportionally to the square of the magnetic field amplitude, for a fixed total magnetic flux through a magnetic component, a configuration with a more uniform field distribution will generally exhibit lower losses than a configuration with a more non-uniform field distribution. The effect is analogous to the electrical resistance of an electrical conductor, where decreasing the effective cross-sectional area of the conductor leads to higher resistance, for example, due to the skin effect.

In some embodiments, magnetic elements positioned below coil 2040 can have a different magnetic resistance than the magnetic elements positioned below coil 2041 due to manufacturing imperfections that lead to different sizes of magnetic elements and/or different magnetic permeabilites of the magnetic elements. For example, magnetic elements positioned below coil 2040 can have a magnetic permeability smaller by 2% or more (e.g., 5% or more, 10% or more) than that of magnetic elements positioned below coil 2041 due to fabrication tolerances and/or errors.

To circumvent such imperfections, coil 2040 can operate with current having a magnitude that is larger by 2% or more (e.g., 5% or more, 10% or more) than that of coil 2041. The phase difference of currents between the coils 2040 and 2041 can be 10° or more (e.g., 20° or more, 30° or more) to match a magnitude of the currents at a given time. Such approaches may lead to a more uniform magnetic field distribution, thereby reducing the formation of hot spots that lead to magnetic fields bending outwards from gaps between the elements of magnetic component 220, and also reducing energy losses of the magnetic fields within the magnetic component 220. In some embodiments, either or both of two coils 2040 and 2041 can have varying diameters of wire in a similar manner described in relation to coil 210 in FIG. 20A.

FIG. 21 is a schematic diagram of another example of coil 210. Coordinate 390 indicates the coordinate axis. A shield is not shown. In the left-hand side of FIG. 20A, coil 210 includes two windings 451 and 452 similar to coil 210 shown in FIG. 4A. But in this example, portions of windings 451 and 452 have different spacings 2111 and 2112. For example, wire portion 2131 of the coil 210 has spacing 2112 from the adjacent wire portion 2132. Wire portion 2134 of the coil 230 has spacing 2111 from the adjacent wire portion 2133. To illustrate this further, a cross-sectional view along section line B1-B2 is depicted on the right-hand side of FIG. 21 according to coordinate 392.

By providing a coil with an increased spacing 2111 (e.g., relative to spacing 2112) between adjacent loops in the region of coil 210 that is near gap 422 (not shown) in the magnetic component, the concentration of magnetic fields within gap 422 can be reduced, because less dense coil windings can induce weaker magnetic fields. Thus, penetration of magnetic fields into an adjacent shield can be reduced. Moreover, variations in spacings between adjacent wire portions in coil 210 can be used to control a uniformity of magnetic field distribution induced in magnetic component 220, leading to less hot spots and energy losses of the magnetic fields.

Figure 22:
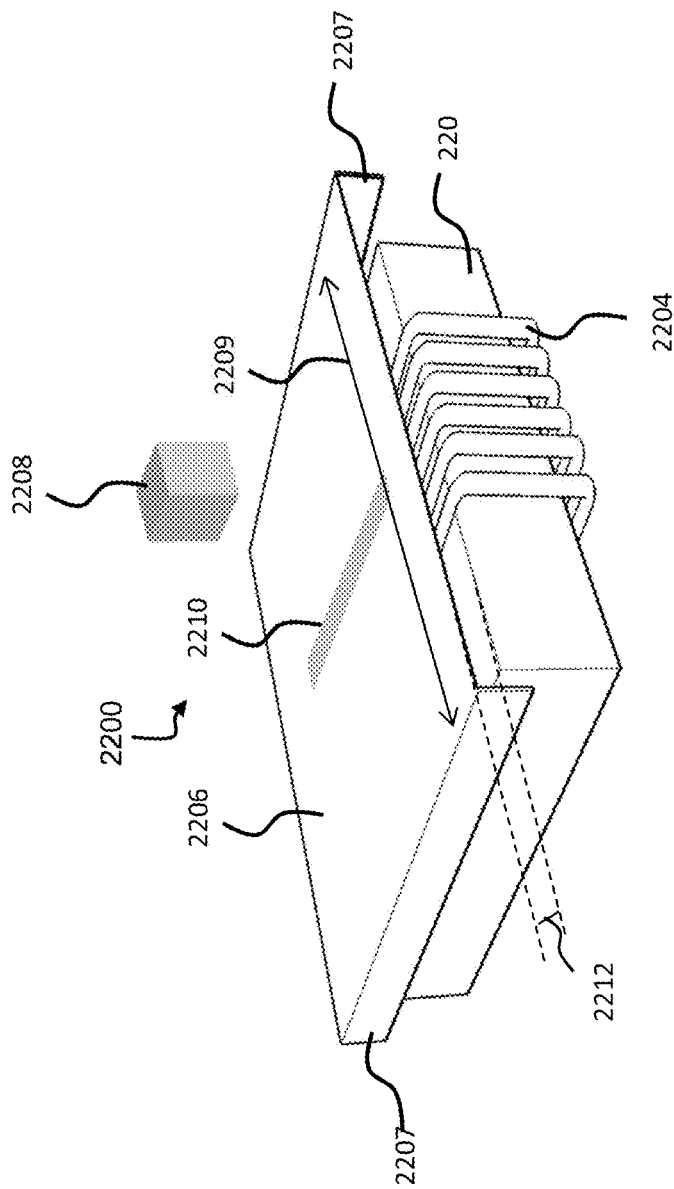
FIG. 22 is a schematic diagram showing an example of a power transmitting apparatus.

FIG. 22 is a schematic diagram of a power transmitting apparatus 2200, which includes a coil 2204 having a plurality of loops wrapped around a magnetic component 220. In this example, the coil 2204 is connected to at least one capacitor (not shown). The conductor shield 2206 can include two flaps 2207 which are bent down ends of the conductor shield 2206. The flaps 2207 do not add to the overall length 2209 of the conductor shield 2206, but can improve the shielding effect of the conductor shield 2206 by deflecting and guiding magnetic field lines downwards, and reducing field interactions with lossy object 2208. This configuration can increase the effectiveness of conductor shield 2206 without increasing its length 2209.

The coil 2204 is wound around the magnetic component 220, which can have one or more gaps 422 (not shown) as described above. The gaps may lead to concentrated magnetic fields penetrating into the shield 2206. Accordingly, the shield 2206 can have an opening 2210 aligned to a gap 422 of the magnetic component 220 to mitigate the magnetic field penetration.

Figure 23:
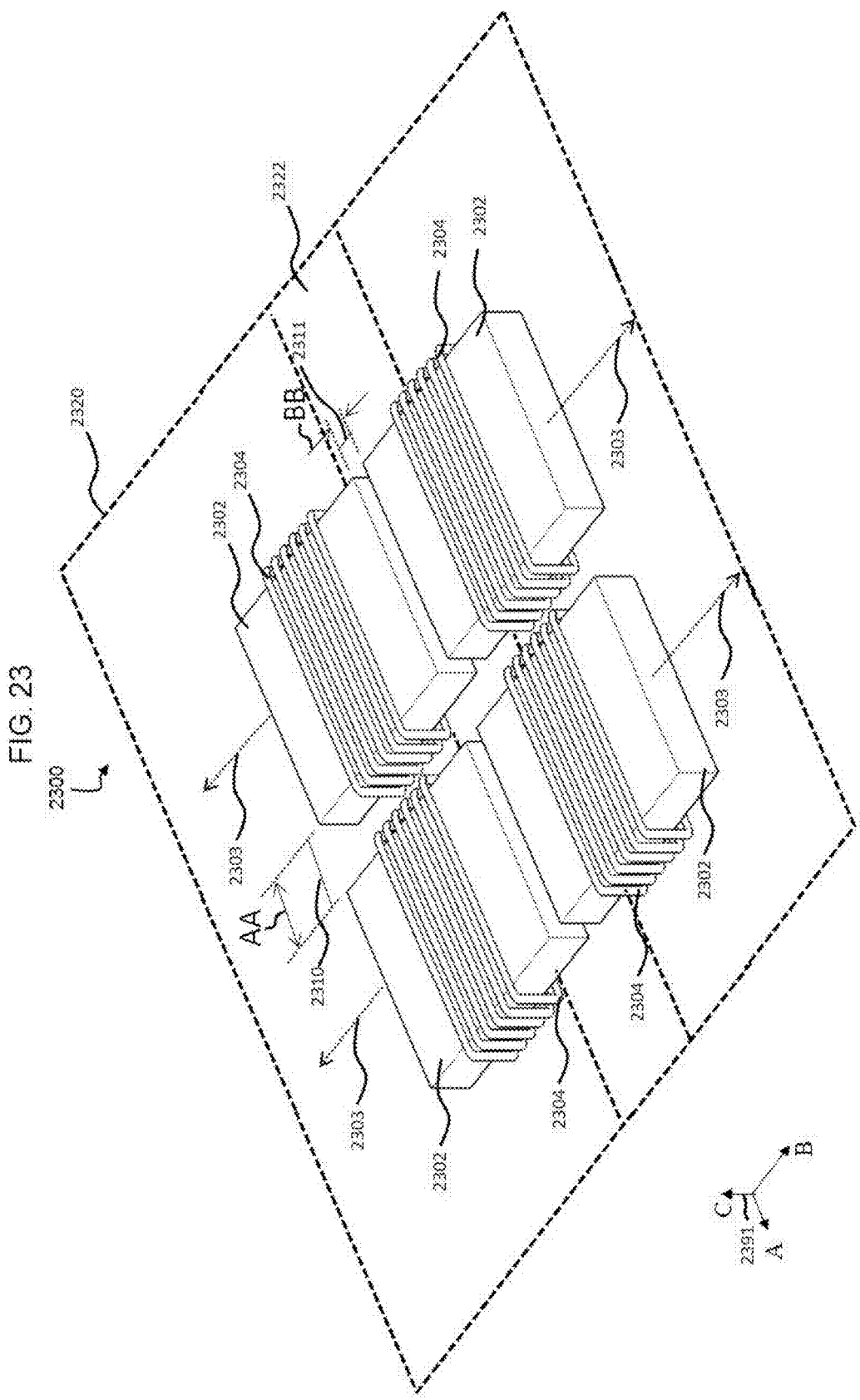
FIG. 23 is a schematic diagram showing an example of a power transmitting apparatus.

FIG. 23 is a schematic diagram of another example of a power transmitting apparatus 2300 according to coordinate 2391. The apparatus 2300 includes multiple coils 2304, where each coil 2304 is wound around a magnetic component 2302, with several such magnetic components 2302 are arranged as an array. The magnetic component 2302 may or may not have gaps 422 as described for magnetic component 220. In some embodiments, coil 2304 is in direct contact with it respective magnetic component 2302. In certain embodiments, coil 2304 is not in direct contact with it respective magnetic component 2302. The coils 2304 are configured to generate oscillating magnetic fields and magnetic dipoles within their respective magnetic components 2302 when currents oscillate within the coils 2304. For example, at a given time, the coils 2304 can generate magnetic dipoles along the axis of dipole moments 2303. The configuration shown in FIG. 23 can be used in preference to an apparatus that includes a large monolithic magnetic component, for example, with a size of the combined areas of the four magnetic components 2302, due to the difficulties associated with producing such large magnetic components disclosed herein. The configuration may also be advantageous in that multiple larger sized and differently shaped apparatuses can be assembled from smaller and single-sized apparatuses. In some manufacturing, the ability to assemble, repair and reconfigure a wide range of apparatus configurations from a number of subcomponents that may be tracked, stored, shipped can be desirable. The four magnetic components 2302 are separated by gaps 2310 and 2311, which correspond to separations AA and BB, respectively. Accordingly, within the gap 2311, magnetic fields generated by the coils 2304 oscillate in the B-direction.

The apparatus 2300 can include a shield 2320 positioned adjacent to the magnetic component 2302 in the negative C-direction. The shield 2320 can include an opening 2322, which can act as an opening 560 described above. The configuration of apparatus 2300 can be advantageous because each of the coils 2304 can generate strong magnetic flux densities within respective magnetic components 2302, which can be utilized for providing for high power transfer in applications such as car charging.

In the example shown in FIG. 23, the magnetic components 2302 extends in a plane in which the arrows of axis of dipole moment 2303 lie on and parallel to the A-B plane. The plane passes through the middle of the magnetic components 2302 as measured in the C-direction. Parts of the coils 2304 are positioned on a first side of the plane in the positive C-direction, while the other parts of the coils 2304 are positioned on a second side of the plane in the negative C-direction. The shield 2320 is positioned on the second side of the plane in the negative C-direction. Accordingly, the coils 2304 are, in part, positioned on the first side of the plane. Generally, the shield 2320 can include one or more openings (e.g., opening 2322) positioned relative to one or more gaps within the magnetic components 2302 or between the magnetic components (e.g., gap 2311). Similar description can be applied to the examples shown in FIGS. 22 and 24A.

FIG. 24A is a schematic diagram of a power transmitting apparatus 2400 including a plurality of conducting wire segments 2432 that form a coil, and a shield 2481 electrically connected to the plurality of conducting wire segments 2432, according to coordinate 2491. In this example, a magnetic component 220 is disposed in an internal region of the coil defined by the conducting wire segments 2432 and the shield 2481. The shield 2481 is split into distinct isolated conductor segments 2402 each electrically connected to different conducting wire segments 2432. The net result is a series connection of conductor wire segments 2432 alternated with electrically isolated segments of the shield 2481. The isolated segments of the shield 2481 can be electrically insulated from one another by air gaps or by one or more dielectric materials with high-breakdown voltages, such as Teflon, Kapton, and/or potting compound. In certain embodiments, the conductor wire segments 2432 can be electrically isolated from one another. Electrical currents can therefore be applied independently to each of the conducting wire segments 2432.

The configuration of apparatus 2400 can eliminate a portion of the wires that might otherwise be positioned between the magnetic component and the shield (as shown in FIGS. 22 and 23, for example). To illustrate this, FIG. 24B shows a schematic diagram of a cross-sectional view of the apparatus 2400 according to coordinate 2492. The conducting wire segments 2432 are electrically connected to the shield 2481 with the absence of wire portions below the magnetic component 220 in the negative C-direction (i.e., between magnetic component 220 and shield 2481). This configuration can lead to a lighter weight and more compact apparatus due to the absence of the wire portions.

Referring again to FIG. 24A, the magnetic component 220 can include gaps 422 between magnetic elements (not shown in FIG. 24A). The coil segments 2432 can generate magnetic fields oscillating in the B-direction within the gaps 422. Accordingly, shield 2481 can include openings of the type described herein to reduce the penetration of magnetic fields in the gap regions into the shield. To illustrate this, FIG. 24C shows the shield 2481 viewed in the positive C-direction according to coordinate 2493. Dashed line 2483 corresponds to the magnetic component 220 shown in FIG. 24A.

The shield 2481 includes multiple openings 560 which are aligned to respective gaps 422 depicted in FIG. 24A. Gap 422 at the center of the magnetic component 220 is not shown in FIG. 24A. Accordingly, similar to other embodiments, the shield 2481 can have one or more openings or notches aligned to gaps or hot spots in the magnetic component 220 to reduce or eliminate power dissipation and energy losses in the shield 2481 by penetrating magnetic fields.

The disclosed techniques can be implemented during a manufacturing process of an apparatus (e.g., power transmitting apparatus, power receiving apparatus, power repeating apparatus) utilized in a wireless power transfer system. For example, the type of magnetic elements and arrangement can be selected to form a magnetic component. The arrangement defines the location and positions of gaps between the magnetic elements. In some embodiments, the shape and position of one or more coils with respect to the magnetic component can be determined. During manufacture, currents are directed through the one or more coils, and the temperature distribution of the magnetic component is measured. The measured temperature distribution indicates the generated magnetic field distribution and presence of hot spots. The magnitude and phases applied to the one or more coils can be controlled to make the temperature distribution more uniform and reduce the hot spots as described herein. In certain embodiments, the shape and position of the one or more coils can be adjusted to make the temperature distribution and the magnetic field distribution more uniform.

During the manufacturing process, a shield can be placed adjacent to the magnetic component. The location and shape of one or more openings of the shield can be determined based on the measured temperature distribution. For example, the one or more openings of the shield can be positioned to be aligned with regions of high temperature of the magnetic component. The shape of the one or more openings can be selected to conform to the high temperature regions of the magnetic component. For example, the one or more openings can be shaped to conform to regions with temperatures above a threshold value. Such threshold value can be predetermined from separate measurements for different types of magnetic elements, where the threshold value is identified to be below the damaging temperature of the specific type of magnetic element. In some embodiments, the depth of the one or more openings can depend on the measured temperature distribution. For example, an opening aligned with a region of higher temperature can have a larger depth compared to another opening with a region of lower temperature. This is because the induced magnetic fields can extend further for the region with higher temperature.

The above-mentioned processes can be implemented while assembling the wireless power transfer system. In certain embodiments, a calibration measurements can be carried out the relation between the type, shape, arrangement of magnetic elements, the shape, positioning of coils, the magnitude and phases of applied currents, the induced temperature distribution and high temperature threshold values. The data obtained by the calibration measurements can be saved in a library (e.g., electronic database), which can be used as a reference during assembly of the system. The temperature measurements can utilize temperature sensors which are attached to various locations of the apparatus being measured. In some embodiments, the temperatures sensor can be a camera (e.g., infra-red camera) to capture a thermal image.

Furthermore, the above mentioned techniques can be implemented after the manufacture of the apparatus. For example, during operation or maintenance of the system, a user can measure the temperature distribution and control parameters of the system. The user can control the magnitude and phase of applied currents to make the temperature distribution more uniform. In certain embodiments, the location, shape and depth of the openings can be reconfigured to conform to the change of temperature distribution over time. The reconfigured can be achieved by, for example, molding, milling and/or moving parts of the shield by actuators. These processes be implemented during wireless power transfer of the system. These approaches can be used to maintain the system to operate under efficient power transfer and nonhazardous conditions and allow the system to be robust to changes in the coils, magnetic component and/or shield caused by vibration, thermal shocks and mechanical shocks.

These techniques can be used to take into account the fabrication imperfections of the magnetic component, coils and shield. For example, the magnetic component may have an imperfect surface after fabrication and the operation parameters of the can be set to take such imperfection into account to have more uniform field distribution. Moreover, the techniques can be used to take into account any imperfections of the elements (e.g., magnetic component, coils, shield) arising due to use of the elements over time.

The disclosed techniques can be implemented for low operating frequencies where a shield can have higher loss properties than at high operating frequencies. The operating frequency of a wireless power transfer system can be chosen as the frequency of minimum loss of the combined contribution of losses of an apparatus including elements such as a shield, coil, magnetic component and electronics such as amplifiers and DC-AC converters of the system. For example, the shield can have lower losses as the operating frequency increases, and the coil can have lower losses as long as the frequency is low enough that radiative losses in the coil are lower than ohmic losses in the coil. On the other hand, the electronics can have higher losses as the operating frequency increases. An optimum frequency can exist where the combined losses can be minimum. In addition, the operating frequency of a wireless power transfer system may be chosen to exist within certain pre-specified frequency bands determined by a regulatory agency, a standards committee, a government or military organization. In some cases, the coil and shield designs are optimized to operate at a specified frequency and/or within a certain frequency range. For example, such an operating frequency can be about 85 kHz. As the shield can have higher losses at 85 kHz than at higher frequencies, the disclosed techniques can be used to have one or more openings in the shield to reduce losses induced within the shield. In some embodiments, the operating frequency can be at about 145 kHz. In high power applications, the losses of the electronics are typically lower for operating frequencies below 200 kHz, and thus certain high power applications are designed to operate at 20 kHz, 50 kHz, 85 kHz, and 145 kHz. In low power applications (e.g., low power consumer electronics), certain applications are designed to operate at the Industrial, Scientific and Medical (ISM) frequencies, where conducted and radiated emissions are not subject to regulatory restrictions. The ISM frequencies include 6.78 MHz, 13.56 MHz and many harmonics of 13.56 MHz.

Techniques described in relation to FIGS. 2-24C can be applied to a power receiving apparatus. For example, a power receiving apparatus can include a coil, a shield and a magnetic component which has gaps between its magnetic elements. Hence, the power receiving apparatus can experience similar magnetic field penetration into the shield leading to energy loss, as described herein in relation to a power transmitting apparatus. Therefore, the techniques described above in relation to a power transmitting apparatus are equally applicable to a power receiving apparatus.

Techniques described in relation to FIGS. 2-24C can be applied to a power repeating apparatus. For example, a power repeating apparatus can include a coil, a shield and a magnetic component, which has gaps between its magnetic elements. Hence, the power repeating apparatus can experience similar magnetic field penetration into the shield leading to energy loss, as described herein in relation to a power transmitting and power receiving apparatuses. The techniques described above in relation to a power transmitting apparatus and a power receiving apparatus are equally applicable to a power repeating apparatus, which wirelessly receives power from one apparatus and wirelessly transfer power to another apparatus.

Quality Factors and Operating Conditions

Generally, wireless power transfer may occur between the source and receiver resonators by way of multiple source resonators and/or multiple device resonators and/or multiple intermediate (also referred as "repeater" or "repeating") resonators.

The source resonators, receiver resonators, and repeater resonators disclosed herein can each be an electromagnetic resonator capable of storing energy in fields (e.g., electric fields, magnetic fields). Any one of the resonators can have a resonant frequency $f=\omega/2\pi$, an intrinsic loss rate $\Gamma$, and a Q-factor $Q=\omega/(2\Gamma)$ (also referred as "intrinsic" quality factor in this disclosure), where $\omega$ is the angular resonant frequency. A resonator can have a capacitance (C) and inductance (L) that defines its resonant frequency f according to equation 1 (Eq. (1)) below:

$$f = \frac{\omega}{2\pi} = \frac{1}{2\pi}\sqrt{\frac{1}{LC}}. \quad (1)$$

In some embodiments, any one of a source resonator, a receiver resonator, and/or a repeater resonator can have a Q-factor that is a high Q-factor where Q>100 (e.g., Q>100, Q>200, Q>300, Q>500, Q>1000). For example, a wireless power transfer system can include one or more source resonators, and at least one of the source resonators having a Q-factor of $Q_1>100$ (e.g., $Q_1>200$, $Q_1>300$, $Q_1>500$, $Q_1>1000$). The wireless power transfer system can include one or more receiver resonators, and at least one of the receiver resonators can have a Q-factor of $Q_2>100$ (e.g., $Q_2>200$, $Q_2>300$, $Q_2>500$, $Q_2>1000$). The wireless power transfer system can include one or more repeater resonators, and at least one of the repeater resonators can have a Q-factor of $Q_3>100$ (e.g., $Q_3>200$, $Q_3>300$, $Q_3>500$, $Q_3>1000$).

Utilizing high Q-factor resonators can lead to large energy transfer efficiency between at least some or all of the resonators in the wireless power transfer system. Resonators with high Q-factors can couple strongly to other resonators such that the "coupling time" between resonators is shorter than the "loss time" of the resonators. As a result, the energy transfer rate between resonators can be larger than the energy dissipation rate of individual resonators. Energy can therefore be transferred efficiently between resonators at a rate higher than the energy loss rate of the resonators, which arises from heating and radiative losses in the resonators.

In certain embodiments, for a source-receiver resonator pair with Q-factors $Q_i$ and $Q_j$ (i=1, j=2), for a source-repeater resonator pair with Q factors $Q_i$ and $Q_j$ (i=1, j=3), and/or for a receiver-repeater resonator pair with Q factors $Q_i$ and $Q_j$ (i=2, j=3), a geometric mean $\sqrt{Q_iQ_j}$ can be larger than 100 (e.g., $\sqrt{Q_iQ_j}>200$, $\sqrt{Q_iQ_j}>300$, $\sqrt{Q_iQ_j}>500$, $\sqrt{Q_iQ_j}>1000$). Any one of the source, receiver, and repeater resonators can include one or more of the coils described in the following sections. High-Q resonators and methods for transferring power using such resonators are described, for example, in commonly owned U.S. patent application Ser. No. 12/567,716, published as US Patent Application Publication 2010/0141042, and issued as U.S. Pat. No. 8,461,719 on Jun. 11, 2013; U.S. patent application Ser. No. 12/720,866, published as US Patent Application Publication 2010/0259108, and issued as U.S. Pat. No. 8,587,155 on Nov. 19, 2013; U.S. patent application Ser. No. 12/770,137, published as U.S. Patent Application Publication 2010/0277121; U.S. patent application Ser. No. 12/860,375, published as US Patent Application Publication 2010/0308939; U.S. patent application Ser. No. 12/899,281, published as US Patent Application Publication 2011/0074346; U.S. patent application Ser. No. 12/986,018, published as U.S. Patent Application Publication 2011/0193416; U.S. patent application Ser. No. 13/021,965, published as US Patent Application Publication 2011/0121920; U.S. patent application Ser. No. 13/275,127, published as US Patent Application Publication 2012/0119569; U.S. patent application Ser. No. 13/536,435, published as US Patent Application Publication 2012/0313742; U.S. patent application Ser. No. 13/608,956, published as US Patent Application Publication 2013/0069441; U.S. patent application Ser. No. 13/834,366, published as US Patent Application Publication 2013/0221744; U.S. patent application Ser. No. 13/283,822, published as US Patent Application Publication No. 2012/0242225, issued as U.S. Pat. No. 8,441,154 on May 14, 2013; U.S. patent application Ser. No. 14/059,094; and U.S. patent application Ser. No. 14/031,737. The contents of each of the foregoing applications are incorporated herein by reference.

In some embodiments, a resonator of any of the types disclosed herein (e.g., source, receiver, repeater resonators) can include a coil formed of a conductive material. In certain embodiments, the resonator can have a resonance with a resonant frequency defined by an inductance and capacitance of the coil as described by Eq. (1) In this disclosure, the coil is also referred to interchangeably as a "coil structure."

In certain embodiments, the coil can be connected to at least one capacitor, and the resonator can have a resonance with a resonator frequency defined by a combined inductance and combined capacitance of the coil-capacitor structure as described by Eq. (1) In this disclosure, the combination of the coil and the capacitor is also referred to interchangeably as a "coil-capacitor structure."

In certain embodiments, an apparatus can include a coil wound around or positioned above and/or near-by a magnetic component (e.g., ferrite material). The magnetic component can enhance an induced magnetic flux density and can shield from nearby absorbing materials to reduce energy losses by such materials. In this disclosure, the combination of the coil and the magnetic component is also referred to interchangeably as a "coil-magnetic component structure." A coil-magnetic component structure may or may not include a capacitor connected to the coil. A coil-magnetic component structure can have a resonant frequency defined by a combined inductance and combined capacitance of the coil structure and the magnetic component, or the coil-capacitor structure and the magnetic component, and a quality factor. In this disclosure, the quality factor $Q_{total}$ of the coil-magnetic component structure, $Q_{total}$, can be expressed according to:

$$\frac{1}{Q_{total}} = \frac{R_{total}}{\omega L_{total}} = \frac{1}{Q_{coil}} + \frac{1}{Q_\mu} = \frac{R_{coil}}{\omega L_{total}} + \frac{R_\mu}{\omega L_{total}}, \quad (2)$$

where $R_{total}$ and $L_{total}$ is the total effective resistance and inductance of the coil-magnetic component structure, respectively. $R_{coil}$ and $R_\mu$ are the effective resistance contributed by the coil and the magnetic component, respectively. In Eq. (2), $Q_{coil}$ can be considered as the quality factor of the configuration assuming a lossless magnetic component, and $Q_\mu$ can be considered as the quality factor contributed by the magnetic component (e.g., ferrite material) with its loss to the coil structure or the coil-capacitor structure.

In some embodiments, a power transmitting apparatus can include a coil-magnetic component structure, and a shield positioned adjacent to the coil-magnetic component structure. Such a power transmitting apparatus can be described to have a quality factor $Q_{trans}$. When the shield is present, the quality factor $Q_{trans}$ of the power transmitting apparatus can be different from the quality factor $Q_{total}$ of the coil-magnetic component structure (when isolated from the shield) due to the shield perturbing the quality factor, i.e., because the shield alters the magnetic field distribution and therefore the effective inductance of the coil-magnetic component structure. Taking into account the contributions from the shield, the quality factor Q can be expressed as:

$$\frac{1}{Q_{trans}} = \frac{R_{total}}{\omega L_{total}} = \frac{1}{Q'_{coil}} + \frac{1}{Q'_{\mu}} + \frac{1}{Q_{shield}} = \frac{R_{coil}}{\omega L_{total}} + \frac{R_{\mu}}{\omega L_{total}} + \frac{R_{shield}}{\omega L_{total}}, \quad (3)$$

where $R_{total}$ and $L_{total}$ is the total effective resistance and inductance of the configuration including the coil-magnetic component structure and the shield, respectively. The parameters described in Eq. (3) can be different from that described in Eq. (2). For example, $L_{total}$ in Eq. (3) can be different from that in Eq. (2). $R_{coil}$, $R_{\mu}$ and $R_{shield}$ are the effective resistances contributed by the coil, the magnetic component and the shield, respectively. $R_{coil}$ and $R_{\mu}$ may be the same as in Eq. (2), when assumed that they are not affected by the presence of the shield. In Eq. (3), $Q'_{coil}$ can be considered as the quality factor of the configuration assuming a lossless magnetic component and a lossless shield. $Q'_{\mu}$ can be considered as the quality factor contributed by the magnetic component with its loss and assuming a lossless shield. In this disclosure $Q_{shield}$ is referred to as a quality factor contributed by the shield.

In some embodiments, $Q_{trans}$ can be measured or calculated. $R_{total}$ and $L_{total}$ can be calculated from the obtained $Q_{trans}$. Another measurement or calculation without the presence of the shield can be carried out to obtain $R_{coil}+R_{\mu}$ in Eq. (3) assuming they are not affected by the presence of the shield. Then, $R_{shield}$ can be calculated by subtracting $R_{coil}+R_{\mu}$ from $R_{total}$. Further, $Q_{shield}$ can be obtained using the calculated $R_{shield}$ and $L_{total}$ based on the relations described in Eq. (3).

Hardware and Software Implementation

FIG. 25 shows an example of an electronic controller 103, which may be used with the techniques described here. As mentioned earlier, the electronic controller 103 can be used to control power transfer of a wireless power transferring system, for example, by changing power output of a power source, adjusting operation and/or resonant frequencies and adjusting impedance matching networks. In some embodiments, the electronic controller 103 can be directly connected to or wirelessly communicate with various elements of the system.

Electronic controller 103 can include a processor 2502, memory 2504, a storage device 2506 and interfaces 2508 for interconnection. The processor 2502 can process instructions for execution within the electronic controller 103, including instructions stored in the memory 2504 or on the storage device 2506. For example, the instructions can instruct the processor 2502 to determine parameters of the system such as efficiency of power transfer, operating frequency, resonant frequencies of resonators and impedance matching conditions. In certain embodiments, the processor 2502 is configured to send out control signals to various elements (e.g., power source, power transmitting apparatus, power receiving apparatus, power repeating apparatus, impedance matching networks) to adjust the determined parameters. For example, control signals can be used to tune capacitance values of capacitors in an impedance matching network. In certain embodiments, control signals can be used to adjust operation frequency of a power source. Control signals can change capacitance value of a capacitor in a resonator to tune its resonant frequency.

The memory 2504 can store information of optimized parameters of the system. For example, the information can include optimized impedance matching conditions for various levels of power output from the power source. In certain embodiments, the memory 2504 can store information such as resonant frequencies of resonator and magnetic properties (e.g., magnetic permeability depending on power levels) of magnetic components in the system, which can be used by the processor 2502 for determining signals to be sent out to control various elements in the system.

The storage device 2506 can be a computer-readable medium, such as a floppy disk device, a hard disk device, an optical disk device, or a tape device, a flash memory or other similar solid state memory device, or an array of devices, including devices in a storage area network or other configurations. The storage device 2506 can store instructions that can be executed by processor 2502 described above. In certain embodiments, the storage device 2506 can store information described in relation to memory 2504.

In some embodiments, electronic controller 103 can include a graphics processing unit to display graphical information (e.g., using a GUI or text interface) on an external input/output device, such as display 2516. The graphical information can be displayed by a display device (device (e.g., a CRT (cathode ray tube) or LCD (liquid crystal display) monitor) for displaying information. A user can use input devices (e.g., keyboard, pointing device, touch screen, speech recognition device) to provide input to the electronic controller 103. In some embodiments, the user can monitor the display 2516 to analyze the power transfer conditions of the system. For example, when the power transfer is not in optimum condition, the user can adjust parameters (e.g., power transfer level, capacitor values in impedance matching networks, operation frequency of power source, resonant frequencies of resonators) by inputting information through the input devices. Based on the receive input, the electronic controller 103 can control the system as described above.

In some embodiments, the electronic controller 103 can be used to monitor hazardous conditions of the system. For example, the electronic controller 103 can detect overheating in the system and provide an alert (e.g., visual, audible alert) to the user through its graphical display or audio device.

In certain embodiments, electronic controller 103 can be used to control magnitudes and phases of currents flowing in one or more coils of the wireless power transfer system. For example, processor 2502 can calculate and determine the magnitudes and phase of currents to be supplied to coils in a power transmitting apparatus. The determination can be based on the monitored power transfer efficiency and information stored in memory 2504 or storage 2506.

A feedback signal can be received and processed by the electronic controller 103. For example, the electronic controller 103 can include a wireless communication device (e.g., radio-frequency, Bluetooth receiver) to receive information from either or both of a power transmitting apparatus and a power receiving apparatus (which can have its own wireless communication device). In some embodiments, the received information can be processed by processor 2502, which can further send out control signals to adjust parameters of the system as described above. For example, the control signals can be used to adjust the magnitudes and phases of currents flowing in one or more coils of resonators in the system to increase the power transfer efficiency.

Various embodiments of the systems and techniques described here can be realized by one or more computer programs that are executable and/or interpretable on the electronic controller 103. These computer programs (also known as programs, software, software applications or code) include machine instructions for a programmable processor, and can be implemented in a high-level procedural and/or object-oriented programming language, and/or in assembly/machine language. For example, computer programs can contain the instructions that can be stored in memory 2504 and storage 2506 and executed by processor 2502 as described above. As used herein, the terms "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

Generally, electronic controller 103 can be implemented in a computing system to implement the operations described above. For example, the computing system can include a back end component (e.g., as a data server), or a middleware component (e.g., an application server), or a front end component (e.g., a client computer having a graphical user-interface), or any combination therefor, to allow a user to utilized the operations of the electronic controller 103.

The electronic controller 103 or one or more of its elements can be integrated in a vehicle. The electronic controller 103 can be utilized to control and/or monitor wireless power charging of a battery installed in the vehicle. In some embodiments, the display 2516 can be installed adjacent to the driving wheel of the vehicle so that a user may monitor conditions of the power charging and/or control parameters of the power charging as described in relation to FIG. 25. The display 2516 can also visualize information traffic information and road maps based on Global Positioning System (GPS) information. Any of the elements such as the processor 2502, memory 2504 and storage device 2506 can be installed in the space behind the display 2516, which can visualize the data process by those elements.

While this disclosure contains many specific implementation details, these should not be construed as limitations on the scope of the disclosure, but rather as descriptions of features specific to particular embodiments. Features that are described in this disclosure in the context of separate embodiments can also generally be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can generally be excised from the combination, and the claimed combination may be directed to a subcombination or variation of a subcombination.

In addition to the embodiments disclosed herein, other embodiments are within the scope of the disclosure.

What is claimed is:

1. An apparatus for wireless power transfer, the apparatus comprising:
   a plurality of adjacent magnetic elements positioned in a plane and defining a gap;
   a coil comprising one or more loops of conductive material positioned, at least in part, on a first side of the plane and on both sides of the gap; and
   a conductive shield positioned on a second side of the plane and comprising an opening aligned with the gap.

2. The apparatus of claim 1, wherein the conductive shield is oriented substantially parallel to the plane.

3. The apparatus of claim 1, wherein the gap is not filled with a solid material.

4. The apparatus of claim 1, further comprising a dielectric material positioned in the gap to at least partially fill the gap.

5. The apparatus of claim 1, further comprising a magnetic material having a magnetic permeability different from a magnetic permeability of the magnetic elements and positioned in the gap to at least partially fill the gap.

6. The apparatus of claim 1, wherein the loops are positioned entirely on the first side of the plane.

7. The apparatus of claim 1, wherein:
   during operation, the coil generates a magnetic field that oscillates in a first direction parallel to the plane;
   the gap corresponds to a spacing between magnetic elements in a direction parallel to the first direction; and
   the opening comprises a width that extends in a direction parallel to the first direction.

8. An apparatus for wireless power transfer, the apparatus comprising:
   a plurality of adjacent magnetic elements positioned in a plane and defining a gap;
   a coil comprising one or more loops of conductive material positioned, at least in part, on a first side of the plane; and
   a conductive shield positioned on a second side of the plane and comprising a depression formed in a surface of the shield facing the plane, and aligned with the gap.

9. The apparatus of claim 8, wherein the depression is positioned to reduce interactions between magnetic flux crossing the gap and the conductive shield.

10. The apparatus of claim 8, wherein the coil is positioned entirely on the first side of the plane.

11. The apparatus of claim 8, wherein the one or more loops of conductive material encircle an axis oriented in a direction perpendicular to the plane.

12. The apparatus of claim 8, wherein the depression has a cross-sectional profile that corresponds to at least one of a triangular shape, a trapezoidal shape, and a shape comprising curved edges.

13. The apparatus of claim 8, wherein at least a portion of the conductive shield is oriented parallel to the plane.

14. The apparatus of claim 8, further comprising a dielectric material positioned in the gap.

15. The apparatus of claim 8, further comprising a filler material positioned in the gap, wherein a magnetic permeability of the filler material is different from a magnetic permeability of the plurality of magnetic elements.

16. The apparatus of claim 8, wherein the depression comprises lateral surfaces that are angled relative to the plane.

17. The apparatus of claim 8, wherein:
   during operation of the apparatus, the coil generates a magnetic field oscillates in a first direction within the plurality of magnetic elements;

the gap corresponds to a spacing between magnetic elements in a direction parallel to the first direction; and the depression comprises a width that extends in a direction parallel to the first direction.

18. An apparatus for wireless power transfer, comprising:
a plurality of adjacent planar magnetic elements positioned in a plane and defining a gap in the plane;
a coil comprising one or more loops of conductive material; and
a conductive shield positioned on a second side of the plane and comprising at least one of a depression and an opening formed in a surface of the shield, wherein the at least one of the depression and the opening is aligned with the gap,
wherein the coil is oriented so that during operation of the apparatus, the coil generates an average magnetic field oriented in a first direction parallel to the plane.

19. The apparatus of claim 18, wherein the coil comprises a first plurality of loops and a second plurality of loops connected to the first plurality of loops, and wherein the first and second pluralities of loops are arranged so that during operation of the apparatus, electrical current circulates in a first rotational direction in the first plurality of loops and in a second rotational direction opposite to the first rotational direction in the second plurality of loops.

20. The apparatus of claim 18, wherein a width of the gap extends in a second direction, and wherein an angle between the first and second directions is 10° or less.

* * * * *